United States Patent
Kusama et al.

(10) Patent No.: US 10,185,063 B2
(45) Date of Patent: Jan. 22, 2019

(54) OPTICAL-DIFFUSION FILM FOR DISPLAY AND REFLECTIVE DISPLAY DEVICE USING SAME

(71) Applicants: LINTEC Corporation, Itabashi-Ku, Tokyo (JP); TOHOKU University, Sendai-shi, Miyagi (JP)

(72) Inventors: Kentaro Kusama, Tokyo (JP); Baku Katagiri, Tokyo (JP); Tomoo Orui, Tokyo (JP); Satoru Shoshi, Tokyo (JP); Hideo Fujikake, Tokyo (JP); Takahiro Ishinabe, Miyagi (JP)

(73) Assignee: LINTEC Corporation, Tokyo (JP)

(*) Notice: Subject to any disclaimer, the term of this patent is extended or adjusted under 35 U.S.C. 154(b) by 0 days.

(21) Appl. No.: 14/786,733

(22) PCT Filed: Mar. 13, 2014

(86) PCT No.: PCT/JP2014/056607
§ 371 (c)(1),
(2) Date: Oct. 23, 2015

(87) PCT Pub. No.: WO2014/178230
PCT Pub. Date: Nov. 6, 2014

(65) Prior Publication Data
US 2016/0077246 A1   Mar. 17, 2016

(30) Foreign Application Priority Data

Apr. 30, 2013  (JP) .................. 2013-095638
Aug. 1, 2013   (JP) .................. 2013-160090

(51) Int. Cl.
*G02B 5/02*  (2006.01)
*G02B 1/04*  (2006.01)
(Continued)

(52) U.S. Cl.
CPC ............ *G02B 5/0236* (2013.01); *G02B 1/04* (2013.01); *G02B 5/0242* (2013.01);
(Continued)

(58) Field of Classification Search
None
See application file for complete search history.

(56) References Cited

U.S. PATENT DOCUMENTS 6,937,399 B2   8/2005  Takahashi et al.
2005/0018303 A1  1/2005  Harada
(Continued)

FOREIGN PATENT DOCUMENTS

CN  102565894 A   7/2012
EP  1369711 A1   12/2003
(Continued)

OTHER PUBLICATIONS

English Machine Translation of WO 2009-084550. Retrieved from <https://patentscope.wipo.int> on Apr. 24, 2017.*
(Continued)

*Primary Examiner* — Derek S Chapel
(74) *Attorney, Agent, or Firm* — Renner, Kenner; Arthur M. Reginelli

(57) ABSTRACT

Provided are an optical-diffusion film for display which, particularly when applied to a reflective display device, can efficiently diffuse and emit an external light incident from a wide range of angles toward the front of the display device as image display light, and a reflective display device using the optical-diffusion film.
Disclosed is an optical-diffusion film for display, which is a single-layered optical-diffusion film obtained by photocuring a composition for optical-diffusion film including two or more kinds of polymerizable compounds having different refractive indices, and in which the film thickness of the
(Continued)

optical-diffusion film has a value within the range of 60 to 700 µm, and when a coating layer formed by applying a composition for optical-diffusion film in a film form is photocured, and the incident angle of incident light with respect to the normal line of the film plane is varied in the range of −70° to 70° along the travel direction of the coating layer at the time of photocuring, the haze value at each incident angle has a value of 70% or more.

10 Claims, 37 Drawing Sheets

(51) Int. Cl.
 *F21V 8/00* (2006.01)
 *G02F 1/1335* (2006.01)
(52) U.S. Cl.
 CPC ......... *G02B 5/0257* (2013.01); *G02B 5/0263* (2013.01); *G02B 5/0268* (2013.01); *G02B 5/0278* (2013.01); *G02B 5/0294* (2013.01); *G02B 6/0051* (2013.01); *G02F 1/133504* (2013.01); *G02F 2202/023* (2013.01)

(56) References Cited

U.S. PATENT DOCUMENTS

| | | | | |
|---|---|---|---|---|
| 2007/0110380 A1* | 5/2007 | Uchida | ............... | G02B 5/0236 385/131 |
| 2012/0250158 A1* | 10/2012 | Tamaki | ............. | G02F 1/133504 359/599 |
| 2014/0340752 A1 | 11/2014 | Kusama et al. | | |
| 2014/0340753 A1 | 11/2014 | Kusama et al. | | |
| 2015/0355390 A1 | 12/2015 | Katagiri et al. | | |
| 2016/0018571 A1 | 1/2016 | Kusama et al. | | |
| 2016/0025907 A1 | 1/2016 | Kusama et al. | | |
| 2016/0033692 A1 | 2/2016 | Kusama et al. | | |
| 2016/0047952 A1 | 2/2016 | Kusama et al. | | |
| 2016/0070035 A1 | 3/2016 | Kusama et al. | | |
| 2016/0077246 A1 | 3/2016 | Kusama et al. | | |
| 2017/0293054 A1 | 10/2017 | Kusama et al. | | |

FOREIGN PATENT DOCUMENTS

| | | | |
|---|---|---|---|
| JP | 2003202415 A | 7/2003 |
| JP | 2005189303 A | 7/2005 |
| JP | 2009173018 A | 8/2009 |
| JP | 2011186002 A | 9/2011 |
| JP | 2012141593 A | 7/2012 |
| JP | 2012208408 A | 10/2012 |
| JP | 2013117702 A | 6/2013 |
| JP | 2013117703 A | 6/2013 |
| JP | 2013148712 A | 8/2013 |
| JP | 2013210408 A | 10/2013 |
| JP | 2013210409 A | 10/2013 |
| JP | 2014002186 A | 1/2014 |
| JP | 2014002187 A | 1/2014 |
| JP | 2014002188 A | 1/2014 |
| JP | 2014126749 A | 7/2014 |
| JP | 2014126750 A | 7/2014 |
| JP | 2014126771 A | 7/2014 |
| JP | 2014191340 A | 10/2014 |
| JP | 2016048290 A | 4/2016 |
| WO | WO2009084550 A1 | 7/2009 |

OTHER PUBLICATIONS

English Machine Translation of CN 102565894 A. Retrieved from <https://worldwide.espacenet.com> on Apr. 12, 2017.*

* cited by examiner $\theta 1=0°$   $\theta 1=20°$   $\theta 1=40°$   $\theta 1=60°$

0°

10°

20°

30°

40°

50°

60°

0cd/m² ─────────────────────► MAXIMUM LUMINANCE

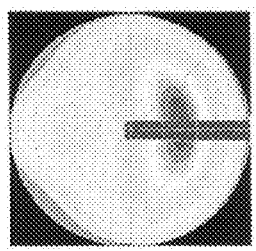 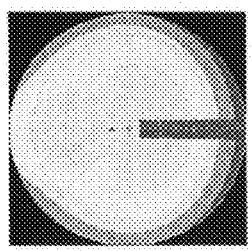 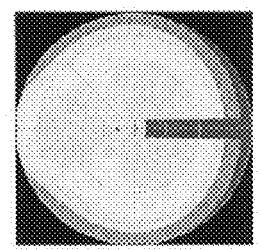 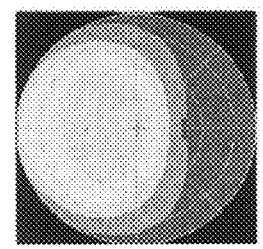
FIG.26(a) 0°  FIG.26(b) 10°  FIG.26(c) 20°  FIG.26(d) 30°
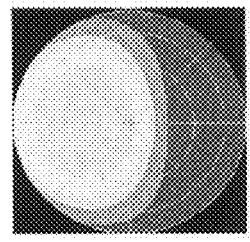 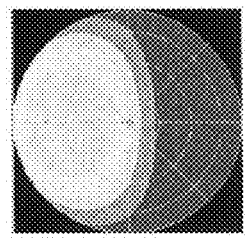 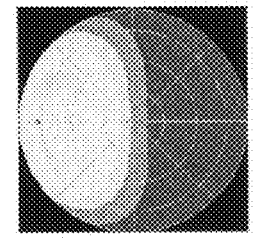
FIG.26(e) 40°  FIG.26(f) 50°  FIG.26(g) 60°

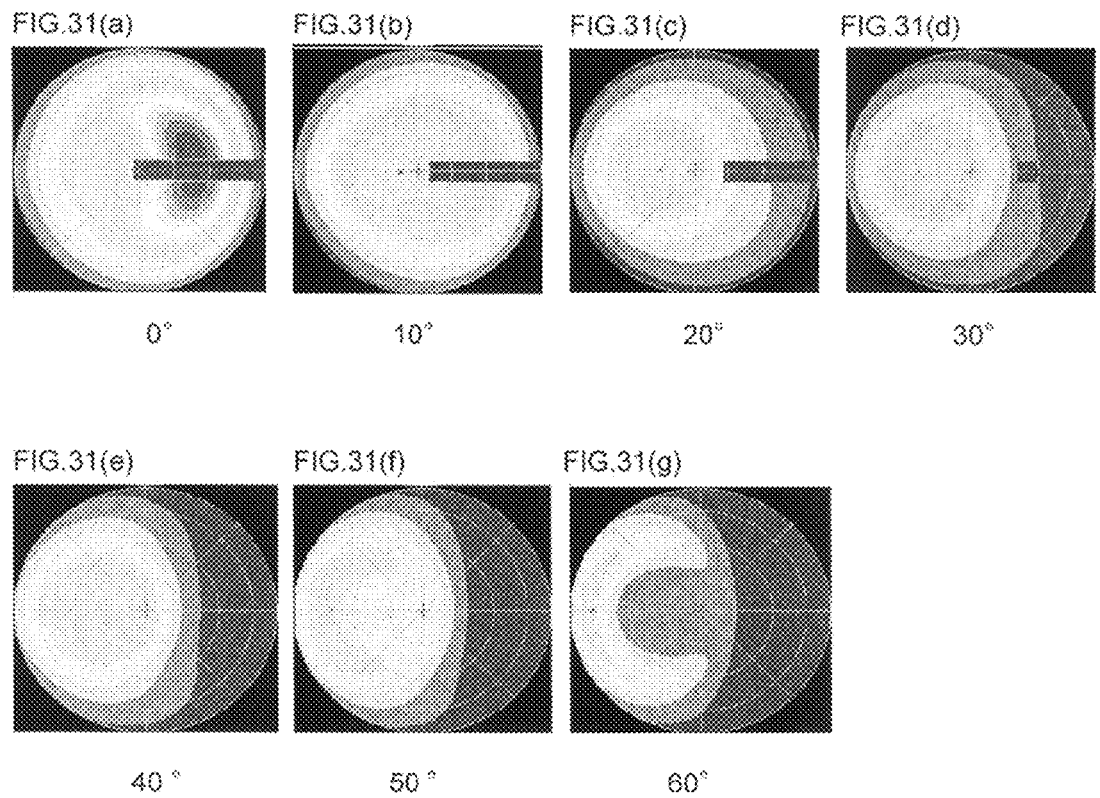
FIG.31(a) 0°
FIG.31(b) 10°
FIG.31(c) 20°
FIG.31(d) 30°
FIG.31(e) 40°
FIG.31(f) 50°
FIG.31(g) 60°
FIG.32
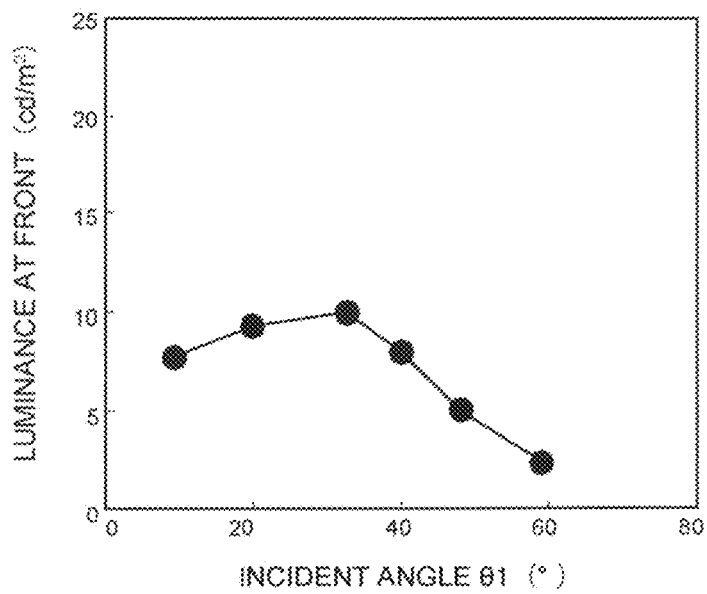

0°

10°

20°

30°

40°

50°

60°

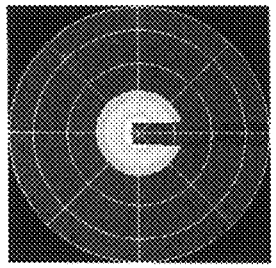 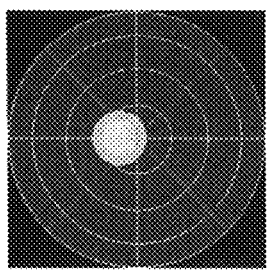 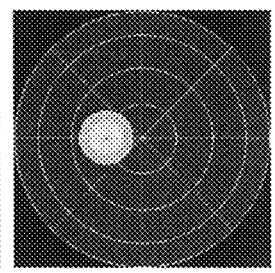 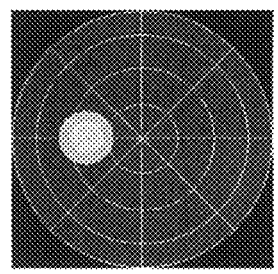
FIG.40(a) 0°  FIG.40(b) 10°  FIG.40(c) 20°  FIG.40(d) 30°
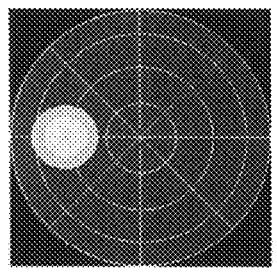 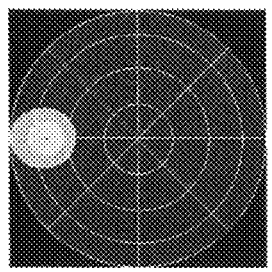 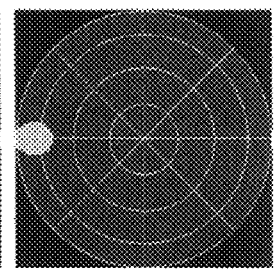
FIG.40(e) 40°  FIG.40(f) 50°  FIG.40(g) 60°

FIG.41
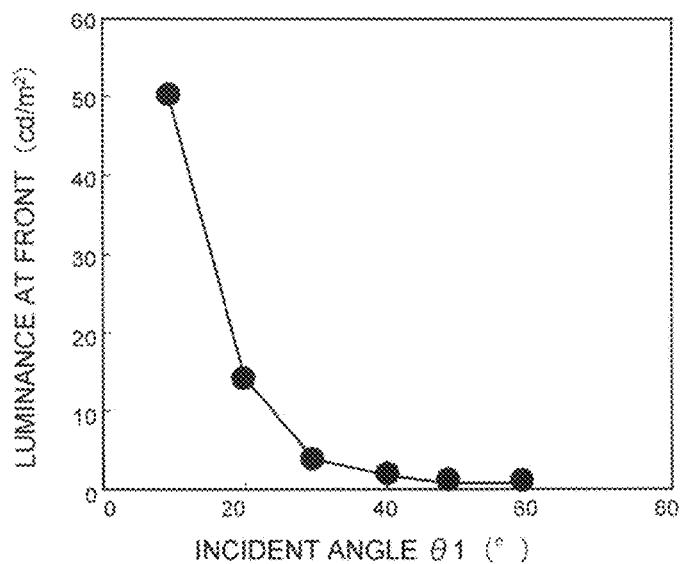
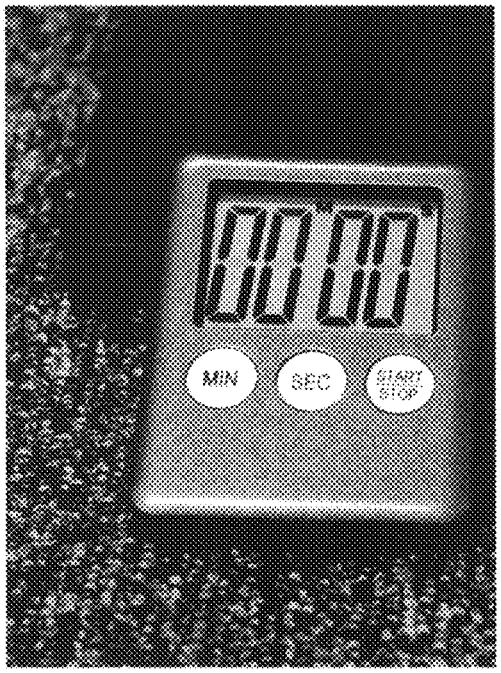
FIG.42(b)
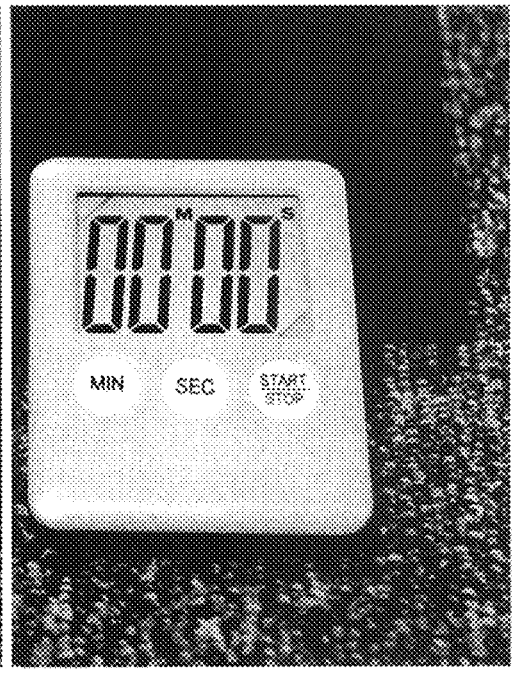
FIG.42(a)

OPTICAL-DIFFUSION FILM FOR DISPLAY AND REFLECTIVE DISPLAY DEVICE USING SAME

TECHNICAL FIELD

The present invention relates to an optical-diffusion film for display, and a reflective display device using the optical-diffusion film.

More particularly, the present invention relates to an optical-diffusion film for display which, when applied to a reflective display device, can efficiently diffuse an external light incident from a wide range of angles toward the front of a display device and emit as an image, and a reflective display device using the optical-diffusion film.

BACKGROUND ART

In a display device, conventionally, a predetermined image can be displayed by utilizing light emitted from a light source that is installed inside the device (internal light source).

In recent years, as a result of popularization of mobile telephones, vehicle-mounted televisions and the like, there are increasing opportunities to view display devices in the outdoors; however, when a display device is viewed in the outdoor, there occurs a problem that the light intensity from an internal light source is lower than or equal to the light intensity of external light, and it is in many cases difficult to recognize a predetermined image.

Furthermore, for mobile applications such as mobile telephones, since the electric power consumption by an internal light source of a display device occupies a large proportion in the total electric power consumption, when the internal light source is heavily used, there is a problem that the duration of the battery is shortened.

Thus, in order to solve these problems, reflective display devices that utilize external light as a light source have been developed.

With such a reflective display device, since external light is utilized as a light source, a clearer image can be displayed as the external light is more intense, and the electric power consumption of the internal light source can also be effectively suppressed.

In a reflective display device, it is necessary to provide a film having a optical-diffusion function (hereinafter, may be referred to as an optical-diffusion film) inside the display device, in order to carry out display by utilizing external light.

Known examples of such an optical-diffusion film include a film provided with surface unevenness on the film surface (meaning the surface of a plane other than a cross-section of the film; the same applies throughout the following description), and a film having fine particles dispersed in the film.

However, when these optical-diffusion films are used, since the emission angle of diffused light is simply dependent on the incident angle of external light, there has been a problem that it is difficult to efficiently emit an external light incident from a wide range of angles toward the front of the display device as image display light.

Thus, there have been disclosed reflective display devices which use, unlike the optical-diffusion films described above, an optical-diffusion film that can control the emission angle of diffused light (see, for example, Patent Documents 1 and 2).

More specifically, reflective display devices are disclosed, which use a film that is formed by photocuring two or more kinds of polymerizable compounds having different refractive indices while phase-separating the polymerizable compounds, the film having a predetermined internal structure in which regions having a relatively high refractive index and regions having a relatively low refractive index are formed in a predetermined pattern within the film.

That is, Patent Document 1 discloses an electro-optic device in which an electro-optic material is sandwiched between a pair of substrates disposed to face each other, and a laminated structure diffusion film and a pillar-shaped structure diffusion film are provided on the outer surface side of any one substrate between the pair of substrates, while a reflector is provided on the other substrate side between the pair of substrates.

Here, it is disclosed that the laminated structure diffusion film used therein is a diffusion film in which plural resin layers having different refractive indices are alternately laminated, and the interfaces between these resin layers are formed to be inclined at a predetermined angle with respect to the film surface (or the back face).

Furthermore, it is disclosed that the pillar-shaped structure diffusion film used therewith is a diffusion film in which plural pillar-shaped resin layers having a low refractive index are provided within a resin layer having a high refractive index, and the interfaces between these resin layers are formed to be inclined at a predetermined angle with respect to the film surface (or the back face).

Furthermore, Patent Document 2 discloses a display device including a reflective display panel and an optical laminate disposed on the display panel, in which the optical laminate includes two or more sheets of anisotropic scattering films, and at least two sheets of films among the plural anisotropic scattering films have scattering central axes having mutually different transmittances.

Here, it is disclosed that the anisotropic scattering film used herein is a film having a louver structure or a pillar-shaped structure, each including two kinds of regions having mutually different refractive indices.

CITATION LIST

Patent Document

Patent Document 1: JP 2011-186002 A (Claims, specification, and drawings)
Patent Document 2: JP 2012-208408 A (Claims, specification, and drawings)

DISCLOSURE OF THE INVENTION

Problem to be Solved by the Invention

However, in regard to the electro-optic device and display device described in Patent Documents 1 and 2, on the occasion of controlling the emission angle of diffused light, it is necessary to use a predetermined optical-diffusion film having plural regions with different refractive indices, as a laminate of plural sheets.

Accordingly, the number of laminated sheets or the number of bonding processes increases, and not only it is economically disadvantageous, but also the film thickness becomes large due to the lamination of optical-diffusion films. Consequently, blurring easily occurs in display image, and also, physical problems such as delamination and the occurrence of warpage in the display panel are prone to occur.

Therefore, there has been a demand for a reflective display device which, despite that an optical-diffusion film composed of a single layer is used, can efficiently diffuse and emit an external light incident from a wide range of angles toward the front of the display device as image display light.

Thus, the inventors of the present invention conducted a thorough investigation in view of such circumstances, and they found that the problems described above can be solved by using an optical-diffusion film for a reflective display device, the optical-diffusion film being a single-layered optical-diffusion film formed by photocuring a predetermined composition for optical-diffusion film, and having a predetermined film thickness and predetermined optical-diffusion characteristics. Thus, the inventors have achieved the present invention.

That is, an object of the present invention is to provide an optical-diffusion film for display which, particularly when applied to a reflective display device, can efficiently diffuse and emit an external light incident from a wide range of angles toward the front of the display device as image display light, and a reflective display device using the optical-diffusion film.

Means for Solving Problem

According to an aspect of the present invention, there is provided an optical-diffusion film for display, which is a single-layered optical-diffusion film formed by photocuring a composition for optical-diffusion film including two or more kinds of polymerizable compounds having different refractive indices, and in which the film thickness of the optical-diffusion film has a value within the range of 60 to 700 μm, and when a coating layer formed by applying the composition for optical-diffusion film in a film form is photocured, and the incident angle of incident light with respect to the normal line of the film plane (meaning a plane other than a cross-section of the film; the same applies throughout the following description) is varied within the range of −70° to 70° along the travel direction of the coating layer at the time of the photocuring, the haze value at each incident angle has a value of 70% or more. Thus, the problems described above can be solved.

That is, when the optical-diffusion film for display of the present invention is used, since the film is an optical-diffusion film composed of a single layer having a predetermined film thickness, the number of bonding processes can be reduced, and it is economically advantageous, as compared with the case of laminating plural optical-diffusion films. In addition to that, the occurrence of blurring in the display image or the occurrence of delamination can also be suppressed effectively.

On the other hand, since the optical-diffusion film is formed by photocuring a predetermined composition for optical-diffusion film, and has predetermined optical-diffusion characteristics, despite that the film is composed of a single layer, the optical-diffusion film can, particularly when the film is applied to a reflective display device, efficiently diffuse and emit an external light incident from a wide range of angles toward the front of the display device as image display light.

Meanwhile, the term "single layer" means that plural sheets of optical-diffusion films are not laminated, and the case in which plural layers of internal structures are formed within one sheet of optical-diffusion film is also included in the "single layer".

Furthermore, on the occasion of configuring the optical-diffusion film for display of the present invention, it is preferable that the optical-diffusion film is an optical-diffusion film having a columnar structure in which plural pillar-shaped objects having a relatively high refractive index are arranged to stand close together in the film thickness direction in a region having a relatively low refractive index, and also, when one of the surfaces of the optical-diffusion film is designated as a first surface, and the other surface as a second surface, the pillar-shaped objects are modified pillar-shaped objects that have their shape changed from the first surface toward the second surface.

When such a configuration is adopted, predetermined optical-diffusion characteristics can be imparted more stably to the optical-diffusion film.

Furthermore, on the occasion of configuring the optical-diffusion film for display of the present invention, it is preferable that in regard to the modified pillar-shaped objects, the diameter increases from the first surface toward the second surface.

When such a configuration is adopted, predetermined optical-diffusion characteristics can be imparted even more stably to the optical-diffusion film.

Furthermore, on the occasion of configuring the optical-diffusion film for display of the present invention, it is preferable that the modified pillar-shaped objects have a bent part in the middle of the pillar-shaped objects.

When such a configuration is adopted, predetermined optical-diffusion characteristics can be imparted more stably to the optical-diffusion film.

Furthermore, on the occasion of configuring the optical-diffusion film for display of the present invention, it is preferable that the modified pillar-shaped objects are composed of first pillar-shaped objects positioned on the first surface side, and second pillar-shaped objects positioned on the second surface side.

When such a configuration is adopted, predetermined optical-diffusion characteristics can be imparted more stably to the optical-diffusion film, and also, the optical-diffusion characteristics thus obtainable can be efficiently controlled.

Furthermore, on the occasion of configuring the optical-diffusion film for display of the present invention, it is preferable that the composition for optical-diffusion film includes a (meth)acrylic acid ester containing plural aromatic rings as component (A), a urethane (meth)acrylate as component (B), and a photopolymerization initiator as component (C).

When such a configuration is adopted, the component (A) and the component (B) can be photocured while the components are efficiently phase-separated, and therefore, predetermined optical-diffusion characteristics can be imparted even more stably to the optical-diffusion film.

Furthermore, according to another aspect of the present invention, there is provided a reflective display device formed by laminating optical-diffusion films on the display surface side of a reflective display panel including a reflective plate, in which device the optical-diffusion film is a single-layered optical-diffusion film formed by photocuring a composition for optical-diffusion film including two or more kinds of polymerizable compounds having different refractive indices, the film thickness of the optical-diffusion film has a value within the range of 60 to 700 μm, and when a coating layer formed by applying the composition for optical-diffusion film in a film form is photocured, and the incident angle of incident light with respect to the normal line of the film plane is changed within the range of −70° to 70° along the travel direction of the coating layer at the time of the photocuring, the haze value at each incident angle has a value of 70% or more.

That is, when the reflective display device of the present invention is used, since the display device includes a predetermined optical-diffusion film, an external light incident from a wide range of angles can be efficiently diffused and emitted toward the front of the display device as image display light.

Furthermore, according to still another aspect of the present invention, there is provided a reflective display device which includes a reflective plate as a separate body on the non-display surface side of a reflective display panel, and is formed by laminating an optical-diffusion film between the reflective plate and the reflective display panel, and in which device the optical-diffusion film is a single-layered optical-diffusion film formed by photocuring a composition for optical-diffusion film including two or more kinds of polymerizable compounds having different refractive indices, the film thickness of the optical-diffusion film has a value within the range of 60 to 700 µm, and when a coating layer formed by applying the composition for optical-diffusion film in a film form is photocured, and the incident angle of incident light with respect to the normal line of the film plane is changed within the range of −70° to 70° along the travel direction of the coating layer at the time of the photocuring, the haze value at each incident angle has a value of 70% or more.

That is, when the reflective display device of the present invention is used, since a reflective plate is provided as a separate body on the non-display surface side of a reflective display panel, production can be made easier at lower cost, compared to the case of providing the reflective plate in the interior of the reflective display panel.

Furthermore, on the occasion of configuring the reflective display device of the present invention, it is preferable that the reflective display panel is at least one selected from the group consisting of a liquid crystal display panel, an electrophoresis system display panel, a MEMS shutter system display panel, and an electrowetting system display panel.

When such a configuration is adopted, a reflective display device which can efficiently diffuse and emit an external light incident from a wide range of angles toward the front of the display device as image display light can be obtained.

Furthermore, on the occasion of configuring the reflective display device of the present invention, it is preferable that the reflective display panel is a semi-transmissive display panel.

When such a configuration is adopted, a semi-transmissive display panel which can efficiently diffuse and emit an external light incident from a wide range of angles toward the front of the display device as image display light and can display an image by utilizing a backlight even in an environment in which external light is insufficient, can be obtained.

Furthermore, on the occasion of configuring the reflective display device of the present invention, it is preferable that the reflective display panel is a monochromatic display panel.

When such a configuration is adopted, even in a case in which the reflective plate is provided as a separate body for the reflective display panel, the occurrence of a double image is not likely to pose a problem, and a high contrast display image can be obtained.

Furthermore, on the occasion of configuring the reflective display device of the present invention, it is preferable that the reflective display device is applied as a price tag or a display device for a timepiece.

When such a configuration is adopted, the reflective display device can accomplish the function satisfactorily even with a monochromatic low-resolution image in these applications, and even in a case in which the reflective plate is provided as a separate body for the reflective display panel, the occurrence of a double image is not likely to pose a problem, and a high contrast display image can be obtained.

BRIEF DESCRIPTION OF DRAWINGS

FIGS. 26(a) to 26(g) are conoscopic images provided to show corresponding optical-diffusion characteristics in a case in which the optical-diffusion film according to Example 2 is applied to a reflective display device.

FIGS. 31(a) to 31(g) are conoscopic images provided to exhibit corresponding optical-diffusion characteristics in a case in which the optical-diffusion film according to Example 3 is applied to a reflective display device.

FIG. 32 is an incident angle-luminance chart provided to exhibit corresponding optical-diffusion characteristics in a case in which the optical-diffusion film according to Example 3 is applied to a reflective display device.

FIGS. 40(a) to 40(g) are conoscopic images provided to exhibit corresponding optical-diffusion characteristics in a case in which the optical-diffusion film according to Comparative Example 2 to a reflective display device.

FIG. 41 is an incident angle-luminance chart provided to show corresponding optical-diffusion characteristics in a case in which the optical-diffusion film according to Comparative Example 2 is applied to a reflective display device.

FIG. 42 is a photograph provided to explain the display state of time in the digital timepieces produced in Example 4 and Comparative Example 3.

MODES FOR CARRYING OUT THE INVENTION

An embodiment of the present invention relates to an optical-diffusion film for display, which is a single-layered optical-diffusion film formed by photocuring a composition for optical-diffusion film including two or more kinds of polymerizable compounds having different refractive indices, in which the film thickness of the optical-diffusion film has a value within the range of 60 to 700 μm, and when a coating layer formed by applying the composition for optical-diffusion film in a film form is photocured, and the incident angle of incident light with respect to the normal line of the film plane is varied within the range of −70° to 70° along the travel direction of the coating layer at the time of the photocuring, the haze value at each incident angle has a value of 70% or more.

Furthermore, another embodiment of the present invention relates to a reflective display device using the optical-diffusion film for display described above.

Hereinafter, these embodiments will be explained specifically with appropriate reference to the drawings.

However, basically, the reflective display device of the present invention will be explained, and the optical-diffusion film for display of the present invention will be explained as one constituent element of the reflective display device.

Also, for the convenience of explanation, the case of using a liquid crystal display panel as the reflective display panel will be mainly described.

1. Basic Configuration of Reflective Display Device

First of all, the basic configuration of the reflective display device of the present invention is explained.

Figure 1:
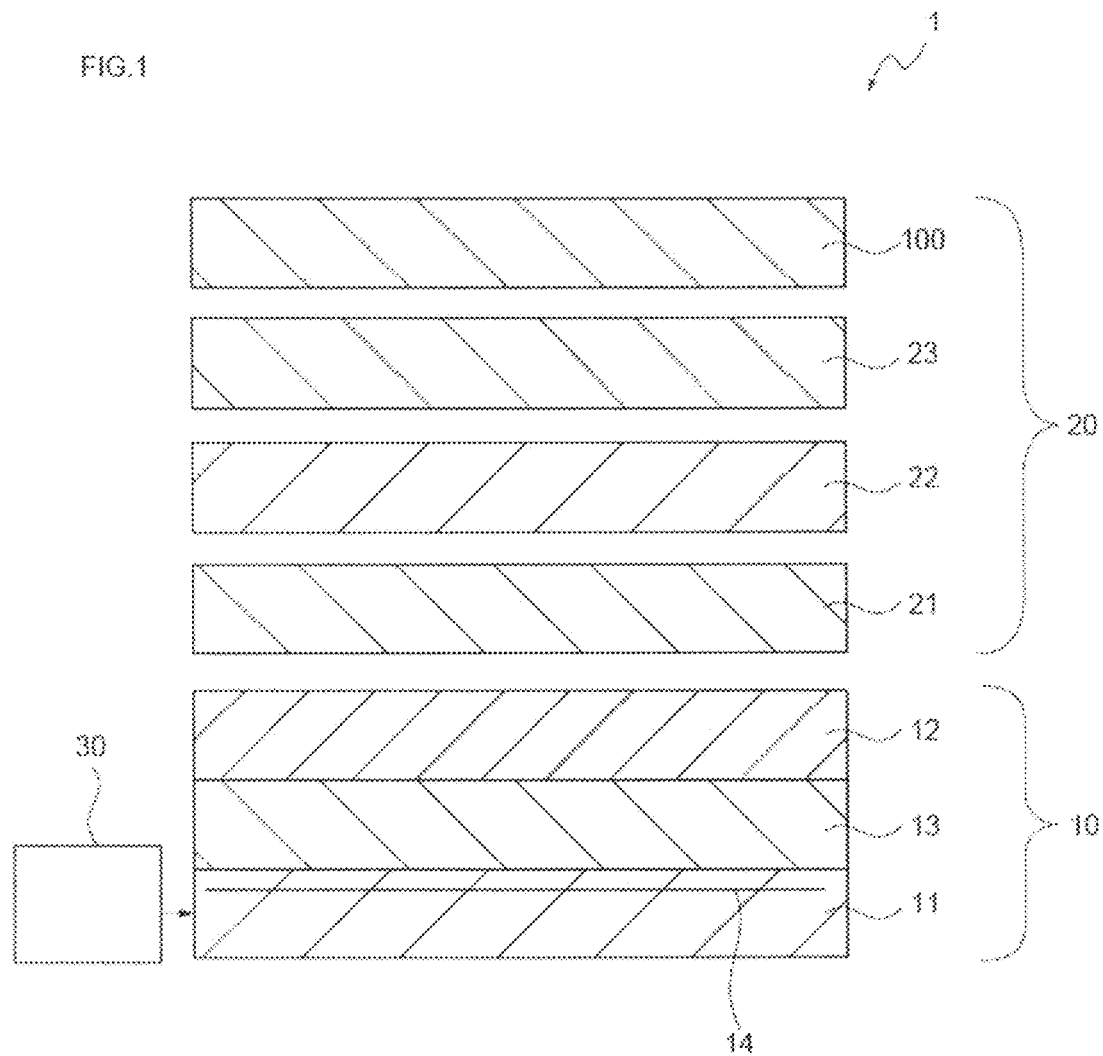
FIG. 1 is a diagram provided to explain the configuration of a reflective display device of the present invention.

As illustrated in FIG. 1, the reflective display device 1 includes a liquid crystal display panel 10; an optical laminate 20 laminated on the liquid crystal display panel 10; and a driving circuit 30 that drives the liquid crystal display panel 10 according to an image signal.

In such a reflective display device 1, between the surfaces of the optical laminate 20, the surface on the opposite side of the liquid crystal display panel 10 serves as the image display surface.

Furthermore, since the liquid crystal display panel 10 is a reflective display panel which displays an image by reflecting external light that is incident from the image display surface side, basically a backlight is not arranged in the rear of the liquid crystal display panel 10.

However, in the case of configuring the reflective display device of the present invention as a semi-transmissive display device, a backlight may be arranged therein.

2. Reflective Display Panel

As illustrated in FIG. 1, the liquid crystal display panel 10 as a reflective display panel includes, for example, a thin film transistor (TFT) substrate 11 and a counter substrate 12 that face each other with a predetermined gap disposed therebetween; and a liquid crystal layer 13 provided between the TFT substrate 11 and the counter substrate 12.

Such a liquid crystal layer 13 is configured to include, for example, a nematic liquid crystal, and as will be described below, the liquid crystal layer 13 has a modulation function of transmitting or blocking the light incident to the liquid crystal layer 13 in each pixel by means of the voltage applied by the driving circuit 30. Thus, gradation in each pixel is regulated by changing the light transmission level of the liquid crystal.

Furthermore, the TFT substrate 11 has plural pixel electrodes, which are each provided with a pixel circuit, on a substrate formed from, for example, a glass substrate.

Such a pixel circuit is configured to include, for example, a TFT and a capacity element.

Furthermore, the TFT substrate 11 has an oriented film, and also has a reflective plate 14 that reflects light incident through the lateral sides of the liquid crystal layer 13.

Furthermore, the counter substrate 12 is a substrate formed from, for example, a glass substrate, and has a common electrode on the surface of the side facing the TFT substrate 11.

Such a counter substrate 12 has an oriented film, and also has color filters in the region facing the pixel electrode, while having a light shielding film in the region that is not facing the pixel electrode.

Also, the plural pixel electrodes are intended to drive the liquid crystal layer 13 together with the common electrode on the counter substrate 12 side, and are two-dimensionally arranged on the TFT substrate 11.

Furthermore, the common electrode is two-dimensionally arranged on the counter substrate 12 so as to face the respective pixel electrodes.

These pixel electrodes and the common electrode are designed such that when a voltage is applied by the driving circuit 30, an electric field corresponding to the potential difference of the pixel electrodes and the common electrode is generated between the pixel electrodes and the common electrode, and the liquid crystal layer 13 is driven in accordance with the size of the electric field.

Meanwhile, in regard to the liquid crystal display panel 10, the part at which a pixel electrode and the common electrode face each other is called a pixel, and such a pixel constitutes the minimum unit capable of partially driving the liquid crystal layer.

Furthermore, the reflective plate 14 may be composed of pixel electrodes on the TFT substrate 11, or may be provided separately from the pixel electrodes.

When the reflective plate 14 is composed of pixel electrodes, the pixel electrodes are formed from an electroconductive material that reflects visible light, and when the reflective plate 14 is provided separately from the pixel electrodes, the pixel electrodes may be formed from an electroconductive material that reflects visible light, or may be formed from an electroconductive material that transmits visible light, such as indium-tin oxide (ITO).

On the other hand, the common electrode is formed from an electroconductive material that transmits visible light, such as ITO.

Furthermore, the oriented film is to orient liquid crystal molecules in the liquid crystal layer 13 in a predetermined direction, and the oriented film is in direct contact with the liquid crystal layer 13.

Such an oriented film is formed of, for example, a polymer material such as polyimide, and can be formed by, for example, applying a rubbing treatment to coated polyimide or the like.

Furthermore, a substrate having color filters is configured such that color filters intended to subject the light that has been transmitted through the liquid crystal layer 13 from the reflective plate 14 side, to color separation into, for example, the three primary colors of red, green and blue, are arranged correspondingly to the pixels.

Furthermore, the light shielding film has, for example, a function of absorbing visible light, and is formed between a pixel and a pixel.

Meanwhile, regarding the kind of the liquid crystal used in the liquid crystal layer 13, in addition to the nematic liquid crystal described above, a cholesteric liquid crystal, a smectic liquid crystal, a blue phase liquid crystal, a ferroelectric liquid crystal, and the like can be used.

Furthermore, in regard to the operation mode of the liquid crystal display panel, all kinds of operation modes such as a TN (Twisted Nematic) mode, a STN (Super Twisted Nematic) mode, an ECB (Electrically Controlled Birefringence) mode, an IPS (In-Plane Switching) mode, a super-IPS mode, and a MVA (Multidomain Vertical Alignment) mode can be utilized.

Furthermore, the reflective display panel according to the present invention is not intended to be limited to the liquid crystal display panel described above, and an electrophoresis system display panel, a microelectromechanical system (MEMS) shutter system display panel, and an electrowetting system display panel can be used.

The reason for this is that, with such a display panel, light incident to the panel can be transmitted or blocked in each of the pixels by the voltage applied by the driving circuit similarly to the liquid crystal display panel described above, and the gradation in each pixel can be regulated by chancing the light transmission level.

Meanwhile, an example of the electrophoresis system display panel is an electronic paper having a bilayer structure composed of a first layer accommodating cyan and yellow particles together with a liquid, and a second layer accommodating magenta and black particles together with a liquid, or a single layer structure composed only of a layer accommodating black particles together with a liquid.

It is preferable that such an electronic paper employs a so-called lateral electric field system in which the particles accommodated in various layers are migrated in a horizontal direction in the liquid by the voltage applied by a driving circuit, and thereby a black state, a transparent state, and a color display state can be appropriately switched.

More specifically, when all particles are migrated below the electrode at a screen edge, the display becomes transparent, and when all the particles are diffused in the screen, the display becomes black. Thus, even a color display is enabled by controlling the positions of the respective particles.

Furthermore, in such a lateral electric field system, the light transmission level of the entire screen can be controlled as if the entire screen acts as one pixel.

Also, a MEMS (Micro Electro Mechanical System) shutter system display panel refers to a system in which fine shutters are arranged on a surface such that each shutter represents one pixel.

In such a MEMS shutter system display panel, the light transmission level of each pixel is controlled by opening and closing a fine shutter at a high speed by the voltage applied by the driving circuit.

Furthermore, an electrowetting system display panel refers to a system in which water and colored oil droplets are accommodated in fine transparent microcapsules, and the microcapsules are arranged on a surface such that each microcapsule represents one pixel.

In such an electrowetting system display panel, the light transmission level of each pixel is controlled by altering wettability of the colored oil droplets by the voltage applied by the driving circuit, and thereby changing the shape of the oil droplets.

Furthermore, the reflective display panel is preferably a semi-transmissive display panel, and particularly preferably a semi-transmissive liquid crystal display panel.

The reason for this is that when a semi-transmissive display panel is used, a semi-transmissive display device which can efficiently diffuse and emit an external light incident from a wide range of angles toward the front of the display device as image display light, and can display an image by utilizing a backlight even in an environment in which external light is insufficient, can be obtained.

Here, the semi-transmissive liquid crystal display panel is a system designed to make an image satisfactorily visible both indoors and outdoors, and generally, a semi-transmissive liquid crystal display panel has a transmission region and a reflection region within one pixel.

Among these, the transmission region has a transparent electrode, and the display panel exhibits a function as a transmissive liquid crystal display device by transmitting the light emitted from a backlight in the transmission region.

On the other hand, the reflection region has a reflecting electrode, and the display panel exhibits a function as a reflective liquid crystal display device by reflecting external light in the reflection region.

Furthermore, there is also available a semi-transmissive liquid crystal display panel which does not delimit the pixels into transmission regions and reflection regions, but utilizes transmission and reflection of light by means of a reflective polarizing plate, and this is also applicable.

3. Optical Laminate

As illustrated in FIG. 1, an optical laminate 20 includes an optical-diffusion film 100, a λ/4 plate 21, a λ/2 plate 22, and a polarizing plate 23 in this order from the side of the liquid crystal display panel 10.

However, such an order of lamination is just an example, and the optical-diffusion film 100 may be disposed between the λ/4 plate 21 and the λ/2 plate 22, or may be disposed between the λ/2 plate 22 and the polarizing plate 23, or may be disposed above the polarizing plate 23.

Furthermore, the optical laminate 20 and the liquid crystal display panel 10 are, for example, bonded to each other with a tacky adhesive or an adhesive, and the various members that constitute the optical laminate 20 are also bonded in the same manner.

Meanwhile, in a case in which the reflective display panel is a display panel other than a liquid crystal display panel, it is not necessary to use a λ/4 plate, a λ/2 plate, and a polarizing plate.

(1) Retardation Plate

Regarding the λ/4 plate 21, which is a retardation plate, for example, a uniaxially stretched film of a cycloolefin resin, a polycarbonate resin or the like can be used.

Furthermore, the retardation is, for example, 0.14 μm, and this corresponds to about ¼ of the green light wavelength, which has the highest luminous sensitivity to visible light.

Therefore, the λ/4 plate 21 has a function of converting a linearly polarized light incident from the side of the polarizing plate 23, to a circularly polarized light.

The λ/2 plate 22, which is another retarding plate, is a uniaxially stretched film of, for example, a polycarbonate resin.

Furthermore, the retardation is, for example, 0.27 μm, and corresponds to about ½ of the green light wavelength, which has the highest luminous sensitivity to visible light.

Here, the λ/4 plate 21 and the λ/2 plate 22 has, as an integral unit of these λ/4 plate 21 and λ/2 plate 22, a function of converting linearly polarized light incident from the polarizing plate 23 side to circularly polarized light, and functions as a circularly polarizing plate for a wide range of wavelengths.

(2) Polarizing Plate

The polarizing plate 23 has a function of converting external light incident from the outside to linearly polarized light by absorbing predetermined linearly polarized light components while transmitting ht other polarized light components.

Such a polarizing plate 23 can be constructed by interposing a stretched polymer film of polyvinyl alcohol (PVA) adsorbed with, for example, a halogen substance such as iodine or a dichroic dye, between triacetyl cellulose (TAC) films.

(3) Optical-Diffusion Film

The optical-diffusion film 100 has a function of diffusing and emitting an external light incident from a wide range of angles toward the front of the display device as image display light, by means of a reflective plate 14.

Furthermore, the reflective display device of the present invention is characterized by such an optical-diffusion film.

That is, the optical-diffusion film according to the present invention is a single-layered optical-diffusion film formed by photocuring a predetermined composition for optical-diffusion film, and is characterized by having a predetermined film thickness and predetermined optical-diffusion characteristics.

Hereinafter, the optical-diffusion film according to the present invention will be specifically explained.

(3)-1 Basic Principle of Optical-Diffusion in Optical-Diffusion Film

The optical-diffusion film according to the present invention is an optical-diffusion film formed by photocuring a composition for optical-diffusion film including two or more kinds of polymerizable compounds having different refractive indices.

Therefore, the optical-diffusion film according to the present invention constitutes an optical-diffusion film having a predetermined internal structure in which regions having a relatively high refractive index and regions having a relatively low refractive index are formed in a predetermined pattern.

First of all, the basic principle of such an optical-diffusion film will be explained using FIGS. 2 and 3.

Figure 2A:
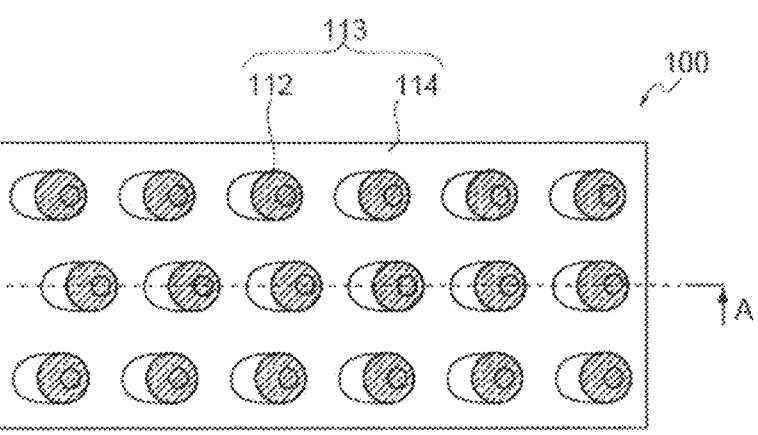
FIGS. 2(a) and 2(b) are diagrams provided to explain an outline of an optical-diffusion film having a columnar structure within the film.
Figure 2B:
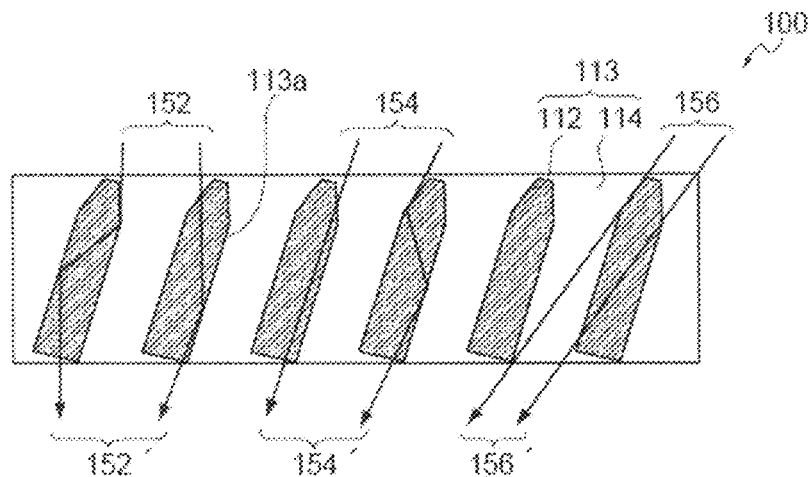

First, FIG. 2(a) shows a top view (plan view) of the optical-diffusion film 100, and FIG. 2(b) shows a cross-sectional view of the optical-diffusion film 100 obtainable when the optical-diffusion film 100 shown in FIG. 2(a) is cut in the vertical direction along the dotted line A-A, and the cut surface is viewed from the direction indicated by the arrow.

Figure 3A:
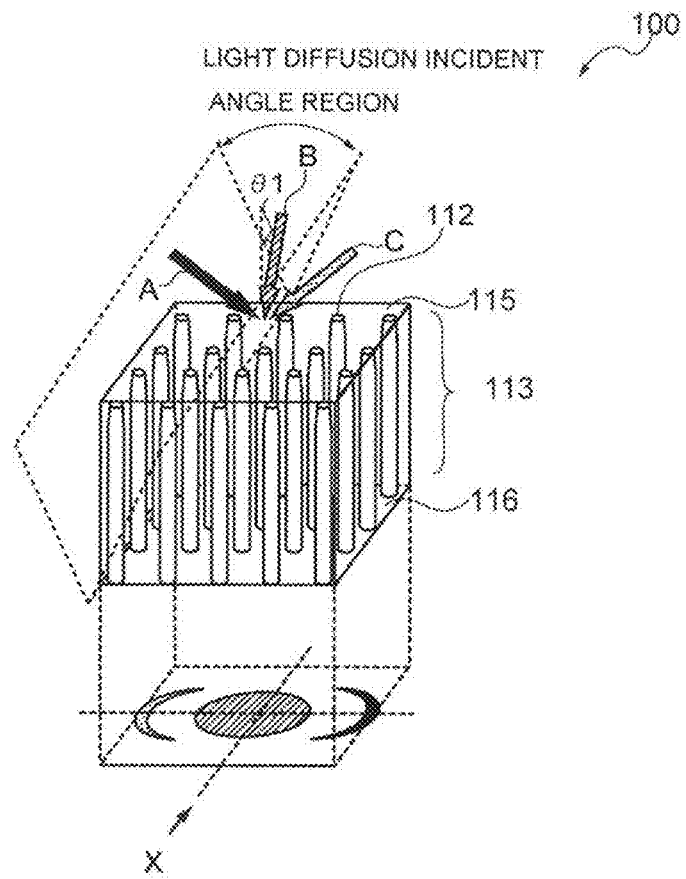
FIGS. 3(a) and 3(b) are diagrams provided to explain the incident angle dependency and isotropic optical-diffusion in an optical-diffusion film having a columnar structure within the film.
Figure 3B:
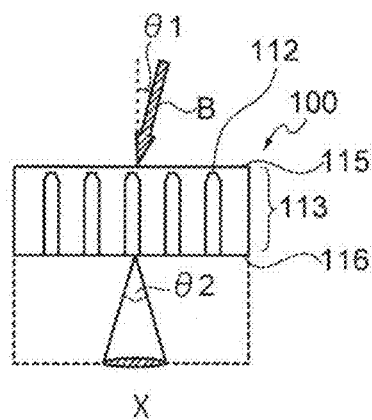

Furthermore, FIG. 3(a) shows an overview of the optical-diffusion film 100, and FIG. 3(b) shows a cross-sectional view obtainable when the optical-diffusion film 100 of FIG. 3(a) is viewed in the X-direction.

As illustrated in such a plan view of FIG. 2(a), the optical-diffusion film 100 has a columnar structure 113 including pillar-shaped objects having a relatively high refractive index 112 and a region having a relatively low refractive index 114.

Furthermore, as illustrated in the cross-sectional view of FIG. 2(b), in the vertical direction of the optical-diffusion film 100, the pillar-shaped objects having a relatively high refractive index 112 and the region having a relatively low refractive index 114 respectively have predetermined widths and are thereby in a state of being alternately arranged.

Thereby, as illustrated in FIG. 3(a), it is speculated that when the incident angle is within the optical-diffusion incident angle region, incident light is diffused by the optical-diffusion film 100.

That is, as illustrated in FIG. 2(b), it is speculated that when the incident angle of incident light with respect to the optical-diffusion film 100 has a value from parallel to a predetermined angle range, that is, a value within the optical-diffusion incident angle region, with respect to the boundary surface 113a of the columnar structure 113, the incident light (152, 154) escapes from the interior of the pillar-shaped objects having a relatively high refractive index 112 in the columnar structure, along the film thickness direction while changing its direction, and thus the direction of propagation of light from the light exit surface side is not uniform.

As a result, when the incident angle is within the optical-diffusion incident angle region, it is speculated that incident light is diffused by the optical-diffusion film 100 and turns into diffused light (152', 154').

On the other hand, in a case in which the incident angle of incident light with respect to the optical-diffusion film 100 is not in the optical-diffusion incident angle region, it is speculated that, as illustrated in FIG. 2(b), the incident light 156 directly penetrates the optical-diffusion film 100, without being diffused by the optical-diffusion film, and turns into transmitted light 156'.

Meanwhile, the term "optical-diffusion incident angle region" as used in the present invention means the angle range of incident light corresponding to the emission of diffused light when the angle of incident light emitted from a point light source is changed in the optical-diffusion film.

Furthermore, such a "optical-diffusion incident angle region" represents, as illustrated in FIG. 3(a), an angle region determined uniquely for each optical-diffusion film, based on the difference in the refractive index, the angle of inclination or the like of the columnar structure in the optical-diffusion film.

According to the basic principle described above, the optical-diffusion film 100 having the columnar structure 113 is capable of exhibiting, for example, incident angle dependency in transmission and diffusion of light as illustrated in FIG. 3(a).

As illustrate in FIG. 2 and FIG. 3, an optical-diffusion film having the columnar structure 113 usually has "isotropy".

Here, the term "isotropy" as used in the present invention means that, as illustrated in FIG. 3(a), when incident light is diffused by a film, the diffusion condition (shape of spreading of diffused light) of the emitted light that has been diffused in a plane parallel to the film (meaning a plane parallel to any plane other than a cross-section of the film; hereinafter, the same applies) has a property of not varying with the direction in the same plane.

More specifically, as illustrated in FIG. 3(a), when incident light is diffused by a film, the diffusion condition of the emitted light that has been diffused is circular in shape within a plane parallel to the film.

Furthermore, as illustrated in FIG. 3(b), when the term "incident angle θ1" of incident light is used in the present invention, the incident angle θ1 means the angle (°) obtainable in a case in which the angle of the normal line to the incident side surface of the optical-diffusion film is designated as 0°.

Furthermore, according to the present invention, the term "optical-diffusion angle region" means the angle range of diffused light obtainable when a point light source is fixed at an angle at which incident light is diffused most in an optical-diffusion film.

Furthermore, according to the present invention, the "angle of aperture of diffused light" is the width of angle (°) of the "optical-diffusion angle region" described above, and means the angle of aperture of diffused light θ2 in a case in which a cross-section of the film is viewed as illustrated in FIG. 3(b).

Meanwhile, it has been recognized that the width of angle (°) of the optical-diffusion angle region and the width of the optical-diffusion incident angle region are approximately equal.

Furthermore, as illustrated in FIG. 3(a), in an optical-diffusion film, when incident angles of incident light are included in the optical-diffusion incident angle region, even if the incident angles are different, almost the same optical-diffusion can be achieved in the light exit surface side.

Therefore, it can be said that the resulting optical-diffusion film has a light-converging effect of concentrating light into a predetermined site.

Meanwhile, regarding the change of direction of incident light in the interior of the pillar-shaped objects 112 in the columnar structure, the case in which the change of direction is of step-index type, with the direction being changed from a straight line form to a zigzag form due to total reflection as illustrated in FIG. 2(b), as well as the case in which the change of direction is of gradient-index type, with the direction being changed to a curved from, may be considered.

Furthermore, in FIGS. 2(a) and 2(b), the boundary surface between the pillar-shaped objects having a relatively high refractive index 112 and the region having a relatively low refractive index 114 is indicated using a straight line for the purpose of simplicity; however, in reality, the interface is slightly meandering, and each of the pillar-shaped objects forms a complicated refractive index distribution structure accompanied by branching or disappearance.

As a result, it is speculated that a non-even distribution of optical characteristics increases light diffusibility.

(3)-2 Single Layer

Furthermore, the optical-diffusion film according to the present invention is characterized by being a single layer.

The reason for this is that the number of bonding processes can be reduced so that it is economically advantageous, as compared with the case of laminating plural optical-diffusion films, and also, the occurrence of blurring in the display image or the occurrence of delamination can also be suppressed effectively.

Meanwhile, in addition to the case in which plural optical-diffusion films are directly laminated, the case in which plural optical-diffusion films are laminated with other films and the like interposed therebetween, is also included in the case of having plural optical-diffusion films laminated.

(3)-3 Optical-Diffusion Characteristics

Figure 4A:
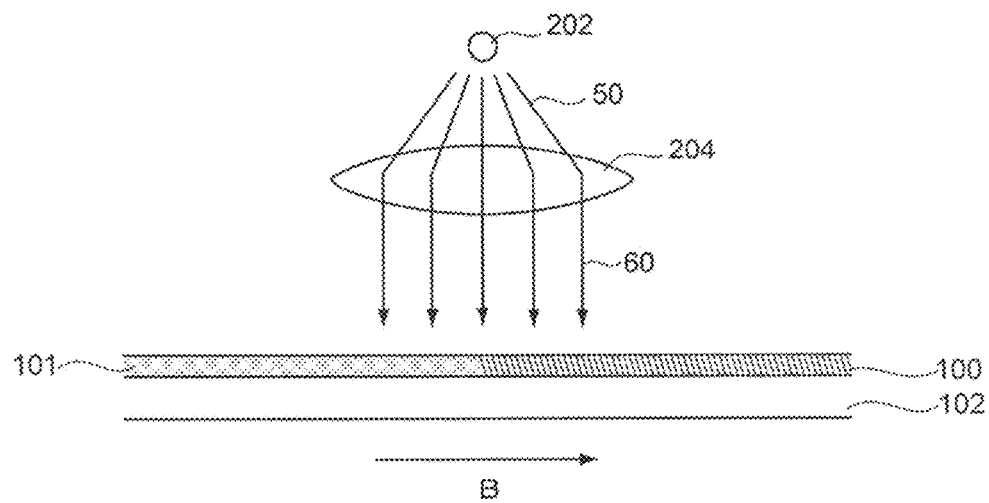
FIGS. 4(a) to 4(c) are diagrams provided to explain the method for analyzing the optical-diffusion characteristics of an optical-diffusion film.
Figure 4B:
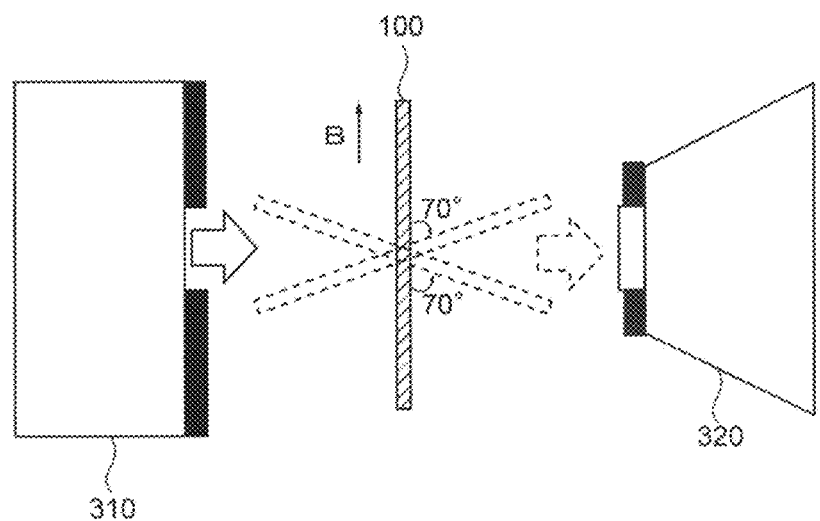
Figure 4C:
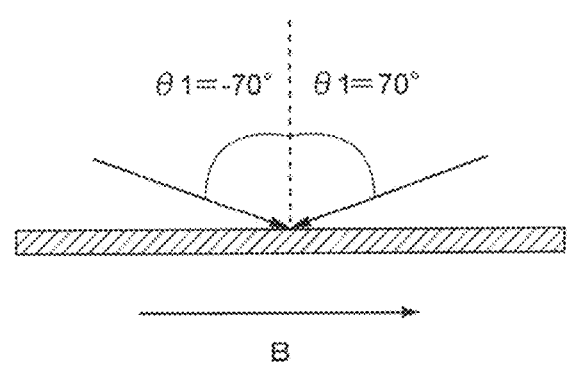
Figure 5:
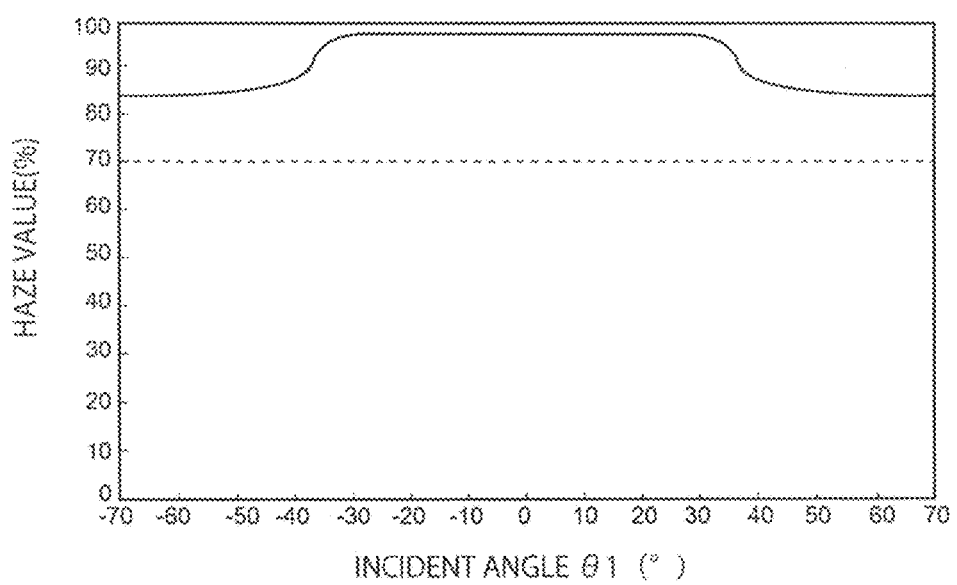
FIG. 5 is a diagram provided to explain the optical-diffusion characteristics of an optical-diffusion film.

Furthermore, the optical-diffusion characteristics according to the present invention is characterized in that, as illustrated in FIGS. 4(a) to 4(c), when a coating layer 101 formed by applying a composition for optical-diffusion film is photocured, and the incident angle θ1 with respect to the normal line of the film plane is varied within the range of −70° to 70° along the travel direction B of the coating layer 101 at the time of photocuring, as illustrated in FIG. 5, the haze value at each incident angle θ1 has a value of 70% or more.

The reason for this is that when the optical-diffusion film has such predetermined optical-diffusion characteristics, despite that the film is composed of a single layer, an external light incident from a wide range of angles can be efficiently diffused and emitted toward the front of the display as image display light.

That is, it is because when such a haze value has a value of below 70%, it may be difficult to diffuse and emit an external light incident at a corresponding incident angle θ1 toward the front of the display device as image display light.

Therefore, when a coating layer formed by applying a composition for optical-diffusion film in a film form is photocured, and the incident angle θ1 with respect to the normal line of the film plane is varied within the range of −70° to 70° along the travel direction of the coating layer at the time of photocuring, it is more preferable to adjust the haze value at each incident angle θ1 to a value of 75% or more, and even more preferable to a value of 80% or more.

Furthermore, it has been confirmed that usually, when the optical-diffusion characteristics described above are satisfactory on one surface of the film, the optical-diffusion characteristics are also satisfactory in the other surface; however, it has been confirmed that even in a case in which the optical-diffusion characteristics are satisfactory on only one surface, the effects of the present invention are obtained. Thus, it is needless to say that this is also included in the scope of the present invention.

FIG. 4(a) is a lateral view illustrating the situation in which irradiated light 50 from a point light source 202 is converted to parallel light 60 using a lens 204 and is irradiated to a coating layer 101 on a process sheet 102 that is moving along the travel direction B, and the coating layer 101 is photocured.

Furthermore, FIG. 4(b) is a lateral view illustrating the situation in which while the incident angle θ1 with respect to the normal line of the film plane is changed within the range of −70° to 70° along the travel direction B of the coating using a light source 310 and an integrating sphere 320, the haze value at each incident angle θ1 is measured.

Furthermore, FIG. 4(c) is a lateral view illustrating the situation in which the incident angle θ1 with respect to the film plane is varied within the range of −70° to 70°, in a state of having the film fixed.

Furthermore, FIG. 5 shows a characteristic curve (image diagram) in which the horizontal axis represents the incident angle θ1 (°) and the vertical axis represents the haze value (%).

Next, the relationship between the optical-diffusion characteristics of the optical-diffusion film described above and the diffuse emission of image display light in a reflective display device is explained using FIGS. 6 to 8.

Figure 6A:
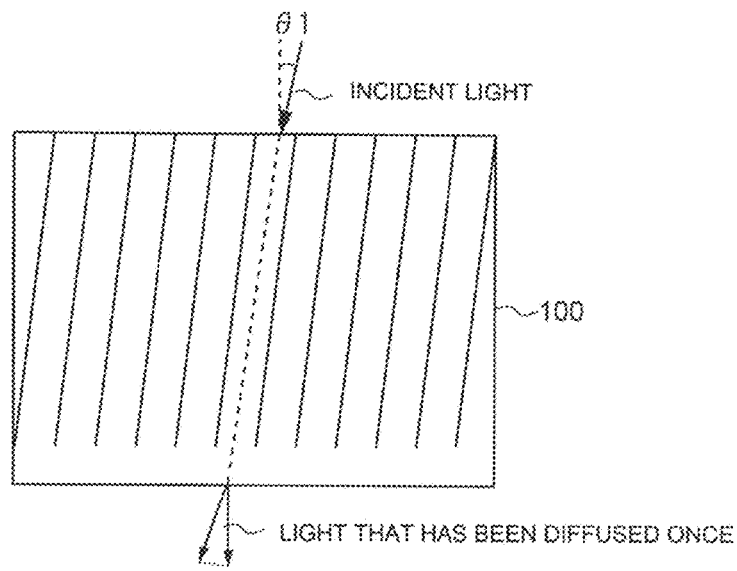
FIGS. 6(a) to 6(c) are diagrams provided to explain the relationship between the optical-diffusion characteristics of an optical-diffusion film and the diffuse emission of image display light in a reflective display device, by taking the optical-diffusion film of Example 1 as an example.

First, to explain an outline of these diagrams, FIG. 6(a) shows the situation in which light was made incident to the optical-diffusion film 100 of Example 1 at the incident angle θ1 and is diffused once.

Figure 6B:
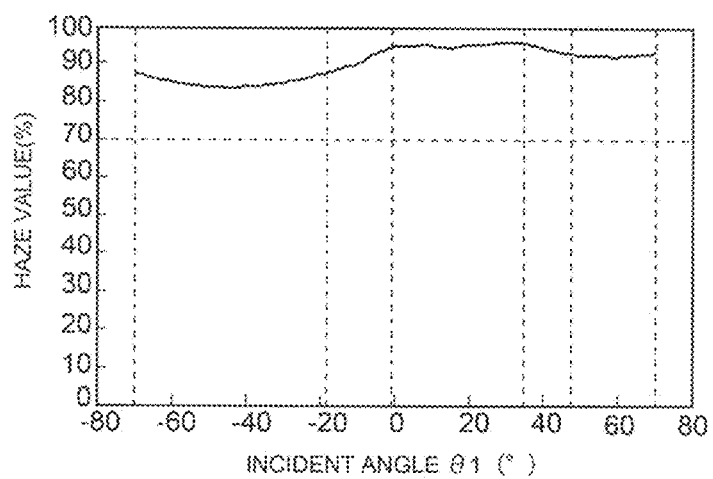

Furthermore, FIG. 6(b) shows an incident angle-haze value chart obtained by measuring the haze value (%) at each incident angle θ1 (°) when the incident angle θ1 of FIG. 6(a) was varied.

Figure 6C:
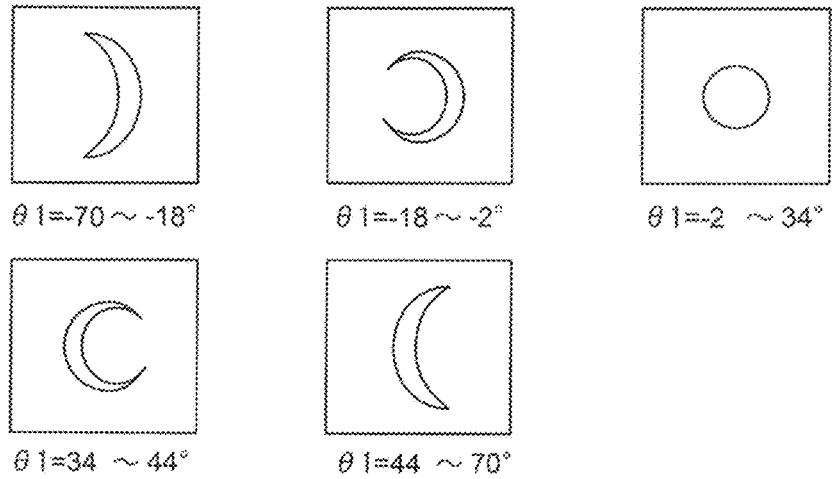

Also, FIG. 6(c) shows the diffusion condition (schematic diagram of a conoscopic image) of light diffused once for the range of various incident angles θ1 when the incident angle θ1 of FIG. 6(a) was varied.

Figure 7A:
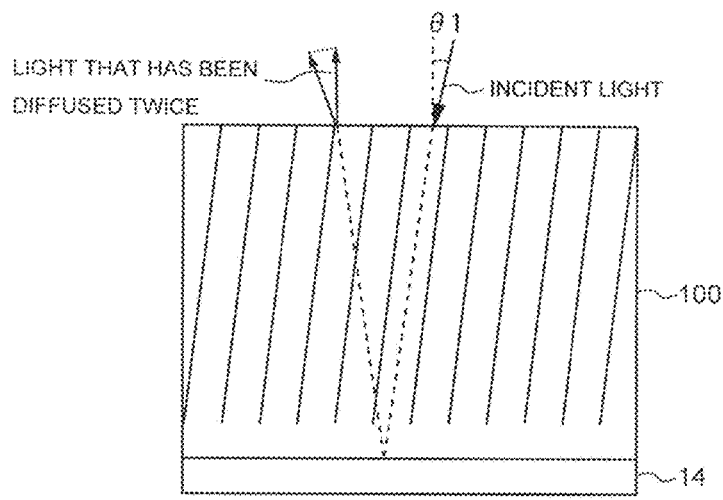
FIGS. 7(a) to 7(c) are other diagrams provided to explain the relationship between the optical-diffusion characteristics of an optical-diffusion film and the diffuse emission of image display light in a reflective display device, by taking the optical-diffusion film of Example 1 as an example.

Furthermore, FIG. 7(a) shows the situation in which the optical-diffusion film 100 of Example 1 was bonded to a reflective plate 14 to produce a specimen for measurement, light was made incident at the incident angle θ1 through the film side of the specimen, and the light was diffused two times through reflection at the reflective plate 14.

Figure 7B:
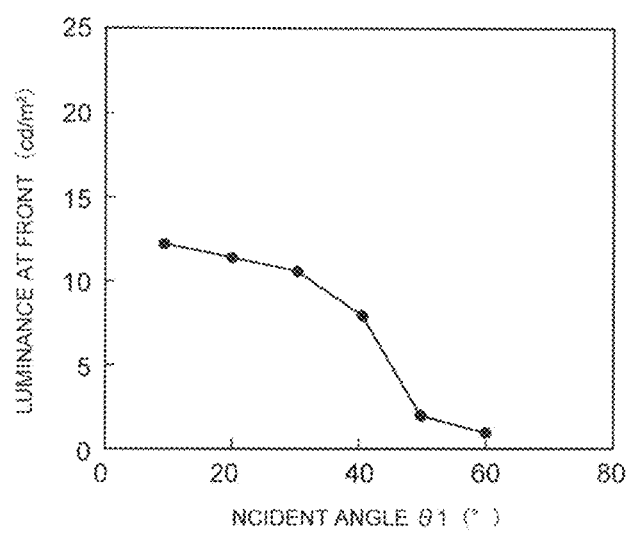

Also, FIG. 7(b) shows an incident angle-luminance chart obtained by measuring the luminance (cd/m²) of the film front at each incident angle θ1 (°) when the incident angle θ1 of FIG. 7(a) was varied.

Figure 7C:
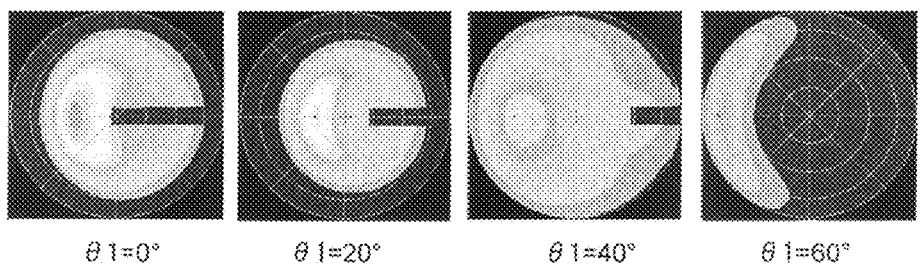

FIG. 7(c) shows the diffusion condition (conoscopic image) of light diffused two times at each incident angle θ1 when the incident angle θ1 of FIG. 7(a) was varied.

Figure 8A:
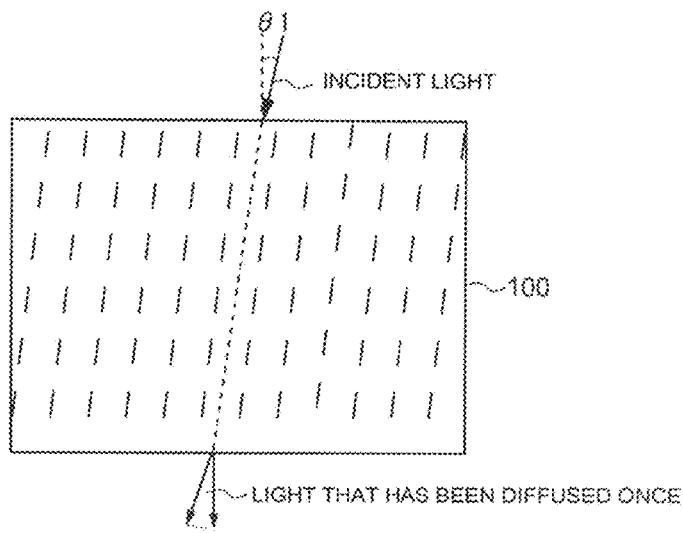
FIG. 8(a) to 8(c) are diagrams provided to explain the relationship between the optical-diffusion characteristics of an optical-diffusion film and the diffuse emission of image display light in a reflective display device, by taking the optical-diffusion film of Comparative Example 1 as an example.

Furthermore, FIG. 8(a) shows the situation in which light was made incident to the optical-diffusion film 100 of Comparative Example 1 at the incident angle θ1 and was diffused once.

Figure 8B:
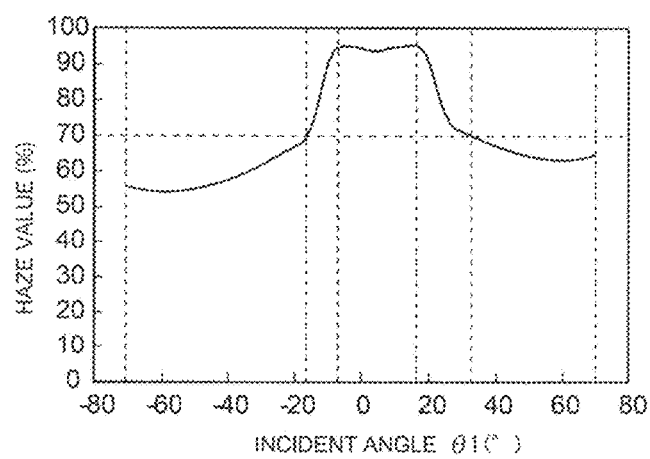

FIG. 8(b) shows an incident angle-haze value chart in which an incident angle-haze value chart obtained by measuring the haze value (%) at each incident angle θ1 (°) when the incident angle θ1 of FIG. 8(a) was varied.

Figure 8C:
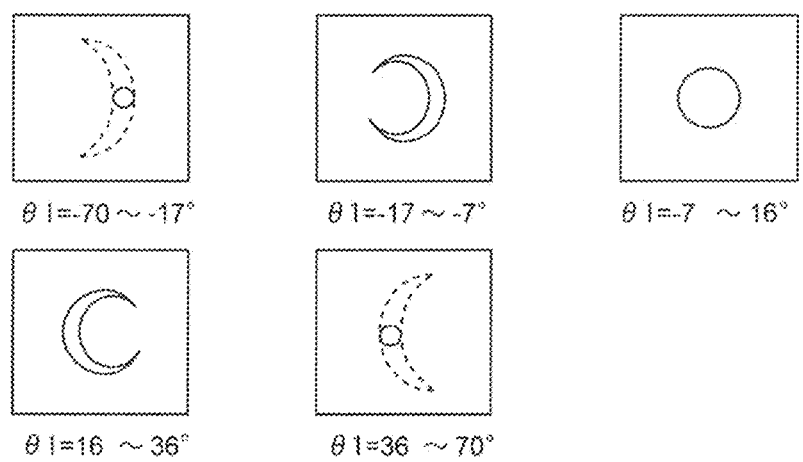

Furthermore, FIG. 8(c) shows the diffusion condition (schematic diagram of conoscopic image) of light diffused once within the range of various incident angles θ1 when the incident angle θ1 of FIG. 8(a) was varied.

Figure 9A:
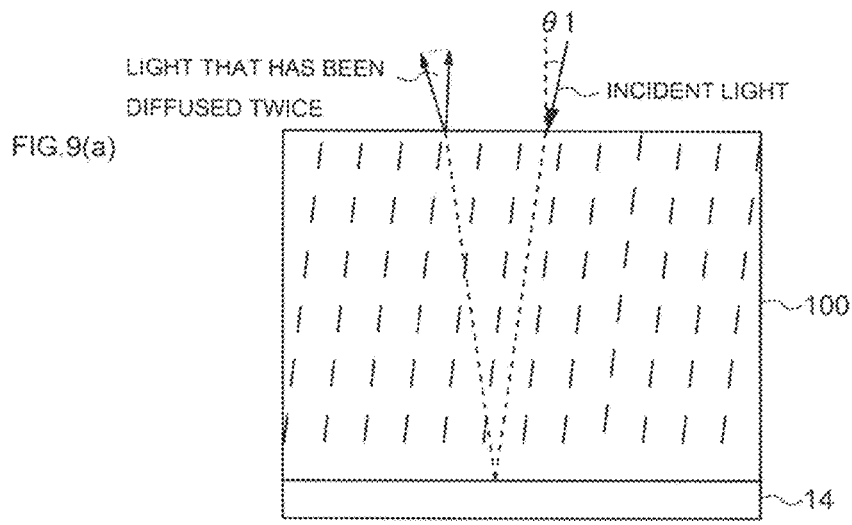
FIGS. 9(a) to 9(c) are other diagrams provided to explain the relationship between the optical-diffusion characteristics of an optical-diffusion film and the diffuse emission of image display light in a reflective display device, by taking the optical-diffusion film of Comparative Example 1 as an example.

Furthermore, FIG. 9(a) shows the situation in which the optical-diffusion film 100 of Comparative Example 1 was bonded to a reflective plate 14 to produce a specimen for measurement, light was made incident at the incident angle θ1 through the film side of the specimen, and the light was diffused two times through reflection at the reflective plate 14.

Figure 9B:
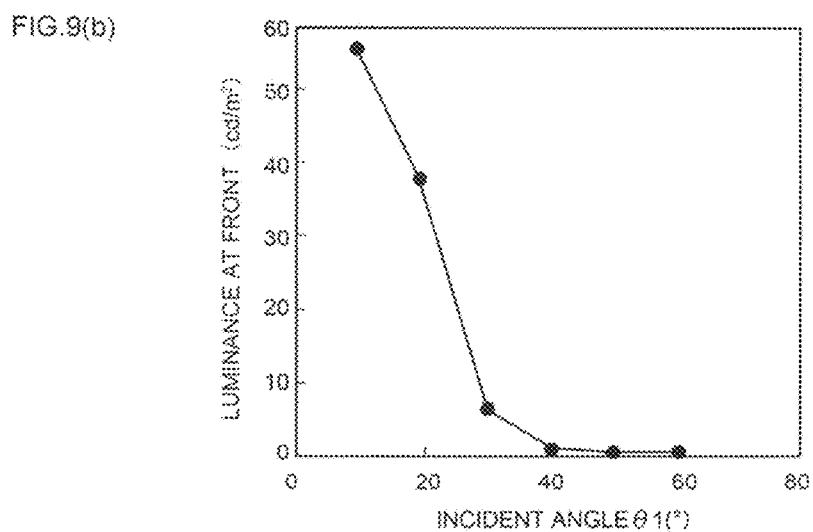

FIG. 9(b) shows an incident angle-luminance chart obtained by measuring the luminance (cd/m²) of the film front at each incident angle θ1 (°) when the incident angle θ1 of FIG. 9(a) was varied.

Figure 9C:
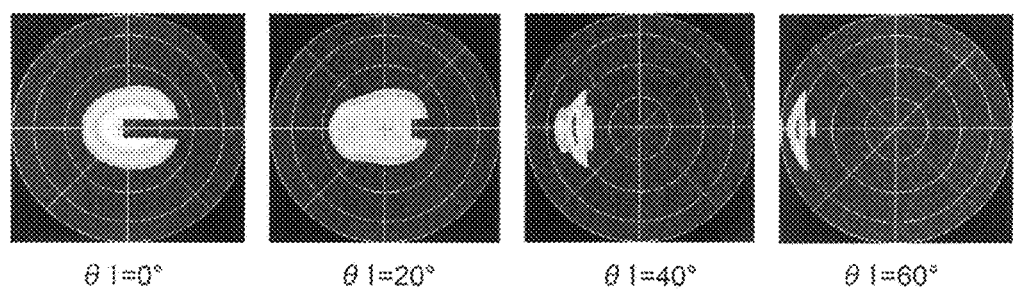

FIG. 9(c) shows the diffusion condition (conoscopic image) of light diffused two times at each incident angle θ1 when the incident angle θ1 of FIG. 9(a) was varied.

First, the optical-diffusion film 100 of Example 1 illustrated in FIG. 6(a) is such that when the incident angle θ1 is varied within the range of −70° to 70° as shown in the incident angle-haze value chart of FIG. 6(b), the haze value at each incident angle θ1 employs a value of 70% or more, and the requirement of the present invention is satisfied.

Furthermore, the diffusion conditions of light diffused once within the range of the incident angle θ1=−70° to −18°, −18° to −2°, −2° to 34°, 34° to 44°, and 44° to 70° in the incident angle-haze value chart of FIG. 6(b) are as shown in the schematic diagram of the conoscopic image of FIG. 6(c).

That is, it is understood that in the optical-diffusion film 100 of Example 1, when the incident angle θ1 is varied within the range of −70° to 70°, the haze value at each incident angle θ1 has a value of 70% or more, and therefore, as illustrated in FIG. 6(c), uniform diffused light with a less amount of linearly transmitted light can be obtained over the entire range of the incident angle $\theta 1=-70°$ to $70°$ (as the amount of linearly transmitted light is larger, the haze value is smaller).

More specifically, in regard to the range of the incident angle $\theta 1=-2°$ to $34°$, it is understood that since the incident angle $\theta 1$ corresponds to the optical-diffusion incident angle region explained using FIG. 3(a) and the like, circular-shaped isotropic optical-diffusion occurs as illustrated in FIG. 6(c).

On the other hand, in regard to the range of the incident angle $\theta 1=-70°$ to $-18°$, $-18°$, to $-2°$, $34°$ to $44°$, and $44°$ to $70°$, it is understood that since the incident angle $\theta 1$ corresponds to the range outside the optical-diffusion incident angle region explained using FIG. 3(a) or the like, circular-shaped isotropic optical-diffusion does not occur, and crescent-shaped optical-diffusion as shown in FIG. 6(c) occurs.

Here, in the previous explanation using FIG. 3(a) and the like, it is described that in the case in which the incident angle $\theta 1$ falls outside the range of the optical-diffusion incident angle region, incident light is transmitted without being diffused by the film.

However, such an explanation is given for the convenience to explain the optical-diffusion incident angle region associated with isotropic optical-diffusion in a more comprehensive manner, and in reality, it should be noted that the crescent-shaped diffused light is not transmitted light, but is literally diffused light.

Whatsoever, the optical-diffusion film 100 of Example 1 is such that when the incident angle $\theta 1$ is varied within the range of $-70°$ to $70°$, since the haze value at each incident angle $\theta 1$ has a value of 70% or more, there may be a difference between isotropic optical-diffusion and crescent-shaped optical-diffusion. However, it is understood that over the entire range of the incident angle $\theta 1=-70°$ to $70°$, uniform diffused light with a less amount of linearly transmitted light is obtained.

Thereby, when light at the incident angle $\theta 1$ is diffused two times in total through the reflection at the reflective plate 14 as illustrated in FIG. 7(a), the optical-diffusion film 100 of Example 1 illustrated in FIG. 6(a) can efficiently diffuse and emit the diffused light toward the front of the film.

That is, as shown in the incident angle $\theta 1$-luminance chart of FIG. 7(b), it is understood that when the incident angle $\theta 1$ is varied within the range of $0°$ to $60°$, the luminance of the film surface at each incident angle $\theta 1$ has a value of above 0 cd/m$^2$ at least within the range of the incident angle $\theta 1=0°$ to $50°$, and an incident light in a wide range can be efficiently diffused and emitted to the film front by diffusion of two times in total through reflection at the reflective plate 14.

This is speculated to be because when the optical-diffusion film of Example 1 is used, incident light can be uniformly diffused during the first diffusion, and therefore, even if the second diffusion through reflection at the reflective plate becomes non-uniform in the relationship between the reflection angle and the angle of incidence of the internal structure, consequently uniform diffused light can be emitted through the film plane side.

Furthermore, the model of diffusing light two times in total as illustrated in FIG. 7(a) is a model intended to analyze the optical-diffusion characteristics in a case in which the optical-diffusion film is applied to a reflective display device.

Meanwhile, FIG. 7(c) shows the diffusion condition (conoscopic image) of light that has been diffused two times at the incident angle $\theta 1=0°$, $20°$, $40°$ and $60°$, so that the actual situation may be illustrated more specifically.

That is, a luminance distribution from 0 cd/m$^2$ to the maximum luminance value in each conoscopic image is shown in division into fourteen stages from blue color to red color, with 0 cd/cm$^2$ representing blue, while the range of from a value exceeding 0 cd/m$^2$ to the maximum luminance value in each conoscopic image being equally divided into 13 stages, and as the value approaches from 0 cd/m$^2$ to the maximum luminance value, the color changes in thirteen stages from blue to light blue to green to yellow to orange to red.

Furthermore, the radially drawn lines in each conoscopic image represent the azimuthal directions $0°$ to $180°$, $45°$ to $225°$, $90°$ to $270°$, and $135°$ to $315°$, respectively, and the concentrically drawn lines represent the polar angle directions $18°$, $38°$, $58°$, and $78°$ in order from the inner side.

Therefore, the color at the central portion of the various concentric circles in each conoscopic image represents the relative luminance of diffused light that has been diffused and emitted toward the film front, and the absolute luminance at the central portion of the various concentric circles corresponds to the value on the vertical axis of each plot in FIG. 7(b).

On the other hand, the optical-diffusion film 100 of Comparative Example 1 shown in FIG. 8(a) was such that, as shown in the incident angle-haze value chart of FIG. 8(b), when the incident angle $\theta 1$ was varied within the range of $-70°$ to $70°$, there were occasions in which the haze value had a value of below 70% depending on the value of the incident angle $\theta 1$, and the optical-diffusion film did not satisfy the requirement of the present invention.

Furthermore, the diffusion conditions of light that have been diffused once within the range of the incident angle $\theta 1=-70°$ to $-17°$, $-17°$ to $-7°$, $-7°$ to $16°$, $16°$ to $36°$, and $36°$ to $70°$ in the incident angle-haze value chart of FIG. 8(b) are respectively as shown in the schematic diagrams of the conoscopic images of FIG. 8(c).

That is, in regard to the optical-diffusion film 100 of Comparative Example 1, when the incident angle $\theta 1$ was varied within the range of $-70°$ to $70°$, there were occasions in which the haze value had a value of below 70% depending on the value of the incident angle $\theta 1$, and therefore, as illustrated in FIG. 8(c), it is understood that in such a range of incident angle $\theta 1$, the amount of linearly transmitted light increases, and uniform diffused light may not be obtained.

More specifically, within the range of the incident angle $\theta 1=-7°$ to $16°$, the incident angle $\theta 1$ falls in the optical-diffusion incident angle region explained using FIG. 3(a) and the like, and since the haze value has a value of 70% or more, it is understood that circular-shaped isotropic optical-diffusion occurs as shown in FIG. 8(c).

On the other hand, within the range of the incident angle $\theta 1=-17°$ to $-7°$ and $16°$ to $36°$, the incident angle $\theta 1$ corresponds to the range outside the optical-diffusion incident angle region explained using FIG. 3(a) and the like, and the haze value has a value of 70% or more. Therefore, it is understood that circular-shaped isotropic optical-diffusion does not occur, and as shown in FIG. 8(c), crescent-shaped optical-diffusion occurs.

On the other hand, within the range of the incident angle $\theta 1=-70°$ to $-17°$ and $36°$ to $70°$, the incident angle $\theta 1$ corresponds to the range outside the optical-diffusion incident angle region explained using FIG. 3(a) and the like, and the haze value has a value of below 70%. Therefore, it is understood that while crescent-shaped optical-diffusion occurs as a contour, non-uniform optical-diffusion occurs in which strong linearly transmitted light appears at the central portion.

Therefore, regarding the optical-diffusion film 100 of Comparative Example 1, when the incident angle θ1 is varied within the range of −70° to 70°, the haze value may have a value of below 70% depending on the value of the incident angle θ1. Therefore, it is understood that for such a range of the incident angle θ1, crescent-shaped optical-diffusion occurs as a contour, but the amount of linearly transmitted light increases, and uniform diffused light may not be obtained.

As a result, in the optical-diffusion film 100 of Comparative Example 1 illustrated in FIG. 8(a), when light at the incident angle θ1 is diffused two times in total through reflection at the reflective plate 14 as illustrated in FIG. 9(a), it is difficult to efficiently diffuse and emit the diffused light to the film front.

That is, it is understood that when the incident angle θ1 is varied within the range of 0° to 60° as shown in the incident angle θ1-luminance chart of FIG. 9(b), the luminance at the film surface with respect to each incident angle θ1 does not have a value above 0 cd/m$^2$ in the outside of the range of the incident angle θ1=0° to 30°, and incident angle of a wide range may not efficiently diffuse and emit toward the film front by diffusion for two times through reflection at the reflective plate 14.

Furthermore, it is also understood that since the luminance at the film surface undergoes a noticeable decrease when the incident angle θ1 is varied from 20° to 30°, substantially, light can be efficiently diffused and emitted toward to the film front only in a narrow range of the incident angle θ1=0° to 20°.

This is speculated to be because, in the optical-diffusion film of Comparative Example 1, when the absolute value of the incident angle θ1 is large in the first diffusion, incident light may not be uniformly diffused, and therefore, when the second diffusion through reflection at the reflective plate becomes non-uniform in the relationship between the reflection angle and the angle of inclination of the internal structure, uniform diffused light may not be emitted through the film plane surface.

That is, it is speculated that when the diffused light that is emitted through the film plane side becomes non-uniform, since the diffused light is usually emitted at a relatively high luminance at angles other than the film front, the luminance at the film front is relatively prone to decrease.

Meanwhile, FIG. 9(c) shows the diffusion condition (conoscopic image) of light that has been diffused two times at the incident angles θ1=0°, 20°, 40°, and 60°, so that the actual shape can be illustrated more specifically.

Therefore, similarly to the case of FIG. 7(c), the color at the central portion of the various concentric circles in each conoscopic image represents the relative luminance of diffused light that has been diffused and emitted toward the film front, and the absolute luminance at the central portion of the various concentric circles corresponds to the value on the vertical axis of each plot in FIG. 9(b).

(3)-4 Internal Structure

The optical-diffusion film according to the present invention constitutes an optical-diffusion film having a predetermined internal structure in which regions having a relatively high refractive index and regions having relatively low refractive index are formed in a predetermined pattern within the film; however, the predetermined internal structure is not particularly limited.

However, from the viewpoint of stably manifesting the predetermined optical-diffusion characteristics described above, it is preferable that the optical-diffusion film according to the present invention is an optical-diffusion film having a columnar structure in which plural pillar-shaped objects having a relatively high refractive index are arranged to stand close together in the film thickness direction in a region having a relatively low refractive index, and at the same time, when one surface of the optical-diffusion film is designated as a first surface, and the other surface is designated as a second surface, the pillar-shaped objects are modified pillar-shaped objects composed of pillar-shaped objects that have their shape changed from the first surface toward the second surface.

The reason for this is that in the case of an optical-diffusion film having, within the film, a louver structure in which plural plate-shaped regions are alternately arranged along any one arbitrary direction along the film plane, or a columnar structure in which conventional pillar-shaped objects that do not have the shape changed from the first surface toward the second surface, it has been confirmed that the predetermined optical-diffusion characteristics described above may not be stably obtained.

On the contrary, it is because in the case of an optical-diffusion film having a columnar structure composed of modified pillar-shaped objects having their shape changed from a first surface to a second surface, it has been confirmed that the predetermined optical-diffusion characteristics described above are stably obtained.

Hereinafter, the columnar structure composed of modified pillar-shaped objects will be explained specifically.

More specifically, as illustrated in FIG. 3(a), it is preferable that in the modified pillar-shaped objects 112, the diameter increases from the first surface 115 toward the second surface 116.

The reason for this is that when such a columnar structure having modified pillar-shaped objects is formed, predetermined optical-diffusion characteristics can be imparted more stably to the optical-diffusion film.

That is, it is because when such modified pillar-shaped objects are used, it is difficult even for a light that is parallel to the axial line direction of the pillar-shaped objects, to be transmitted straight as compared with the case of conventional pillar-shaped objects, and therefore, predetermined optical-diffusion characteristics can be imparted more stably to the optical-diffusion film.

Figure 10A:
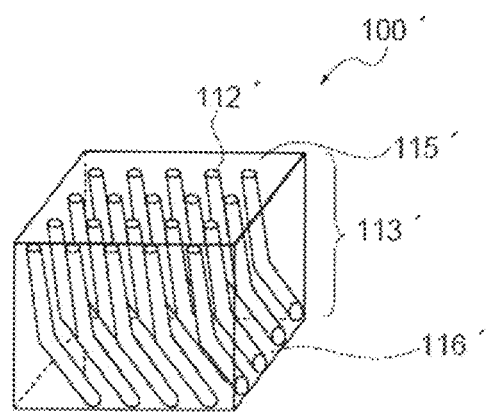
FIGS. 10(a) and 10(b) are other diagrams provided to explain an optical-diffusion film having a columnar structure within the film.

Furthermore, as illustrated in FIG. 10(a), it is preferable that the modified pillar-shaped objects 112' have a bent part in the middle of the pillar-shaped objects.

The reason for this is that when a columnar structure having such modified pillar-shaped objects is formed, predetermined optical-diffusion characteristics can be imparted more stably to the optical-diffusion film.

That is, it is because when such modified pillar-shaped objects are used, not only it is difficult for light to be transmitted straight, but also the angle of aperture of diffused light can be extended, as compared with the case of conventional pillar-shaped objects, and therefore, predetermined optical-diffusion characteristics can be imparted more stably to the optical-diffusion film.

Figure 10B:
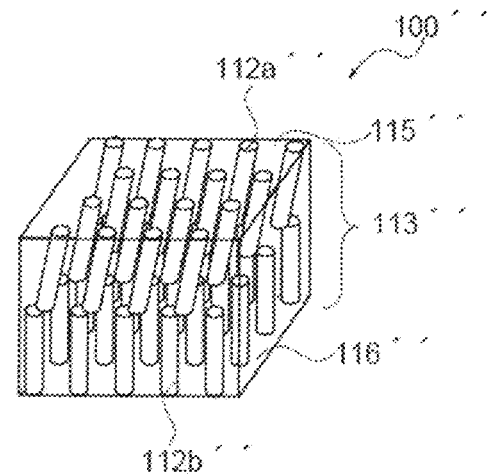

Furthermore, as illustrated in FIG. 10(b), it is preferable that the modified pillar-shaped objects 112" are composed of first pillar-shaped objects 112a" positioned on the side of the first surface 115", and second pillar-shaped objects 112b" positioned on the side of the second surface 116".

The reason for this is that when a columnar structure having such modified pillar-shaped objects is formed, predetermined optical-diffusion characteristics can be imparted more stably to the optical-diffusion film, and also, the optical-diffusion characteristics thus obtained can be controlled efficiently.

That is, it is because when such modified pillar-shaped objects are used, not only it is difficult for light to be transmitted straight, but also the angle of aperture of diffused light can be extended, and therefore, predetermined optical-diffusion characteristics can be imparted more stably to the optical-diffusion film.

Furthermore, it is also preferable have an overlapping columnar structure region in which the upper end of the second pillar-shaped objects and the lower end of the first pillar-shaped objects are formed to be overlapping alternately as in the case of the optical-diffusion film of Example 3 described below.

The reason for this is that when such an overlapping columnar structure region is included, the occurrence of scattered light in a pillar-shaped object-unformed portion between the first and second pillar-shaped objects can be suppressed, and uniformity of the intensity of diffused light within the optical-diffusion angle region can be further enhanced.

(i) Refractive Index

In regard to the columnar structure, it is preferable that the difference between the refractive index of the pillar-shaped objects having a relatively high refractive index and the refractive index of the region having a relatively low refractive index is adjusted to a value of 0.01 or more.

The reason for this is that when such a difference in the refractive index is adjusted to a value of 0.01 or more, incident light can be reflected stably within the columnar structure, the incident angle dependency originating from the columnar structure can be further increased, and the distinction between the optical-diffusion incident angle region and the non-optical-diffusion incident angle region can be clearly controlled.

More specifically, it is because if such a difference in the refractive index has a value of below 0.01, the range of angle at which incident light is totally reflected within the columnar structure is narrowed, and therefore, the incident angle dependency may be decreased excessively.

Therefore, it is more preferable that the difference between the refractive index of the pillar-shaped objects having a relatively high refractive index and the refractive index of the region having a relatively low refractive index is adjusted to a value of 0.05 or more, and even more preferably to a value of 0.1 or more.

Incidentally, it is more preferable as the difference between the refractive index of the pillar-shaped objects having a relatively high refractive index and the refractive index of the region having a relatively low refractive index is larger; however, from the viewpoint of appropriately selecting a material capable of forming a bent columnar structure, a difference of about 0.3 may be considered as the upper limit.

(ii) Maximum Diameter

Figure 11A:
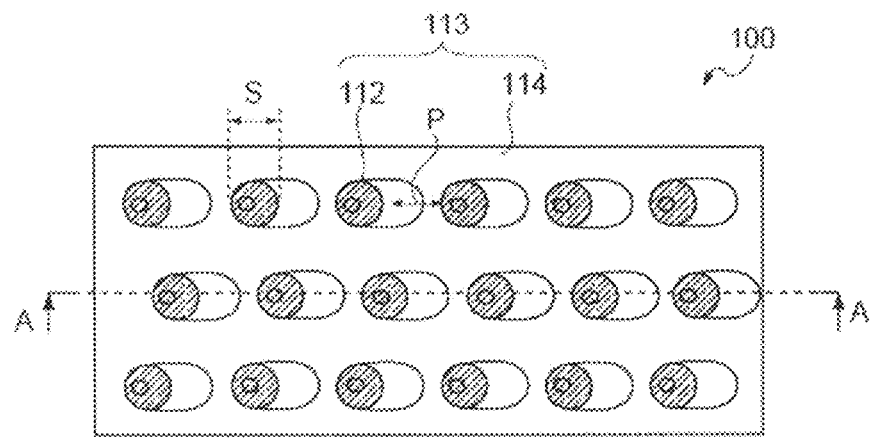
FIGS. 11(a) and 11(b) are diagrams provided to explain the columnar structure.

Furthermore, as illustrated in FIG. 11(a), it is preferable that the maximum diameter S in a cross-section of a pillar-shaped object in the columnar structure is adjusted to a value within the range of 0.1 to 15 µm.

The reason for this is that when such a maximum diameter is adjusted to a value within the range of 0.1 to 15 µm, incident light can be reflected more stably within the columnar structure, and the incident angle dependency originating from the columnar structure can be enhanced more effectively.

That is, it is because if such a maximum diameter has a value of below 0.1 µm, it may be difficult to manifest light diffusibility, irrespective of the incident angle of incident light. On the other hand, it is because if such a maximum diameter has a value of above 15 µm, the amount of light that propagates straight within the columnar structure increases, and the uniformity of diffused light may be deteriorated.

Therefore, in regard to the columnar structure, it is more preferable that the maximum diameter in a cross-section of a pillar-shaped object is adjusted to a value within the range of 0.5 to 10 µm, and even more preferably to a value within the range of 1 to 5 µm.

Incidentally, the cross-sectional shape of the pillar-shaped objects is not particularly limited; however, it is preferable to have, for example, a circular shape, an elliptical shape, a polygonal shape, or an irregular shape for the cross-sectional shape.

Furthermore, the cross-section of a pillar-shaped object means a cross-section cut by a plane that is parallel to the film surface.

Meanwhile, the maximum diameter, length and the like of a pillar-shaped object can be measured by observing the pillar-shaped object with an opto-digital microscope.

(iii) Distance Between Pillar-Shaped Objects

Furthermore, as illustrated in FIG. 11(a), in regard to the columnar structure, it is preferable that the distance between pillar-shaped objects, that is, the space P between adjacent pillar-shaped objects, is adjusted to a value within the range of 0.1 to 15 µm.

The reason for this is that when such a distance is adjusted to a value within the range of 0.1 to 15 µm, incident light can be reflected more stably within the columnar structure, and the incident angle dependency originating from the columnar structure can be further enhanced.

That is, it is because if such a distance has a value of below 0.1 µm, it may be difficult to manifest light diffusibility irrespective of the incident angle of incident light. On the other hand, it is because if such a distance has a value of above 15 µm, the amount of light that propagates straight within the columnar structure increases, and the uniformity of diffused light may be deteriorated.

Therefore, in regard to the columnar structure, it is more preferable that the distance between the pillar-shaped objects is adjusted to a value within the range of 0.5 to 10 µm, and even more preferably to a value within the range of 1 to 5 µm.

(iv) Thickness

Figure 11B:
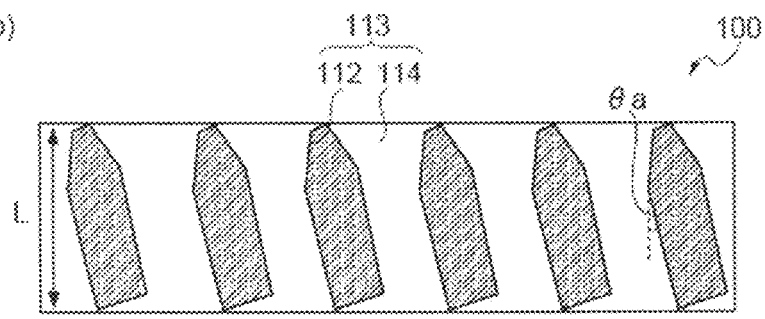

Furthermore, it is preferable that the thickness of the columnar structure, that is, the length L of the pillar-shaped objects in the normal line direction of the film plane as illustrated in FIG. 11(b), is adjusted to a value within the range of 50 to 700 µm.

The reason for this is that when the thickness of the columnar structure is adjusted to a value within such a range, the length of the pillar-shaped objects along the film thickness direction can be secured stably, incident light in the columnar structure can be reflected more stably, and the uniformity of the intensity of diffused light within the optical-diffusion angle region originating from the columnar structure can be further enhanced.

That is, it is because if the thickness L of such a columnar structure has a value of below 50 µm, the length of the pillar-shaped objects is insufficient, the amount of incident light that propagates straight within the columnar structure increases, and it may be difficult to obtain uniformity of the intensity of diffused light within the optical-diffusion angle region. On the other hand, it is because if the thickness L of such a columnar structure has a value of above 700 µm, when the columnar structure is formed by irradiating the composition for optical-diffusion film with active energy radiation, the direction of progress of photopolymerization is diffused by the initially formed columnar structure, and it may be difficult to form a desired columnar structure.

Therefore, it is more preferable that the thickness L of the columnar structure has a value within the range of 70 to 400 μm, and even more preferably to a value within the range of 80 to 300 μm.

Furthermore, the optical-diffusion film of the present invention may have a columnar structure (film thickness direction length L) formed over the entire film thickness direction as illustrated in FIG. 11(b), and may have a columnar structure-unformed portion on at least any one of the upper end and the lower end of the film.

Meanwhile, in the case of the columnar structure having modified pillar-shaped objects as illustrated in FIGS. 10(a) and 10(b), it is preferable that the ratio of the length of the pillar-shaped objects in the upper portion (portion on the side where active energy radiation is irradiated when the optical-diffusion film is produced) and the length of the pillar-shaped objects in the lower portion is usually adjusted to a value within the range of 7:1 to 1:50.

(v) Angle of Inclination

Furthermore, as illustrated in FIG. 11(b), it is preferable that in regard to the columnar structure, the pillar-shaped objects 112 are arranged to stand close together at a constant angle of inclination θa in the film thickness direction of the optical-diffusion film.

The reason for this is that by making the angle of inclination of the pillar-shaped objects constant, incident light can be reflected more stably within the columnar structure, and the incident angle dependency originating from the columnar structure can be further enhanced.

Furthermore, it is preferable that the angle of inclination θa is adjusted to a value within the range of 0° to 50°.

The reason for this is to adjust the optical-diffusion angle region manifested by the columnar structure to any arbitrary direction. That is, it is intended to cause the diffused light to converge toward the direction of a viewer by considering the position of installing the display, and the angle at which the viewer views the display.

More specifically, in the case of mobile instruments, televisions and the like, a viewer comes to view the screen approximately from the front of the display, and therefore, the angle of inclination θa of the pillar-shaped objects is controlled such that the front of the film falls in the optical-diffusion angle region. On the other hand, in order to enable a viewer to view the display from below or the like as in the digital signage applications and the like, the angle of inclination θa of the pillar-shaped objects is controlled such that the direction of viewing falls in the optical-diffusion angle region.

However, if the angle of inclination θa has a value of above 50°, it may difficult to emit diffused light toward to the front of the film.

Therefore, it is more preferable to adjust the angle of inclination θa to a value within the range of 0° to 40°, and even more preferably to a value within the range of 0° to 30°.

Furthermore, the angle of inclination θa means the angle of inclination (°) of the pillar-shaped objects when the angle of the normal line with respect to the film surface, which is measured in a cross-section obtainable in a case in which the film is cut by a plane that is perpendicular to the film plane and cuts one whole pillar-shaped object into two along the axial line, is designated as 0°.

More specifically, as illustrated in FIG. 11(b), the angle of inclination θa means the narrower angle between the angles formed by the normal line of the upper end surface of the columnar structure and the top of the pillar-shaped objects.

Furthermore, as illustrated in FIG. 11(b), the angle of inclination in the case in which the pillar-shaped objects are inclined to the left side is taken as the reference, and the angle of inclination in the case in which the pillar-shaped objects are inclined to the right side is described with a minus sign.

Incidentally, in the case of the columnar structure having modified pillar-shaped objects illustrated in FIGS. 10(a) and 10(b), it is usually preferable that the angle of inclination of the pillar-shaped objects in the upper portion (pillar-shaped objects on the light entrance side) is adjusted to a value within the range of 0° to 50°, and also, the angle of incidence of the pillar-shaped objects in the lower portion (pillar-shaped objects on the light emission side) is adjusted to a value within the range of 0° to 50°.

(3)-5 Film Thickness

Furthermore, the present invention is characterized in that the film thickness of the optical-diffusion film is adjusted to a value within the range of 60 to 700 μm.

The reason for this is that, if the film thickness of the optical-diffusion film has a value of below 60 μm, the amount of incident light that propagates straight within the columnar structure increases, and it may be difficult to exhibit predetermined optical-diffusion characteristics. On the other hand, it is because if the film thickness of the optical-diffusion film has a value of above 700 μm, when a columnar structure is formed by irradiating a composition for optical-diffusion film with active energy radiation, the direction of progress of photopolymerization is diffused by the initially formed columnar structure, and it may be difficult to form a desired columnar structure. Furthermore, it is because blurring may easily occur in the display image.

Therefore, it is more preferable that the film thickness of the optical-diffusion film is adjusted to a value within the range of 80 to 450 μm, and even more preferably to a value within the range of 100 to 250 μm.

(3)-6 Tacky Adhesive Layer

Furthermore, it is preferable that the optical-diffusion film according to the present invention includes, on one surface or on both surfaces, a tacky adhesive layer for lamination to an adherend.

The tacky adhesive that constitutes such a tacky adhesive layer is not particularly limited, and any conventionally known acrylic, silicone-based, urethane-based, or rubber-based tacky adhesive can be used.

(3)-7 Production Method

It is preferable that the optical-diffusion film according to the present invention is produced by a production method including the following steps (a) to (c):

(a) A step of preparing a composition for optical-diffusion film including a (meth)acrylic acid ester containing plural aromatic rings as component (A), a urethane (meth)acrylate as component (B), and a photopolymerization initiator as component (C);

(b) a step of applying the composition for optical-diffusion film on a process sheet, and forming a coating layer; and (c) a step of irradiating the coating layer with active energy radiation.

Hereinafter, the respective steps will be explained specifically with reference to the drawings.

(i) Step (a): Optical-Diffusion Film Preparing Step

This step is a step of preparing a predetermined composition for optical-diffusion film.

More specifically, the step is a step of mixing components (A) to (C) and other additives as desired.

Furthermore, on the occasion of mixing, the mixture may stirred directly at room temperature; however, from the viewpoint of enhancing uniformity, for example, it is preferable to obtain a uniform mixed liquid by stirring the mixture under heating conditions of 40° C. to 80° C.

Furthermore, it is also preferable to further add a diluent solvent so as to obtain a desired viscosity appropriate for coating.

The composition for optical-diffusion film will be more specifically described below.

(i)-1 Component (A)
(Kind)

It is preferable that the composition for optical-diffusion film according to the present invention includes a (meth)acrylic acid ester containing plural aromatic rings as component (A).

This is because it is speculated that when a particular (meth)acrylic acid ester is included as component (A), the polymerization rate of the component (A) can be made faster than the polymerization rate of the component (B), thereby a predetermined difference is generated between the polymerization rates of these components, and thus copolymerizability of the two components can be decreased effectively.

As a result, when the composition is photocured, a columnar structure in which plural pillar-shaped objects originating from the component (A) and having a relatively high refractive index are arranged to stand close together in a region originating from the component (B) and having a relatively low refractive index, can be formed efficiently.

Furthermore, it is speculated that when a particular (meth)acrylic acid ester is included as the component (A), the component (A) has sufficient compatibility with the component (B) in the stage of existing as a monomer, while having the compatibility with the component (B) decreased to a predetermined range in the stage of existing as plural monomer molecules connected in the course of polymerization, and the columnar structure region can be formed more efficiently.

Furthermore, when the composition includes a particular (meth)acrylic acid ester as the component (A), the refractive index of the regions originating from the component (A) in the columnar structure region can be increased, and the difference between the refractive index of the regions originating from the component (A) and refractive index of the region originating from the component (B) can be regulated to a value more than or equal to a predetermined value.

Therefore, when the composition for optical-diffusion film includes a particular (meth)acrylic acid ester as the component (A), a columnar structure composed of plural pillar-shaped objects originating from the component (A) and having a relatively high refractive index and a region originating from the component (B) and having a relatively low refractive index can be obtained efficiently, together with the characteristics of the component (B) that will be described below.

Meanwhile, the "(meth)acrylic acid ester containing plural aromatic rings" means a compound having plural aromatic rings in the ester residue moiety of a (meth)acrylic acid ester.

Furthermore, "(meth)acrylic acid" means both acrylic acid and methacrylic acid.

Furthermore, examples of the (meth)acrylic acid ester containing plural aromatic rings as such a component (A) include biphenyl (meth)acrylate, naphthyl (meth)acrylate, anthracyl (meth)acrylate, benzylphenyl (meth)acrylate, a biphenyloxyalkyl (meth)acrylate, a naphthyloxyalkyl (meth) acrylate, an anthracyloxyalkyl (meth)acrylate, a benzylphenyloxyalkyl (meth)acrylate, and these compounds having some of hydrogen atoms on the aromatic rings substituted by halogen, alkyl, alkoxy, halogenated alkyl or the like.

Furthermore, it is preferable that the composition for optical-diffusion film includes a compound containing a biphenyl ring as the (meth)acrylic acid ester containing plural aromatic rings as the component (A), and it is particularly preferable that the composition includes a biphenyl compound represented by the following formula (1):

[Chemical Formula 1]

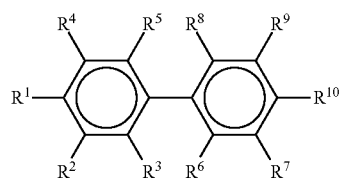

(1)

wherein in formula (1), $R^1$ to $R^{10}$ are respectively independent of one another; and at least one of $R^1$ to $R^{10}$ represents a substituent represented by the following formula (2), while the others each represent any one substituent selected from a hydrogen atom, a hydroxyl group, a carboxyl group, an alkyl group, an alkoxy group, a halogenated alkyl group excluding fluorine, a hydroxyalkyl group, a carboxyalkyl group, and a halogen atom other than fluorine;

[Chemical Formula 2]

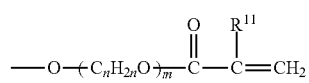

(2)

wherein in formula (2), $R^{11}$ represents a hydrogen atom or a methyl group; the number of carbon atoms n represents an integer from 1 to 4; and the number of repetition m represents an integer from 1 to 10.

This is because it is speculated that when the composition for optical-diffusion film includes a biphenyl compound having a particular structure as the component (A), a predetermined difference is generated between the polymerization rates of the component (A) and the component (B), thus the compatibility between the component (A) and the component (B) can be decreased to a predetermined range, and thereby the copolymerizability between the two components can be further decreased.

Furthermore, by increasing the refractive index of the regions originating from the component (A) in the columnar structure, the difference between the refractive index of the regions originating from the component (A) and the refractive index of the region originating from the component (B) can be regulated more easily to a value higher than or equal to a predetermined value.

Furthermore, when $R^1$ to $R^{10}$ in formula (1) includes any one of an alkyl group, an alkoxy group, a halogenated alkyl group, a hydroxyalkyl group and a carboxyalkyl group, it is preferable that the number of carbon atoms of the alkyl moiety is adjusted to a value within the range of 1 to 4.

The reason for this is that if such a number of carbon atoms has a value of above 4, the polymerization rate of the component (A) may be decreased, or the refractive index of the regions originating from the component (A) may become too low, and it may be difficult to form a columnar structure efficiently.

Therefore, when $R^1$ to $R^{10}$ in formula (1) includes any one of an alkyl group, an alkoxy group, a halogenated alkyl group, a hydroxyalkyl group and a carboxyalkyl group, it is more preferable to adjust the number of carbon atoms of the alkyl moiety to a value within the range of 1 to 3, and even more preferably to a value within the range of 1 to 2.

Furthermore, it is preferable that $R^1$ to $R^{10}$ in formula (1) each represent a substituent other than a halogenated alkyl group or a halogen atom, that is, a substituent that does not contain halogen.

The reason for this is that generation of dioxin occurring when an optical-diffusion film is incinerated is prevented, and this is preferable from the viewpoint of environmental protection.

Incidentally, in regard to the conventional optical-diffusion film, on the occasion of obtaining a predetermined columnar structure, it has been common to perform halogen substitution on monomer components for the purpose of increasing the refractive indices of the monomer components.

In this regard, when a biphenyl compound represented by formula (1) is used, a high refractive index may be obtained even if halogen substitution is not applied.

Therefore, when an optical-diffusion film formed by photocuring the composition for optical-diffusion film according to the present invention is employed, satisfactory incident angle dependency can be manifested, even in a case in which the optical-diffusion film does not contain halogen.

Furthermore, it is preferable that any one of $R^2$ to $R^9$ in formula (1) represents the substituent represented by formula (2).

The reason for this is that when the position of the substituent represented by formula (2) is set to a position other than $R^1$ or $R^{10}$, the molecules of the component (A) can be effectively prevented from being oriented and crystallized in a stage before photocuring.

Furthermore, the compound is liquid in the stage of existing as a monomer before photocuring, and even though a diluent solvent of the like is not used, the component (A) can be apparently uniformly mixed with the component (B).

Thereby, in the stage of photocuring, aggregation and phase separation of the component (A) and the component (B) at a fine level is enabled, and therefore, an optical-diffusion film having a columnar structure can be obtained more efficiently.

Furthermore, from the same point of view, it is particularly preferable that any one of $R^3$, $R^5$, $R^6$ and $R^8$ in formula (1) represents a substituent represented by formula (2).

Also, it is preferable that the number of repetitions m for the substituent represented by formula (2) is usually adjusted to an integer of 1 to 10.

The reason for this is that if the number of repetitions m has a value of above 10, the oxyalkylene chain that links the site of polymerization and the biphenyl ring becomes too long, and polymerization between the molecules of the component (A) at the site of polymerization may be inhibited.

Therefore, it is more preferable that the number of repetitions m for the substituent represented by formula (2) is adjusted to an integer of 1 to 4, and particularly preferably to an integer of 1 or 2.

Meanwhile, from the same point of view, it is preferable that the number of carbon atoms n for the substituent represented by formula (2) is usually adjusted to an integer of 1 to 4.

Also, when even the case is considered in which the position of a polymerizable carbon-carbon double bond, which is a site of polymerization, is too close to the biphenyl ring so that the biphenyl ring behaves as a steric hindrance, and the polymerization rate of the component (A) is decreased, it is more preferable that the number of carbon atoms n for the substituent represented by formula (2) is adjusted to an integer of 2 to 4, and particularly preferably to an integer of 2 or 3.

Furthermore, specific preferred examples of the biphenyl compound represented by formula (1) include compounds represented by the following formulas (3) and (4):

[Chemical Formula 3]

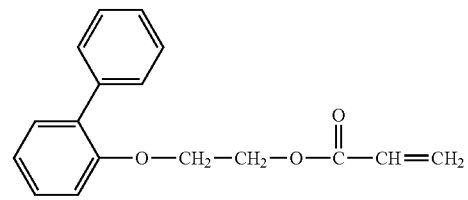

(3)

[Chemical Formula 4]

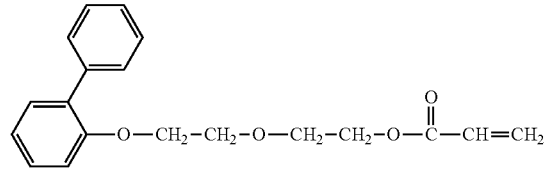

(4)

(Molecular Weight)

Furthermore, it is preferable that the molecular weight of the component (A) is adjusted to a value within the range of 200 to 2,500.

This is because it is speculated that when the molecular weight of the component (A) is adjusted to a predetermined range, the polymerization rate of the component (A) can be made much faster, and copolymerizability of the component (A) and the component (B) can be decreased more effectively.

As a result, when the composition is photocured, a columnar structure in which plural pillar-shaped objects originating from the component (A) and having a relatively high refractive index are arranged to stand close together in a region originating from the component (B) and having a relatively low refractive index, can be formed more efficiently.

That is, it is because it is speculated that if the molecular weight of the component (A) has a value of below 200, steric hindrance is diminished, copolymerization between the component (A) and the component (B) may easily occur, and as a result, it may be difficult to form the columnar structure efficiently. On the other hand, it is because it is speculated that if the molecular weight of the component (A) has a value of above 2,500, as the difference between the molecular weight of the component (A) and the molecular weight of the component (B) becomes smaller, the polymerization rate of the component (A) decreases and approaches the polymerization rate of the component (B), thus copolymerization of the component (A) and the component (B) may easily occur, and as a result, it may be difficult to form the columnar structure efficiently.

Therefore, it is more preferable that the molecular weight of the component (A) is adjusted to a value within the range of 240 to 1,500, and even more preferably to a value within the range of 260 to 1,000.

Meanwhile, the molecular weight of the component (A) can be determined from a calculated value obtainable from the molecular composition and the atomic weights of the constituent atoms, and can also be measured as a weight average molecular weight using gel permeation chromatography (GPC).

(Single Use)

Furthermore, the composition for optical-diffusion film according to the present invention includes the component (A) as a monomer component that forms the regions having a relatively high refractive index in the columnar structure; however, it is preferable that the component (A) is composed of a single component.

The reason for this is that, when such a configuration is adopted, fluctuation in the refractive index in the regions originating from the component (A) is effectively suppressed, and thereby an optical-diffusion film having a columnar structure can be obtained more efficiently.

The reason for this is that, by such a configuration is adopted, fluctuation in the refractive index in the regions originating from the component (A) is effectively suppressed, and thereby an optical-diffusion film having a columnar structure can be obtained more efficiently.

That is, when the compatibility of the component (A) for the component (B) is low, for example, when the component (A) is a halogen-based compound or the like, there is a case in which another component (A) (for example, a non-halogen-based compound or the like) is used in combination as a third component for compatibilizing the component (A) with the component (B).

However, in this case, the refractive index in the regions originating from the component (A) and having a relatively high refractive index may fluctuate or may be easily decreased due to the influence of such a third component.

As a result, the difference between the refractive index of the regions originating from the component (A) and the refractive index of the region originating from the component (B) and having a relatively low refractive index may become non-uniform or may be excessively easily decreased.

Therefore, it is preferable to select a high refractive index monomer component having compatibility with the component (B), and use that monomer component as a single component (A).

Incidentally, for example, if a biphenyl compound represented by formula (3) is used as the component (A), since this compound has low viscosity, the biphenyl compound has compatibility with the component (B) and can therefore be used as a single component (A).

(Refractive Index)

Furthermore, it is preferable that the refractive index of the component (A) is adjusted to a value within the range of 1.5 to 1.65.

The reason for this is that when the refractive index of the component (A) is adjusted to within such a range, the difference between the refractive index of the regions originating from the component (A) and the refractive index of the region originating from the component (B) can be regulated more easily, and an optical-diffusion film having a columnar structure can be obtained more efficiently.

That is, it is because if the refractive index of the component (A) has a value of below 1.5, the difference between the refractive index of the component (A) and the refractive index of the component (B) becomes too small, and it may be difficult to obtain an effective optical-diffusion angle region. On the other hand, it is because if the refractive index of the component (A) has a value of above 1.65, the difference between the refractive index of the component (A) and the refractive index of the component (B) becomes larger; however, it may be difficult to form even an apparently compatible state between the component (A) and the component (B).

Therefore, it is more preferable that the refractive index of the component (A) is adjusted to a value within the range of 1.52 to 1.62, and even more preferably to a value within the range of 1.56 to 1.6.

Incidentally, the refractive index of the component (A) mentioned above means the refractive index of the component (A) before being cured by light irradiation.

Furthermore, the refractive index can be measured according to, for example, JIS K0062.

(Content)

Furthermore, it is preferable that the content of the component (A) in the composition for optical-diffusion film is adjusted to a value within the range of 25 parts to 400 parts by weight relative to 100 parts by weight of the component (B) that will be described below.

The reason for this is that if the content of the component (A) has a value of below 25 parts by weight, the existence ratio of the component (A) to the component (B) becomes small, the width of the pillar-shaped objects originating from the component (A) in the columnar structure illustrated in the cross-sectional view of FIG. 2(b) becomes excessively small, and it may be difficult to obtain a columnar structure having satisfactory incident angle dependency. Furthermore, it is because the length of the pillar-shaped objects in the thickness direction of the optical-diffusion film becomes insufficient, and predetermined optical-diffusion characteristics may not be exhibited. On the other hand, it is because if the content of the component (A) has a value of above 400 parts by weight, the existence ratio of the component (A) to the component (B) becomes high, the width of the pillar-shaped objects originating from the component (A) becomes excessively large, and in contrast, it may be difficult to obtain a columnar structure having satisfactory incident angle dependency. Furthermore, it is because the length of the pillar-shaped objects in the thickness direction of the optical-diffusion film becomes insufficient, and predetermined optical-diffusion characteristics may not be exhibited.

Therefore, it is more preferable that the content of the component (A) is adjusted to a value within the range of 40 parts to 300 parts by weight, and even more preferably to a value within the range of 50 parts to 200 parts by weight, relative to 100 parts by weight of the component (B).

(i)-2 Component (B)

(Kind)

It is preferable that the composition for optical-diffusion film according to the present invention includes a urethane (meth)acrylate as the component (B).

The reason for this is that when a urethane (meth)acrylate is used, not only the difference between the refractive index of the region originating from the component (A) and the refractive index of the region originating from the component (B) can be regulated more easily, but also fluctuation in the refractive index of the region originating from the component (B) can be suppressed effectively, and a optical-diffusion having a columnar structure can be obtained more efficiently.

Meanwhile, the term (meth)acrylate means both acrylate and methacrylate.

First, a urethane (meth)acrylate is formed from (B1) a compound containing at least two isocyanate groups, (B2) a polyol compound, preferably a diol compound, and particularly preferably a polyalkylene glycol, and (B3) a hydroxyalkyl (meth)acrylate.

Incidentally, the component (B) also includes oligomers having repeating units with urethane bonds.

Among these, examples of the compound containing at least two isocyanate groups as the component (B1) include aromatic polyisocyanates such as 2,4-tolylene diisocyanate, 2,6-tolylene diisocyanate, 1,3-xylylene diisocyanate, and 1,4-xylylene diisocyanate; aliphatic polyisocyanates such as hexamethylene diisocyanate; alicyclic polyisocyanates such as isophorone diisocyanate (IPDI) and hydrogenated diphenylmethane diisocyanate; and biuret forms and isocyanurate forms thereof, and adduct forms (for example, a xylylene diisocyanate-based trifunctional adduct), which are reaction products between these compounds and low molecular weight hydrogen-containing compounds such as ethylene glycol, propylene glycol, neopentyl glycol, trimethylolpropane, and castor oil.

Furthermore, among those mentioned above, the compound is particularly preferably an alicyclic polyisocyanate.

The reason for this is that when an alicyclic polyisocyanate is used, it is easier to produce a difference in the rate of reaction between various isocyanate groups in relation to conformation or the like, compared to aliphatic polyisocyanates.

Thereby, the situation in which the component (B1) reacts only with the component (B2), or the component (B1) reacts only with the component (B3), can be suppressed, thereby the component (B1) can be made to reliably react with the component (B2) and the component (B3), and the generation of excessive side products can be prevented.

As a result, fluctuation in the refractive index of the region originating from the component (B), that is, the low refractive index region, in the columnar structure can be effectively suppressed.

Furthermore, when an alicyclic polyisocyanate is used, the compatibility between the resulting component (B) and the component (A) can be decreased to a predetermined range, and the columnar structure can be formed more efficiently, as compared to aromatic polyisocyanates.

Furthermore, when an alicyclic polyisocyanate is used, the refractive index of the resulting component (B) can be made smaller compared to aromatic polyisocyanates. Therefore, the difference between the refractive index of the component (B) and the refractive index of the component (A) can be made large, light diffusibility can be exhibited more reliably, and also, a columnar structure having high uniformity of diffused light within the optical-diffusion angle region can be formed even more efficiently.

Also, among such alicyclic polyisocyanates, a compound containing two isocyanate groups via an aliphatic ring is preferred.

The reason for this is that when such an alicyclic diisocyanate is used, the compound reacts quantitatively with the component (B2) and the component (B3), and a single component (B) can be obtained.

Regarding such an alicyclic diisocyanate, isophorone diisocyanate (IPDI) is particularly preferably used.

The reason for this is that an effective difference can be provided in the reactivity of the two isocyanate groups.

Furthermore, among the components that form the urethane (meth)acrylate, examples of the polyalkylene glycol as the component (B2) include polyethylene glycol, polypropylene glycol, polybutylene glycol, and polyhexylene glycol, and among them, the polyalkylene glycol is particularly preferably polypropylene glycol.

The reason for this is that, with polypropylene glycol, when the component (B) is cured, polypropylene glycol becomes a satisfactory soft segment in the cured product, and can effectively enhance handleability or mountability of the optical-diffusion film.

Incidentally, the weight average molecular weight of the component (B) can be regulated mainly by the weight average molecular weight of the component (B2). Here, the weight average molecular weight of the component (B2) is usually 2,300 to 19,500, preferably 4,300 to 14,300, and particularly preferably 6,300 to 12,300.

Furthermore, among the components that form the urethane (meth)acrylate, examples of the hydroxyalkyl (meth) acrylate as the component (B3) include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate.

Furthermore, from the viewpoint of decreasing the polymerization rate of the urethane (meth)acrylate thus obtainable and forming the columnar structure more efficiently, the component (B2) is more preferably a hydroxyalkyl methacrylate, in particular, and even more preferably 2-hydroxyethyl methacrylate.

Furthermore, synthesis of the urethane (meth)acrylate using the components (B1) to (B3) can be carried out by a conventional method.

At this time, it is preferable to adjust the mixing ratio of the components (B1) to (B3) to a ratio of component (B1):component (B2):component (B3)=1 to 5:1:1 to 5 as a molar ratio.

The reason for this is that when such a mixing ratio is employed, a urethane (meth)acrylate in which two hydroxyl groups carried by a molecule of the component (B2) respectively react with one of the isocyanate groups carried by a molecule of the component (B1) to form bonding therebetween, and the other isocyanate groups carried by the two molecules of the component (B1) respectively react with a hydroxyl group carried by a molecule of the component (B3) to form bonding therebetween, can be synthesized efficiently.

Therefore, it is more preferable to adjust the mixing ratio of the components (B1) to (B3) to a ratio of component (B1):component (B2):component (B3)=1 to 3:1:1 to 3, and even more preferably to a ratio of 2:1:2, as a molar ratio.

(Weight Average Molecular Weight)

Furthermore, it is preferable that the weight average molecular weight of the component (B) is adjusted to a value within the range of 3,000 to 20,000.

This is because it is speculated that when the weight average molecular weight of the component (B) is adjusted to a predetermined range, a predetermined difference is produced in the polymerization rates of the component (A) and the component (B), and copolymerizability of the two components can be decreased effectively.

As a result, when the composition is photocured, a columnar structure in which plural pillar-shaped objects originating from the component (A) and having a relatively high refractive index are arranged to stand close together in a region originating from the component (B) and having a relatively low refractive index, can be formed efficiently.

That is, it is because if the weight average molecular weight of the component (B) has a value of below 3,000, the polymerization rate of the component (B) becomes faster and approaches the polymerization rate of the component (A), copolymerization of the component (B) and the component (A) easily occurs, and as a result, it may be difficult to form the columnar structure efficiently. On the other hand, it is because if the weight average molecular weight of the component (B) has a value of above 20,000, it may be difficult to form a columnar structure, or compatibility between the component (B) and the component (A) decreases excessively, and the component (A) may be precipitated out in the coating stage.

Therefore, it is more preferable that the weight average molecular weight of the component (B) is adjusted to a value within the range of 5,000 to 15,000, and even more preferably to a value within the range of 7,000 to 13,000.

Meanwhile, the weight average molecular weight of the component (B) can be measured using gel permeation chromatography (GPC).

(Single Use)

Furthermore, regarding the component (B), two or more kinds having different molecular structures or different weight average molecular weights may be used in combination; however, from the viewpoint of suppressing fluctuation in the refractive index of the region originating from the component (B) in the columnar structure, it is preferable to use only one kind.

That is, it is because when plural kinds of the component (B) are used, the refractive index in the region originating from the component (B) and having a relatively low refractive index may fluctuate or increase, and the difference between the refractive index of the region originating from the component (B) and having a relatively high refractive index and the refractive index of the regions originating from the component (A) and having a relatively high refractive index may become non-uniform or may be decreased excessively.

(Refractive Index)

Furthermore, it is preferable that the refractive index of the component (B) is adjusted to a value within the range of 1.4 to 1.55.

The reason for this is that when the refractive index of the component (B) is adjusted to a value within such a range, the difference between the refractive index of the regions originating from the component (A) and the refractive index of the region originating from the component (B) can be regulated more easily, and an optical-diffusion film having a columnar structure can be obtained more efficiently.

That is, it is because if the refractive index of the component (B) has a value of below 1.4, the difference between the refractive index of the component (B) and the refractive index of the component (A) becomes large; however, there is a risk that the compatibility of the component (B) with the component (A) may become extremely poor, and a columnar structure may not be formed. On the other hand, it is because if the refractive index of the component (B) has a value of above 1.55, the difference between the refractive index of the component (B) and the refractive index of the component (A) becomes too small, and it may be difficult to obtain desired incident angle dependency.

Therefore, it is more preferable that the refractive index of the component (B) is adjusted to a value within the range of 1.45 to 1.54, and even more preferably to a value within the range of 1.46 to 1.52.

Meanwhile, the refractive index of the component (B) described above means the refractive index of the component (B) before being cured by light irradiation.

The refractive index can be measured according to, for example, JIS K0062.

Furthermore, it is preferable that the difference between the refractive index of the component (A) and the refractive index of the component (B) described above is adjusted to a value of 0.01 or more.

The reason for this is that when such a difference in the refractive index is adjusted to a value within a predetermined range, an optical-diffusion film having more satisfactory incident angle dependency in transmission and diffusion of light, and a broader optical-diffusion incident angle region can be obtained.

That is, it is because if such a difference in the refractive index has a value of below 0.01, the angle range in which incident light undergoes total reflection within the columnar structure is narrowed, and therefore, the angle of aperture for optical-diffusion may become excessively narrow. On the other hand, it is because if such a difference in the refractive index has an excessively large value, there is a risk that the compatibility between the component (A) and the component (B) may become so poor that a columnar structure may not be formed.

Therefore, it is more preferable that the difference between the refractive index of the component (A) and the refractive index of the component (B) is adjusted to a value within the range of 0.05 to 0.5, and even more preferably to a value within the range of 0.1 to 0.2.

Incidentally, the refractive indices of the component (A) and the component (B) as used herein means the refractive indices of the component (A) and the component (B) before being cured by light irradiation.

(Content)

Furthermore, it is preferable that the content of the component (B) in the composition for optical-diffusion film is adjusted to a value within the range of 10 parts to 75 parts by weight relative to 100 parts by weight of the total amount of the composition for optical-diffusion film.

The reason for this is that if the content of the component (B) has a value of below 10 parts by weight, the existence ratio of the component (B) to the component (A) becomes small, the region originating from the component (B) becomes excessively small compared to the regions originating from the component (A), and it may be difficult to obtain a columnar structure having satisfactory incident angle dependency. On the other hand, it is because if the content of the component (B) has a value of above 75 parts by weight, the existence ratio of the component (B) to the component (A) becomes high, the region originating from the component (B) becomes excessively large compared to the regions originating from the component (A), and in contrast, it may be difficult to obtain a columnar structure having satisfactory incident angle dependency.

Therefore, it is more preferable that the content of the component (B) is adjusted to a value within the range of 20 parts to 70 parts by weight, and even more preferably to a value within the range of 30 parts to 60 parts by weight, relative to 100 parts by weight of the total amount of the composition for optical-diffusion film.

(i)-3 Component (C)

(Kind)

It is preferable that the composition for optical-diffusion film according to the present invention includes a photopolymerization initiator as a component (C).

The reason for this is that when the composition for optical-diffusion film is irradiated with active energy radiation, a columnar structure in which plural pillar-shaped objects originating from the component (A) and having a relatively high refractive index are arranged to stand close together in a region originating from the component (B) and having a relatively low refractive index, can be formed efficiently.

Here, a photopolymerization initiator refers to a compound which generates a radical species when irradiated with active energy radiation such as ultraviolet radiation.

Examples of such a photopolymerization initiator include benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexyl phenyl ketone, 2-methyl-1-[4-(methylthio)phenyl]-2-morpholinopropan-1-one, 4-(2-hydroxyethoxy)phenyl-2-(hydroxy-2-propyl) ketone, benzophenone, p-phenylbenzophenone, 4,4-diethylaminobenzophenone, dichlorobenzophenone, 2-methylanthraquinone, 2-ethylanthraquinone, 2-tertiary butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylaminebenzoic acid ester, and oligo[2-hydroxy-2-methyl-1-[4-(1-methylvinyl)phenyl]propane]. Among these, one kind thereof may be used alone, or two or more kinds thereof may be used in combination.

(Content)

Furthermore, it is preferable that the content of the component (C) in the composition for optical-diffusion film is adjusted to a value within the range of 0.2 parts to 20 parts by weight relative to the total amount (100 parts by weight) of the component (A) and the component (B).

The reason for this is that if the content of the component (C) has a value of below 0.2 parts by weight, it may be difficult to obtain an optical-diffusion film having sufficient incident angle dependency, and also, the number of polymerization initiation points may be excessively small so that it may be difficult to photocure the film sufficiently. On the other hand, it is because if the content of the component (C) has a value of above 20 parts by weight, excessively strong ultraviolet absorption may occur at the surface layer of the coating layer, photocuring of the film may be rather inhibited, an excessively strong foul odor may be generated, or the initial yellow tinge in the film may be intensified.

Therefore, it is more preferable that the content of the component (C) is adjusted to a value within the range of 0.5 parts to 15 parts by weight, and even more preferably to a value within the range of 1 part to 10 parts by weight, relative to the total amount (100 parts by weight) of the component (A) and the component (B).

(i)-4 Component (D)
(Kind)

It is also preferable that particularly in a case in which a columnar structure having modified pillar-shaped objects 112' having a bent part in the middle of the pillar-shaped objects as illustrated in FIG. 10(a) is formed, the composition for optical-diffusion film according to the present invention includes an ultraviolet absorber as a component (D).

The reason for this is that when the composition for optical-diffusion film includes an ultraviolet absorber as a component (D), when the composition is irradiated with active energy radiation, an active energy radiation having a predetermined wavelength can be selectively absorbed to a predetermined extent.

As a result, a bend may be produced in the columnar structure formed in the film as illustrated in FIG. 10(a), without inhibiting the curing of the composition for optical-diffusion film, and thereby predetermined optical-diffusion characteristics can be imparted more stably to the resulting optical-diffusion film.

Furthermore, it is preferable that the component (D) is at least one selected from the group consisting of a hydroxyphenyltriazine-based ultraviolet absorber, a benzotriazole-based ultraviolet absorber, a benzophenone-based ultraviolet absorber, and a hydroxybenzoate-based ultraviolet absorber.

Specific preferred examples of the hydroxyphenyltriazine-based ultraviolet absorber include compounds represented by the following formulas (5) to (9):

[Chemical Formula 5]

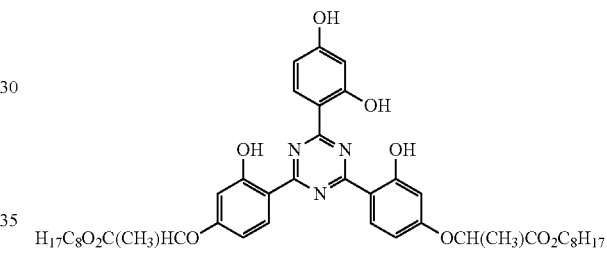

(5)

[Chemical Formula 6]

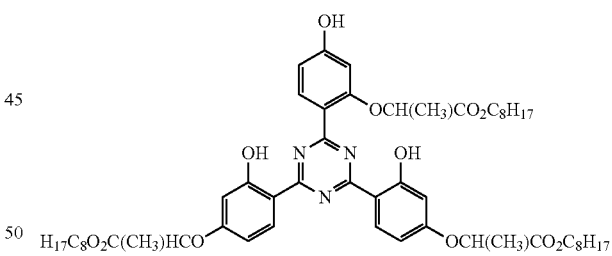

(6)

[Chemical Formula 7]

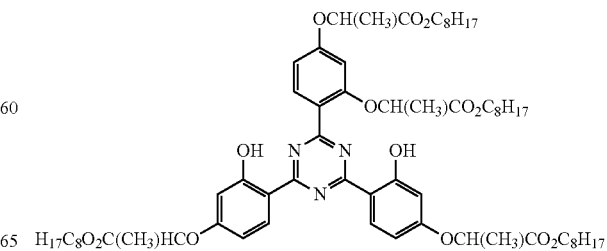

(7)

[Chemical Formula 8]

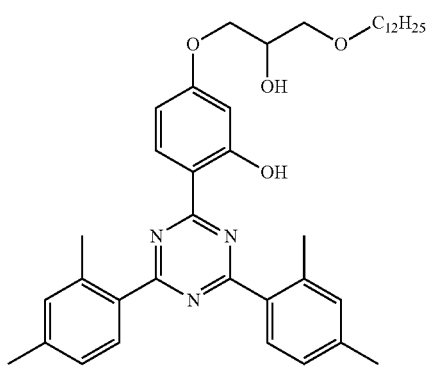
(8)

[Chemical Formula 9]

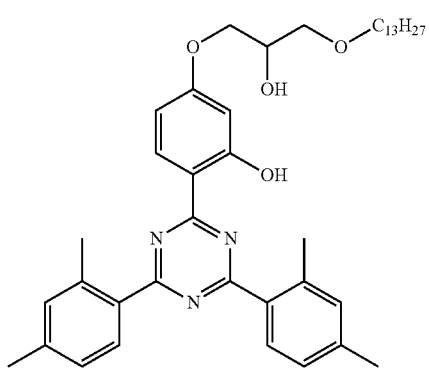
(9)

Furthermore, specific preferred examples of the benzotriazole-based ultraviolet absorber include compounds represented by the following formula (10):

[Chemical Formula 10]

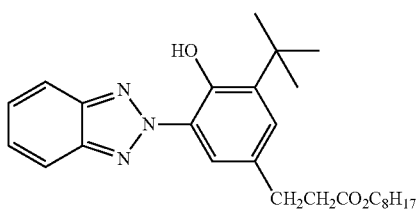
(10)

(Content)

It is preferable that the content of the component (D) In the composition for optical-diffusion film is adjusted to a value of below 2 parts by weight (provided that excluding 0 parts by weight) relative to the total amount (100 parts by weight) of the component (A) and the component (B).

The reason for this is that when the content of the component (D) is adjusted to a value within such a range, a bend can be produced in the column structure formed in the film, without inhibiting the curing of the composition for optical-diffusion film, and thereby predetermined optical-diffusion characteristics can be imparted more stably to the resulting optical-diffusion film.

That is, it is because if the content of the component (D) has a value of 2 parts by weight or more, curing of the composition for optical-diffusion film may be inhibited, shrinkage wrinkles may be generated on the film surface, or curing may not occur at all. On the other hand, it is because if the content of the component (D) is made excessively small, it may be difficult to cause sufficient bending in the predetermined internal structure formed in the film, and it may be difficult to impart predetermined optical-diffusion characteristics stably to the resulting optical-diffusion film.

Therefore, it is more preferable that the content of the component (D) is adjusted to a value within the range of 0.01 parts to 1.5 parts by weight, and even more preferably to a value within the range of 0.02 parts to 1 part by weight, relative to the total amount (100 parts by weight) of the component (A) and the component (B).

(i)-5 Other Additives

Furthermore, additives other than the compounds mentioned above can be appropriately added to the extent that the effects of the present invention are not impaired.

Examples of such additives include a hindered amine-based photostabilizer, an oxidation inhibitor, an antistatic agent, a polymerization accelerator, a polymerization inhibitor, an infrared absorber, a plasticizer, a diluent solvent, and a leveling agent.

It is generally preferable that the content of such additives is adjusted to a value within the range of 0.01 parts to 5 parts by weight, more preferably to a value of 0.02 parts to 3 parts by weight, and even more preferably to a value within the range of 0.05 parts to 2 parts by weight, relative to the total amount (100 parts by weight) of the component (A) and the component (B).

(ii) Step (b): Application Step

Figure 12A:
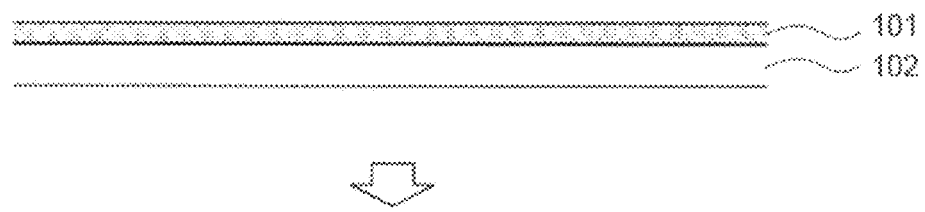
FIGS. 12(a) and 12(b) are diagrams provided to explain various steps in a method for producing an optical-diffusion film.

Such a step is a step of applying the composition for optical-diffusion film on a process sheet 102 and forming a coating layer 101, as illustrated in FIG. 12(*a*).

Regarding the process sheet, a plastic film and paper can both be used.

Among these, examples of the plastic film include polyester-based films such as a polyethylene terephthalate film; polyolefin-based films such as a polyethylene film and a polypropylene film; cellulose-based films such as a triacetyl cellulose film; and polyimide-based films.

Examples of the paper include glassine paper, coated paper, and laminated paper.

Furthermore, when the processes that will be described below are considered, the process sheet 102 is preferably a plastic film having excellent dimensional stability against heat or active energy radiation.

Preferred examples of such a plastic film include, among those described above, a polyester-based film, a polyolefin-based film, and a polyimide-based film.

Furthermore, in regard to the process sheet, it is preferable that in order to make it easier to detach the optical-diffusion film obtained after photocuring from the process sheet, it is preferable to provide a peeling layer on the side of the surface of the process sheet where the composition for optical-diffusion film has been applied.

Such a peeling layer can be formed using a conventionally known peeling agent such as a silicone-based peeling agent, a fluorine-based peeling agent, an alkyd-based peeling agent, or an olefin-based peeling agent.

Meanwhile, it is preferable that the thickness of the process sheet is usually adjusted to a value within the range of 25 to 200 μm.

Furthermore, regarding the method for applying the composition for optical-diffusion film on the process sheet, for example, the method can be carried out by any conventionally known method such as a knife coating method, a roll coating method, a bar coating method, a blade coating method, a die coating method, or a gravure coating method.

Incidentally, at this time, it is preferable to adjust the film thickness of the coating layer to a value within the range of 60 to 700 μm.

(iii) Step (c): Active Energy Ray Irradiation Step

Figure 12B:
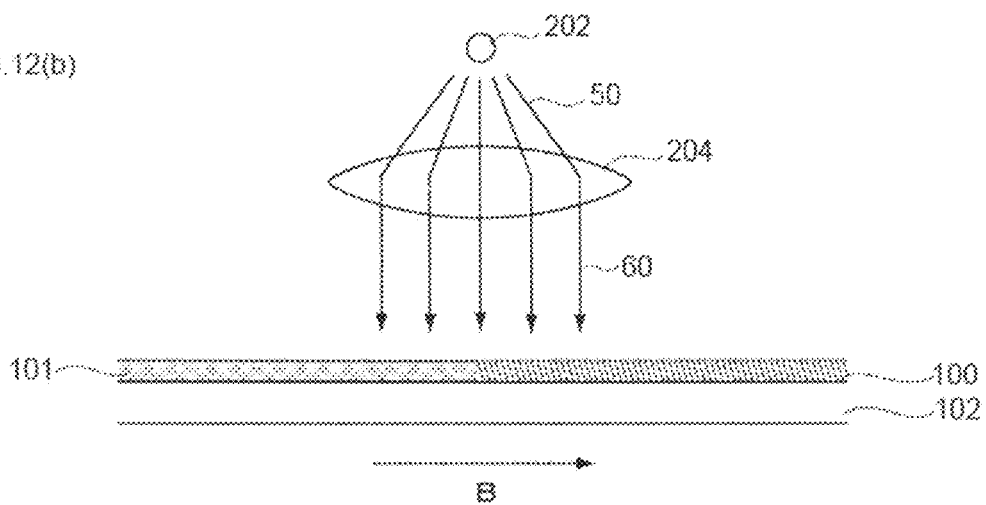

Such a step is a step of subjecting the coating layer 101 to active energy ray irradiation, forming a columnar structure within the film, and obtaining an optical-diffusion film, as illustrated in FIG. 12(b).

More specifically, in the active energy ray irradiation step, the coating layer formed on the process sheet is irradiated with parallel light having high parallelism of light rays.

Here, parallel light means an approximately parallel light in which the direction of emitted light does not spread even if viewed from any direction.

Figure 13A:
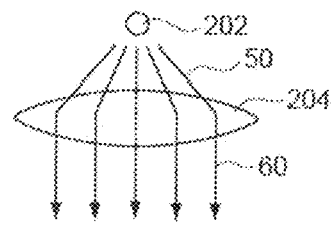
FIGS. 13(a) to 13(d) are diagrams provided to explain an active energy ray irradiation step.
Figure 13B:
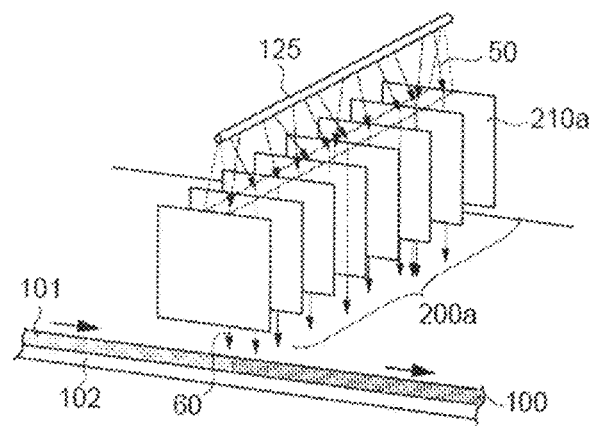
Figure 13C:
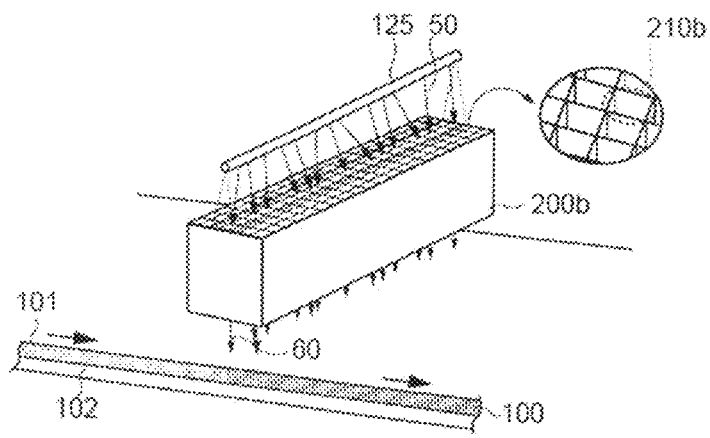

More specifically, for example, as illustrated in FIG. 13(a), it is preferable that irradiated light 50 coming from a point light source 202 is converted to parallel light 60 by means of a lens 204, and then the parallel light is irradiated to the coating layer 101, or as illustrated in FIGS. 13(b) and 13(c), irradiated light 50 coming from a linear light source 125 is converted to parallel light 60 by means of irradiated light parallelizing members 200 (200a, 200b), and then the parallel light is irradiated to the coating layer 101.

Figure 13D:
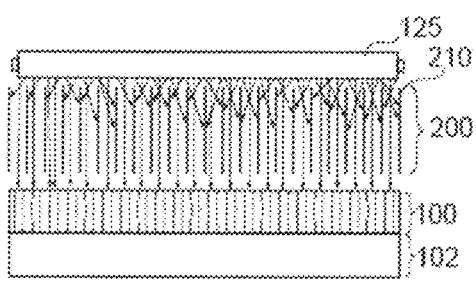

Meanwhile, as illustrated in FIG. 13(d), the irradiated light parallelizing members 200 can convert, among the direct light emitted by the linear light source 125, a direct light emitted by a linear light source 125 to parallel light, by unifying the direction of light using, for example, light blocking members 210 such as plate-shaped members 210a or cylindrical members 210b in a direction parallel to the axial line direction of the linear light source 125 whose direction of light is random.

More specifically, among the direct light emitted by a linear light source 125, a light having low parallelism with respect to light blocking members 210 such as plate-shaped members 210a or cylindrical members 210b is brought into contact with these light blocking members and is absorbed.

Therefore, a light having high parallelism with respect to the light blocking members 210 such as plate-shaped members 210a or cylindrical members 210b, that is, only parallel light passes through irradiated light parallelizing members 200, and as a result, direct light emitted by the linear light source 125 is converted to parallel light by the irradiated light parallelizing members 200.

Meanwhile, the material for the light blocking members 210 such as plate-shaped members 210a or cylindrical members 210b is not particularly limited as long as the material can absorb a light having low parallelism with respect to the light blocking members 210, and for example, a heat-resistant black-painted Ulster steel sheet can be used.

Furthermore, it is preferable that the parallelism of irradiated light is adjusted to a value of 10° or less.

The reason for this is that when the parallelism of irradiated light is adjusted to a value within such a range, the columnar structure can be formed efficiently and stably.

Therefore, it is more preferable that the parallelism of irradiated light to a value of 5° or less, and even more preferably to a value of 2° or less.

Figure 14:
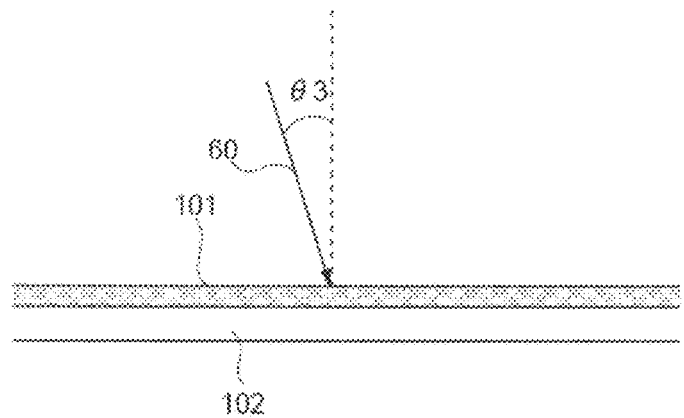
FIG. 14 is another diagram provided to explain the active energy ray irradiation step.

Furthermore, regarding the angle of irradiation of irradiated light, it is preferable that as illustrated in FIG. 14, the angle of irradiation θ3 in the case in which the angle of the normal line with respect to the surface of the coating layer 101 is designated as 0° is usually adjusted to a value within the range of −80° to 80°.

The reason for this is that when the angle of irradiation has a value outside the range of −80° to 80°, the influence of reflection at the surface of the coating layer 101 or the like increases, and it may be difficult to form a sufficient columnar structure.

Furthermore, examples of the irradiated light include ultraviolet radiation and an electron beam, and it is preferable to use ultraviolet radiation.

The reason for this is that, in the case of an electron beam, since the polymerization rate is very fast, the component (A) and the component (B) may not undergo phase separation sufficiently in the course of polymerization, and it may be difficult to form a columnar structure. On the other hand, when compared with visible light or the like, it is because ultraviolet radiation is associated with a wide variety of ultraviolet-curable resins that are cured by irradiation of ultraviolet radiation, or a wide variety of photopolymerization initiators that can be used, and therefore, the widths of selection of the component (A) and the component (B) can be broadened.

Furthermore, regarding the conditions for irradiation of ultraviolet radiation, it is preferable that the peak illuminance at the coating layer surface is adjusted to a value within the range of 0.1 to 10 mW/cm$^2$.

The reason for this is that, if such a peak illuminance has a value of below 0.1 mW/cm$^2$, it may be difficult to form the columnar structure in a well-defined manner. On the other hand, it is because if such a peak illuminance has a value of above 10 mW/cm$^2$, curing occurs before phase separation of the component (A) and the component (B) proceeds, and in contrast, it may be difficult to form the columnar structure in a well-defined manner.

Therefore, it is more preferable that the peak illuminance at the coating layer surface upon ultraviolet ray irradiation is adjusted to a value within the range of 0.3 to 8 mW/cm$^2$, and even more preferably to a value within the range of 0.5 to 6 mW/cm$^2$.

It is preferable that the cumulative amount of light at the coating layer surface upon ultraviolet ray irradiation is adjusted to a value within the range of 5 to 200 mJ/cm$^2$.

The reason for this is that if such a cumulative amount of light has a value of below 5 mJ/cm$^2$, it may be difficult to extend the columnar structure sufficiently from the upper part toward the lower part. On the other hand, it is because if such a cumulative amount of light has a value of above 200 mJ/cm$^2$, coloration may occur in the resulting optical-diffusion film.

Therefore, it is more preferable that the cumulative amount of light at the coating layer surface upon ultraviolet ray irradiation is adjusted to a value within the range of 7 to 150 mJ/cm$^2$, and even more preferably to a value within the range of 10 to 100 mJ/cm$^2$.

Meanwhile, it is preferable to optimize the peak illuminance and the cumulative amount of light by means of the internal structure formed in the film.

Furthermore, it is preferable that at the time of ultraviolet ray irradiation, the coating layer formed on the process sheet is moved at a speed of 0.1 to 10 m/min.

The reason for this is that if such a speed has a value of below 0.1 m/min, mass productivity may be excessively decreased. On the other hand, if such a speed has a value of above 10 m/min, the travel speed may be faster than the speed of curing of the coating layer, in other words, the speed of formation of the columnar structure, the incident angle of ultraviolet radiation with respect to the coating layer may change, and the formation of the columnar structure region may be achieved insufficiently.

Therefore, it is more preferable that, at the time of ultraviolet ray irradiation, the coating layer formed on the process sheet is moved at a speed within the range of 0.2 to 5 m/min, and is even more preferably moved at a speed within the range of 0.3 to 3 m/min.

Incidentally, the optical-diffusion film after the ultraviolet ray irradiation step is finally brought into a state of being usable, by detaching the process sheet.

Meanwhile, in the case of forming a columnar structure having modified pillar-shaped objects 112″ composed of first pillar-shaped objects positioned on the first surface side and second pillar-shaped objects positioned on the second surface side as illustrated in FIG. 10(*b*), ultraviolet ray irradiation is carried out in two divided stages.

That is, initially, first ultraviolet ray irradiation is carried out, second pillar-shaped objects on the lower part of the coating layer, that is, on the second surface side, and a columnar structure-unformed region is left in the upper part of the coating layer, that is, the first surface side.

At this time, from the viewpoint of stably leaving a columnar structure-unformed region, it is preferable that the first ultraviolet irradiation is carried out in an oxygen-containing atmosphere so that the influence of oxygen inhibition can be utilized.

Next, second ultraviolet ray irradiation is carried out, and first pillar-shaped objects are formed in the columnar structure-unformed region left on the first surface side.

At this time, from the viewpoint of stably forming the first pillar-shaped objects, it is preferable that the second ultraviolet ray irradiation is carried out in a non-oxygen atmosphere so that the influence of oxygen inhibition can be suppressed.

4. Other Embodiments of Reflective Display Device

In the description given above, the reflective display device of the present invention has been explained by taking an example of the reflective display device 1 formed by laminating an optical-diffusion film 100 on the display surface side of a reflective display panel 10 including a reflective plate 14 as illustrated in FIG. 1. However, the reflective display device 1′ illustrated in FIG. 15 can also be employed as another embodiment different from the aforementioned display device.

Figure 15:
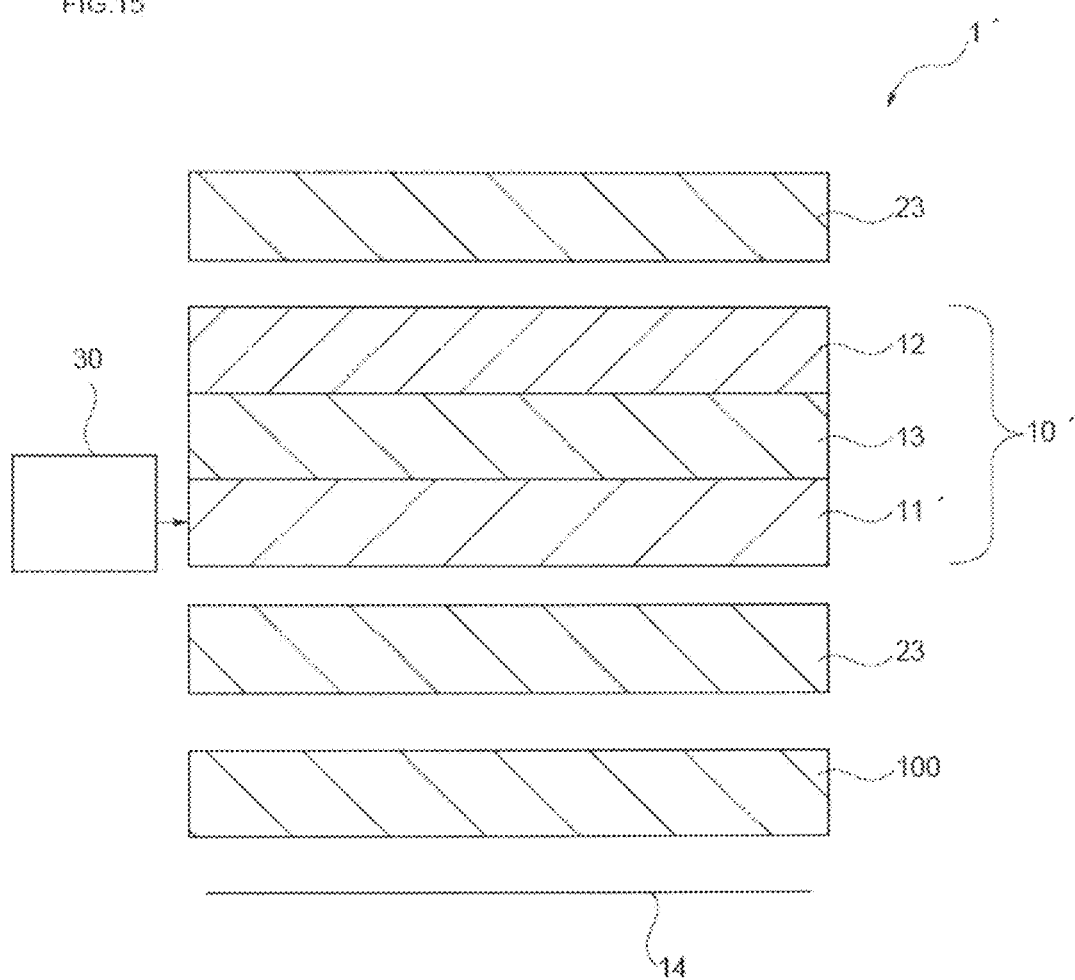
FIG. 15 is another diagram provided to explain the configuration of the reflective display device of the present invention.

That is, FIG. 15 illustrates, as an example, a reflective display device 1′ in the case of using a liquid crystal display panel as a reflective display panel 10′, and shows a reflective display panel 1′ that includes a reflective plate 14 as a separate body on the non-display surface side of the reflective display panel 10′ and is formed by laminating an optical-diffusion film 100 between the reflective plate 14 and the reflective display panel 10′.

In the case of such a reflective display device 1′ illustrated in FIG. 15, it is known that since the reflective plate 14 is provided as a separate body on the non-display surface side of the reflective display panel 10′, a double image is prone to occur, as compared with the reflective display device 1 having the reflective plate 14 provided in the interior of the reflective display panel 10 as illustrated in FIG. 1. Particularly, in the case of displaying a high-resolution color image or the like, it is known that the resolution is likely to be decreased.

In regard to the double image, while a light incident into a bright display part in a reflective display panel is reflected by a reflective plate, passes through the bright display part again, and is emitted to the viewer side in a normal case, for example, the double image is a phenomenon in which light incident into a dark display part is reflected by a reflective plate and is emitted not by passing through a dark reflective part but by passing through the bright display part, and thereby shadows are generated in the dark display part due to the light emitted from the bright display part.

Meanwhile, the dark display part means pixels having a relatively lower transmittance compared to the bright display part, and the bright display part means pixels having a relatively higher transmittance compared to the dark display part.

Here, the reflective display body 1′ in which the reflective plate 14 is provided as a separate body outside a TFT substrate 11′ as illustrated in FIG. 15, has a longer distance for light passage compared to the reflective display body 1 in which the reflective plate 14 is integrated with the TFT substrate 11 as illustrated in FIG. 1.

Therefore, as the incident angle of external light increases, a double image is more prone to occur in the reflective display body 1′ illustrated in FIG. 15, as compared with the reflective display body 1 illustrated in FIG. 1.

Furthermore, in a high resolution panel using a color filter, a double image is more prone to occur.

However, in the case of displaying a monochromatic low-resolution image or the like, since a color filter is used, the influence of double image is reduced.

On the other hand, in the case of the reflective display device 1′ illustrated in FIG. 15, since the reflective plate 14 is provided as a separate body on the non-display surface side of the reflective display panel 10′, there is an advantage that production is easier, and the display device can be produced at low cost, compared to the reflective display device 1 having the reflective plate 14 provided in the interior of the reflective display panel 10 as illustrated in FIG. 1.

Furthermore, there is also an advantage that a flat mirror reflective plate as a conventional reflective plate 14 can be easily modified in design to a semi-transmissive reflective plate, or a reflective polarizing plate such as a dual brightness enhancement film (DBEF) or a wire grid polarizing plate, as another reflective plate 14.

Incidentally, the details of the optical-diffusion film 100 will not be repeated here because the details overlap with the matters described above. In addition to that, the details of the various members constituting a reflective display device, such as optical films such as a polarizing plate 23 and the reflective display panel 10′, are equivalent to the matters related to the reflective display device illustrated in FIG. 1, and a λ/4 plate or a λ/2 plate may also be appropriately used.

Furthermore, a polarizing plate on the non-display surface side may be or may not be provided, and even the polarizing plate on the display surface side is not essential in the case of a system which does not require a polarizing plate, such as a guest-host liquid crystal.

Also, the reflective display panel 10′ in the reflective display device 1′ illustrated in FIG. 15 can also be constructed as an electrophoretic display panel, a MEMS shutter type display panel, or an electrowetting type display panel, in addition to a liquid crystal display panel.

Furthermore, it is preferable that the reflective display panel in the reflective display device illustrated in FIG. 15 is a monochromatic display panel.

The reason for this is that, in the case of displaying a monochromatic, particularly low-resolution image, a high-contrast display image is obtained, and as discussed above, the occurrence of a double image caused by a reflective plate that is provided as a separate body on the display surface side of the reflective display panel, does not cause a problem in reality, and advantages such as easy production and low cost become more noticeable.

That is, the display portion in which display light is not diffused and emitted in a reflective display device, that is, the portion in which numerals are displayed in the case of a digital clock has black color, and the background portion in which display light is diffused and emitted in the reflective display device, that is, the portion other than the portion in which numerals are displayed, has white color due to the excellent optical-diffusion characteristics of the predetermined optical-diffusion film.

Therefore, since the background portion has white color, the contrast between this and the black color of the display portion is markedly increased, and the display condition of time can be viewed very easily (see Example 4).

On the other hand, in conventional digital clocks, since the portion in which numerals are displayed has black color while the portion other than the portion in which numerals are displayed has dark green-grey color, the contrast between this and the black color of the display portion is lowered, and the display condition of time is very hard to see (see Comparative Example 3).

Incidentally, in relation to the applications, in a case in which deterioration of the display image does not actually cause a problem, it is also preferable to produce a color display panel by providing a color filter in the reflective display panel.

The effect called high contrast as described above is an effect obtainable from a predetermined optical-diffusion film, and is therefore an effect obtainable not only in the reflective display device illustrated in FIG. 15, but also in the reflective display device illustrated in FIG. 1.

In regard to the matters described above, it has been explained to the effect of having a markedly increased contrast as the portion in which numerals are displayed in a digital clock has black color, while the background portion has white color; however, it is needless to say that excellent contrast is obtained even if white and black colors are reversed.

Furthermore, it is preferable that the reflective display device illustrated in FIG. 15 is applied as a display device for a price tag or a timepiece.

In these applications, a monochromatic low-resolution image is sufficient for the purpose.

When the reflective display device related to the present embodiment is used, high-contrast display images are obtained, while the occurrence of a double image caused by the reflective plate being provided as a separate body on the display surface side of the reflective display panel, does not pose a problem, and the advantages such as easy production and low cost become definitely noticeable.

Incidentally, a price tag is a small-sized reflective display device attached to a display case and used to display the price of a marketed product or the like in a supermarket or the like.

Furthermore, other preferred examples of applications of the reflective display device illustrated in FIG. 15 include a calculator, a panel for vehicle, a panel for an electric appliance, and a panel for an analytic instrument.

Particularly, in a case in which the reflective display device illustrated in FIG. 15 is used as a price tag or the like, it is preferable to use a bistable liquid crystal display panel of a Bi-Nematic mode, a Zenithal Bistable Display (ZBD) mode, a Bistable Twisted Switching Direction (BTDS) mode or the like, as the reflective display panel.

In regard to such a bistable liquid crystal display panel, liquid crystal molecules have two stable orientation states, and voltage application is needed only when the two orientation states are switched, while it is not necessary to continuously apply a voltage in order to maintain a display.

Therefore, in the principle of display as such, the power consumption is proportional to the number of switching of display, and as the switching period is lengthened, the power consumption approaches zero.

Therefore, the display panel is very useful for applications such as a price tag, where low power consumption is required.

EXAMPLES

Hereinafter, the present invention will be described in more detail by way of Examples.

Example 1

1. Production of Optical-Diffusion Film
(1) Synthesis of Low Refractive Index Polymerizable Compound (B) Component In a vessel, 2 moles of isophorone diisocyanate (IPDI) as a component (B1) and 2 moles of 2-hydroxyethyl methacrylate (HEMA) as a component (B3) were introduced relative to 1 mole of a polypropylene glycol (PPG) having a weight average molecular weight of 9,200 as a component (B2), and then the compounds were allowed to react according to a routine method. Thus, a polyether urethane methacrylate having a weight average molecular weight of 9,900 was obtained.

The weight average molecular weights of polypropylene glycol and polyether urethane methacrylate are values measured by gel permeation chromatography (GPC) under the conditions described below and calculated relative to polystyrene standards.

GPC analyzer: manufactured by Tosoh Corp., HLC-8020
GPC column: manufactured by Tosoh Corp. (in the following, described in the order of passage)
  TSK guard column HXL-H
  TSK gel GMHXL (×2)
  TSK gel G2000HXL
Analytic solvent: tetrahydrofuran
Analysis temperature: 40° C.

(2) Preparation of Composition for Optical-Diffusion Film

Next, a composition for optical-diffusion film was obtained by mixing 100 parts by weight of the polyether urethane methacrylate having a weight average molecular weight of 9,900 thus obtained as the component (B), with 150 parts by weight of o-phenylphenoxyethoxyethyl acrylate represented by the above formula (3) and having a molecular weight of 268 (manufactured by Shin Nakamura Chemical Co., Ltd., NK ESTER A-LEN-10) as a component (A) and 20 parts by weight (8 parts by weight relative to the total amount (100 parts by weight) of the component (A) and the component (B)) of 2-hydroxy-2-methyl-1-phenylpropan-1-one as a component (C), and then heating and mixing the mixture under the conditions of 80° C.

Meanwhile, the refractive indices of the component (A) and the component (B) were measured according to JIS K0062 using an Abbe refractometer (manufactured by Atago Co., Ltd., ABBE refractometer DR-M2, Na light source, wavelength 589 nm), and the refractive indices were found to be 1.58 and 1.46, respectively.

(3) Application Step

Next, the composition for optical-diffusion film thus obtained was applied on a film-like transparent polyethylene terephthalate (hereinafter, referred to as PET) as a process sheet, and thus a coating layer having a film thickness of 170 µm was formed.

(4) Active Energy Ray Irradiation

Next, while the coating layer was moved in the B-direction as shown in FIG. 12($b$), the coating layer was irradiated with parallel light having a parallelism of 2° or less (ultraviolet radiation emitted from a high pressure mercury lamp, having a primary peak wavelength at 365 nm, and other peaks at 254, 303 and 313 nm) such that the angle of irradiation ($\theta 3$ in FIG. 14) would be almost 10°, using an ultraviolet spot parallel light source (manufactured by Japan Technology System Corp.) having the central ray parallelism controlled to ±3° or less.

The peak illuminance at that time was set to 2.00 mW/cm$^2$, the cumulative amount of light was set to 53.13 mJ/cm$^2$, the lamp height was set to 240 mm, and the travel speed of the coating layer was set to 0.2 m/min.

Subsequently, in order to promote reliable curing, the exposed surface side of the coating layer was laminated with an ultraviolet-transmissive peeling film having a thickness of 38 µm (manufactured by Lintec Corp., SP-PET382050; center line average roughness at the surface on the side irradiated with ultraviolet radiation: 0.01 µm, haze value: 1.80%, image definition: 425, and transmittance for the wavelength of 360 nm: 84.3%).

Subsequently, the coating layer was completely cured by irradiating the coating layer, from above the peeling film, with a scattered light produced by making the direction of propagation of the above-mentioned parallel light random under the conditions of a peak illuminance of 10 mW/cm$^2$ and a cumulative amount of light of 150 mJ/cm$^2$, and thus an optical-diffusion film in which the film thickness excluding the process sheet and the peeling film was 170 µm, was obtained.

Meanwhile, the peak illuminance and the cumulative amount of light described above were measured by installing a UV METER (manufactured by Eye Graphics Co., Ltd., EYE ultraviolet cumulative illuminometer UVPF-A1) equipped with a light receiver at the position of the coating layer.

Furthermore, the film thickness of the optical-diffusion film thus obtained was measured using a constant pressure thickness meter (manufactured by Takara Co., Ltd., TECLOCK PG-02J).

Figure 16A:
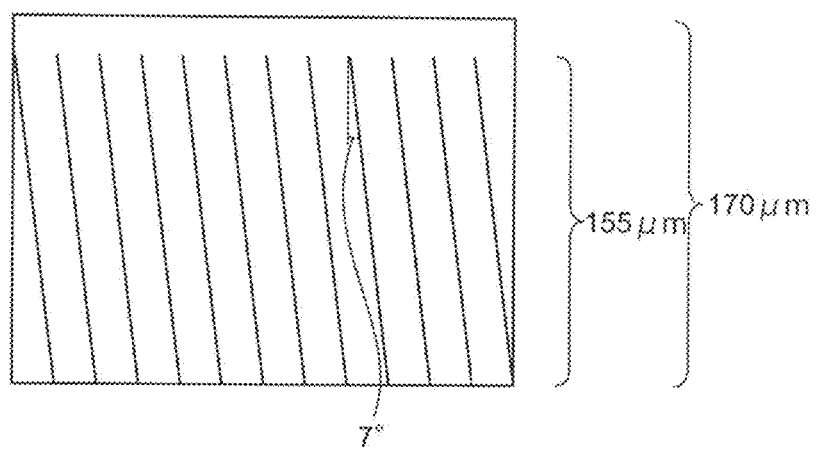
FIGS. 16(a) to 16(c) are a diagram and photographs provided to illustrate a cross-section of the optical-diffusion film according to Example 1.
Figure 16B:
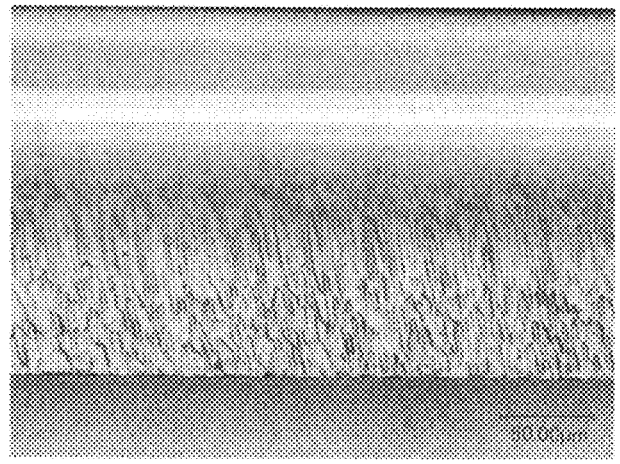
Figure 16C:
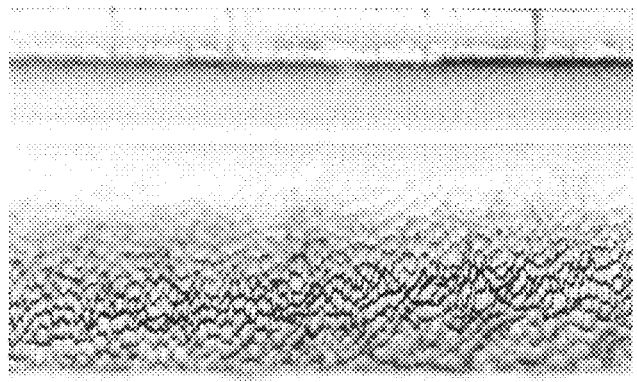

Furthermore, a schematic diagram of a cross-section obtained by cutting the optical-diffusion film thus obtained, at a plane that is parallel to the traveling direction of the coating layer and orthogonally intersects with the film plane, is shown in FIG. 16($a$), and a photograph of the cross-section is presented in FIG. 16($b$).

Furthermore, a cross-sectional photograph of a cross-section obtained by cutting the optical-diffusion film thus obtained, at a plane that is perpendicular to the traveling direction of the coating layer and orthogonally intersects with the film plane, is presented in FIG. 16($c$). From FIGS. 16($b$) and 16($c$), it is understood that the internal structure in the optical-diffusion film thus obtained is a columnar structure having modified pillar-shaped objects illustrated in FIG. 3($a$).

Meanwhile, cutting of the optical-diffusion film was performed using a razor, and image-capturing of the cross-sectional photographs was carried out by reflective observation using a digital microscope (manufactured by Keyence Corp., VHX-2000).

(5) Evaluation of Optical-Diffusion Characteristics (5)-1 Measurement of Haze Value The haze value of the optical-diffusion film thus obtained was measured.

That is, as illustrated in FIG. 4($b$), the haze value (%) at each incident angle $\theta 1$ was measured according to ASTM D 1003 using a modified apparatus manufactured by BYK Chemie GmbH by rotating the optical-diffusion film thus obtained, while varying the incident angle $\theta 1$ with respect to the normal line of the film plane in the range of −70° to 70° along the travel direction B of the coating layer.

Figure 17A:
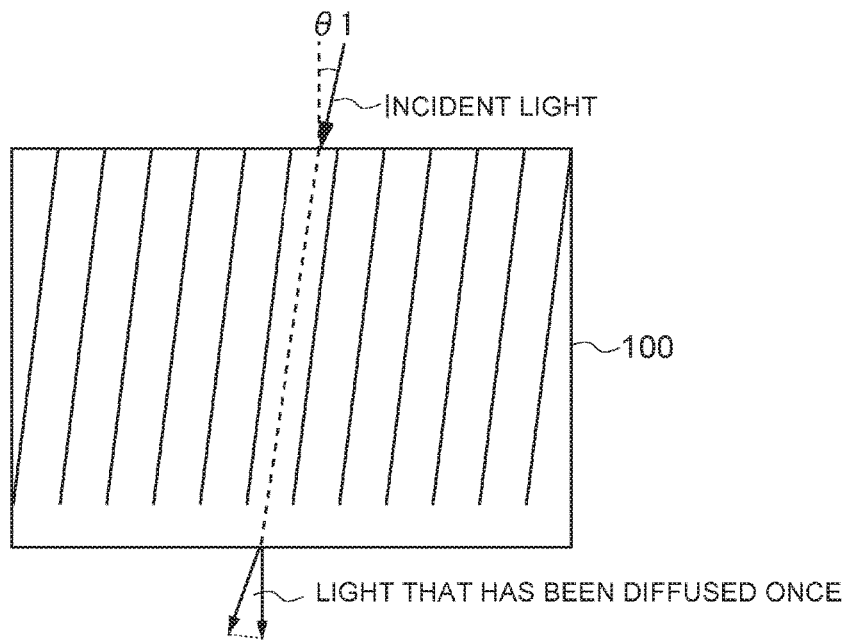
FIGS. 17(a) and 17(b) are diagrams provided to explain the shape of light incidence when the optical-diffusion characteristics of an optical-diffusion film are analyzed.
Figure 17B:
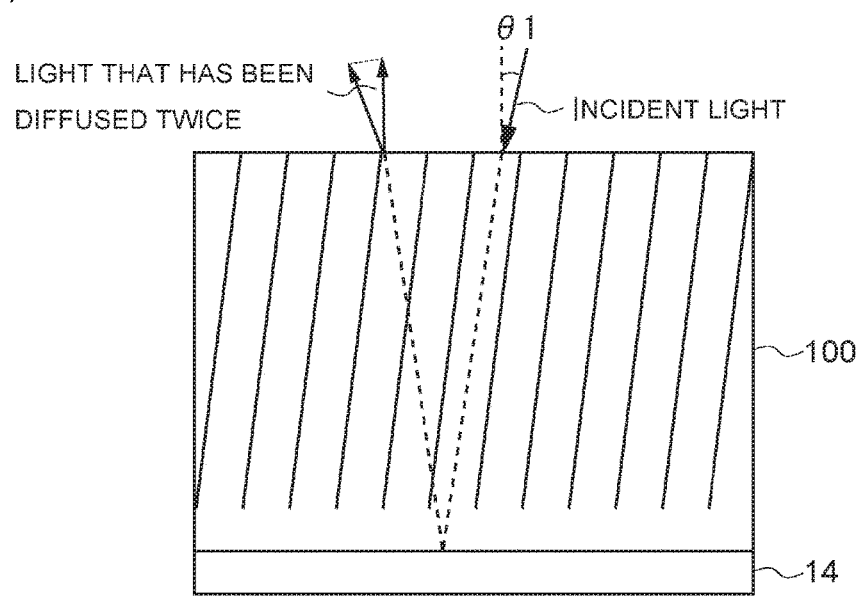

Furthermore, incidence of light into the optical-diffusion film was achieved through the rear side of the optical-diffusion film, that is, the opposite side of the side irradiated with active energy radiation at the time of production of the optical-diffusion film, as illustrated in FIG. 17($a$).

Figure 18:
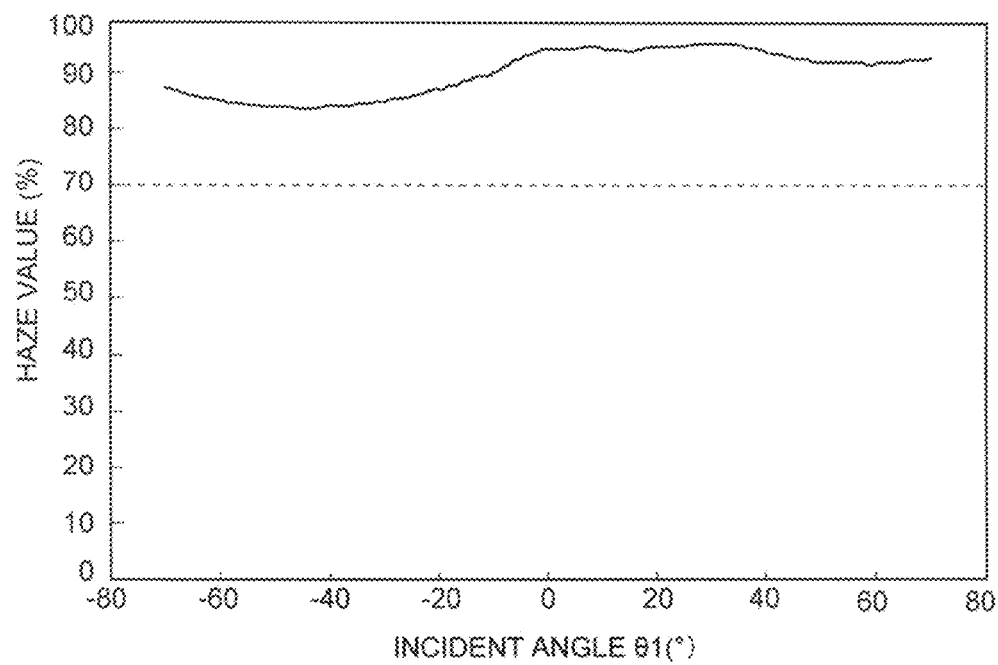
FIG. 18 is a diagram provided to illustrate an incident angle-haze value chart of the optical-diffusion film according to Example 1.

Furthermore, in the following Examples and Comparative Examples, an incident angle $\theta 1$ having a gradient of the same side as the inclination of the pillar-shaped objects is indicated as a positive value, and an incident angle $\theta 1$ having a gradient of the opposite side of the inclination of the pillar-shaped objects is indicated as a negative value. An incident angle-haze value chart thus obtained is shown in FIG. 18.

Meanwhile, the haze value (%) means a value calculated by the following mathematical expression (1), and in the following mathematical expression (1), the diffusion transmittance (%) is a value obtained by subtracting the parallel light transmittance (%) from the whole line transmittance (%), and the parallel light transmittance (%) means the transmittance of light having a spreading to ±2.5° with respect to the travel direction of straight transmitted light.

$$\text{Haze value (\%)} = \text{(Diffusion transmittance (\%))} / \text{(whole line transmittance (\%))} \times 100 \quad \text{[Mathematical Formula 1]}$$

(5)-2 Analysis by Conoscopy

The optical-diffusion characteristics corresponding to the case in which the optical-diffusion film thus obtained was applied to a reflective display device, were measured.

Figure 19:
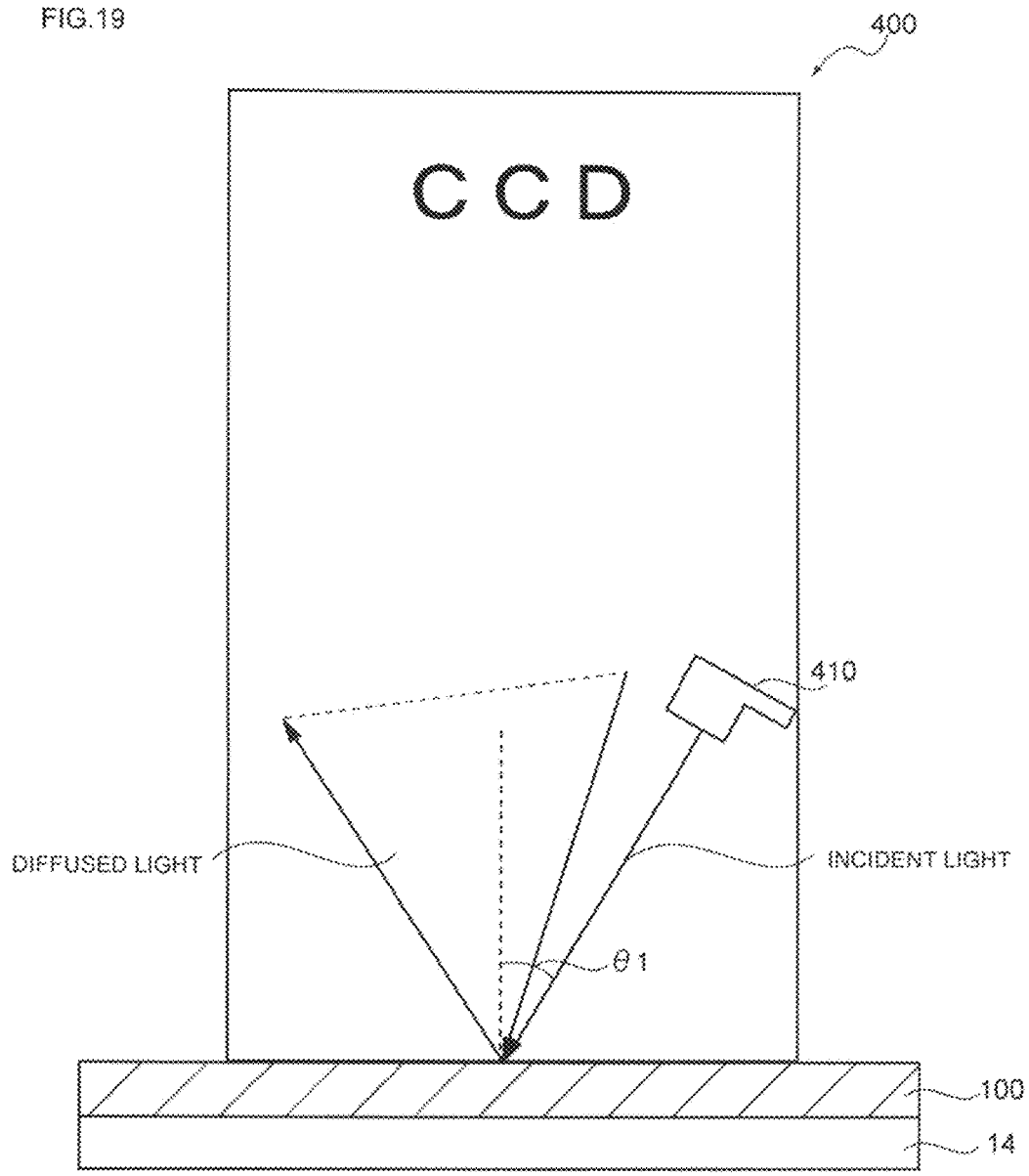
FIG. 19 is a diagram provided to explain a method for analyzing optical-diffusion characteristics in the case of applying an optical-diffusion film to a reflective display device.
Figure 20A:
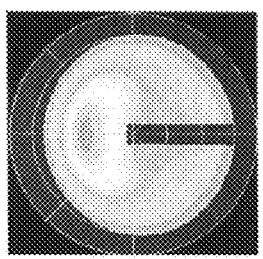
FIGS. 20(a) to 20(h) are conoscopic images provided to exhibit corresponding optical-diffusion characteristics in a case in which the optical-diffusion film according to Example 1 is applied to a reflective display device.
Figure 20B:
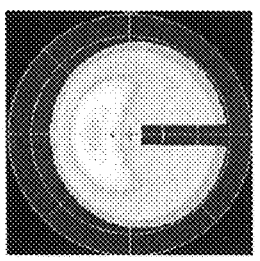
Figure 20C:
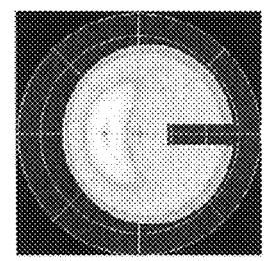
Figure 20D:
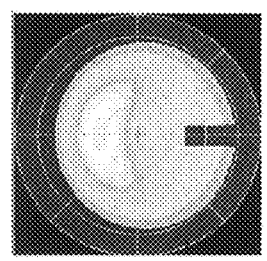
Figure 20E:
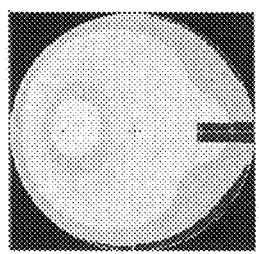
Figure 20F:
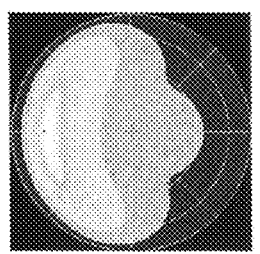
Figure 20G:
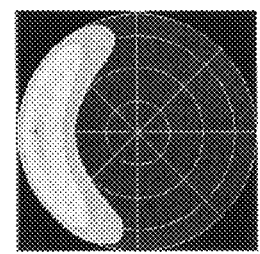
Figure 20H:
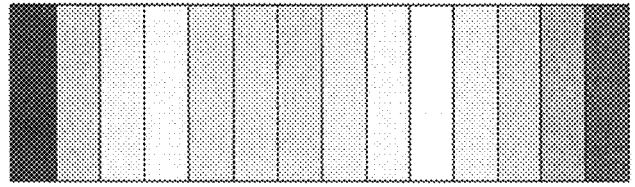

That is, as shown in FIG. 19, the optical-diffusion film 100 thus obtained was pasted to a reflective plate 14, and the resultant was used as a specimen for analysis.

Subsequently, as illustrated in FIG. 19, light emitted from a movable light source arm 410 was made incident to the a specimen (100, 14) using a reflection mode of CONOSCOPE (manufactured by Autronic-Melcher GmbH) 400, as illustrated in FIG. 19.

Also, incidence of light to the optical-diffusion film at that time was achieved through the rear side of the optical-diffusion film, that is, the opposite side of the side irradiated with active energy radiation when the optical-diffusion film was produced, as illustrated in FIG. 17($b$).

Furthermore, also in the following Examples and Comparative Examples, an incident angle $\theta 1$ having a gradient of the same side as the inclination of the pillar-shaped objects is indicated as a positive value, and an incident angle $\theta 1$ having a gradient of the opposite side of the inclination of the pillar-shaped objects is indicated as a negative value. Conoscopic images thus obtained are presented in FIGS. 20($a$) to 20($g$).

Meanwhile, the reflective plate was BV2 manufactured by JDS Uniphase Corp., and the specimen for analysis was obtained by bonding an optical-diffusion film on an aluminum-deposited surface of such a reflective plate using a tacky adhesive layer having a thickness of 15 µm.

Furthermore, as shown in FIG. 20($h$), these conoscopic images show the luminance distribution from 0 cd/m$^2$ to the maximum luminance value in each conoscopic image in fourteen divided stages from blue color to red color, with 0 cd/cm² representing blue, while the range of from a value exceeding 0 cd/m² to the maximum luminance value in each conoscopic image being equally divided into 13 stages, and as the value approaches from 0 cd/m² to the maximum luminance value, the color changes in thirteen stages from blue to light blue to green to yellow to orange to red.

Furthermore, the radially drawn lines in each conoscopic image represent the azimuthal directions 0° to 180°, 45° to 225°, 90° to 270°, and 135° to 315°, respectively, and the concentrically drawn lines represent the polar angle directions 18°, 38°, 58°, and 78° in order from the inner side.

Therefore, the color at the central portion of the various concentric circles in each conoscopic image represents the relative luminance of diffused light that has been diffused and emitted toward the film front.

Figure 21:
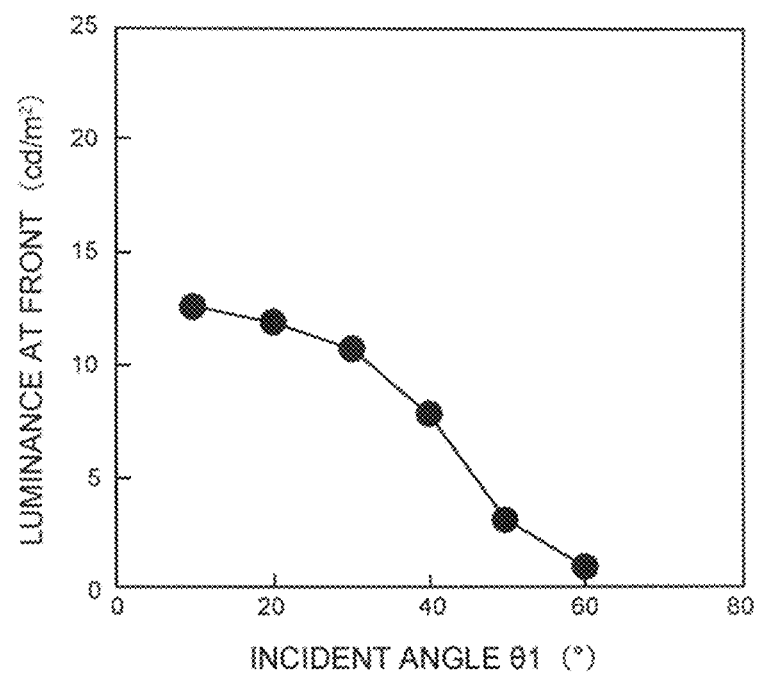
FIG. 21 is an incident angle-luminance chart provided to exhibit corresponding optical-diffusion characteristics in a case in which the optical-diffusion film according to Example 1 is applied to a reflective display device.

Furthermore, FIG. 21 shows an incident angle-luminance chart showing the relationship between the incident angle θ1 and the luminance (cd/m²) at the central portion of the various concentric circles in FIGS. 20(a) to 20(g). From such FIG. 21, it is understood that incident light of a wide range of the incident angle θ1=0° to 50° can be efficiently diffused and emitted to the film front.

2. Production and Evaluation of Reflective Display Device

Subsequently, a reflective display device was produced by bonding the optical-diffusion film thus obtained onto a polarizing plate, as illustrated in FIG. 1.

A predetermined image was displayed using the reflective display device thus obtained, and the visibility condition was evaluated. It was confirmed that the reflective display device had a satisfactory visibility condition as illustrated in FIG. 22.

Figure 22:
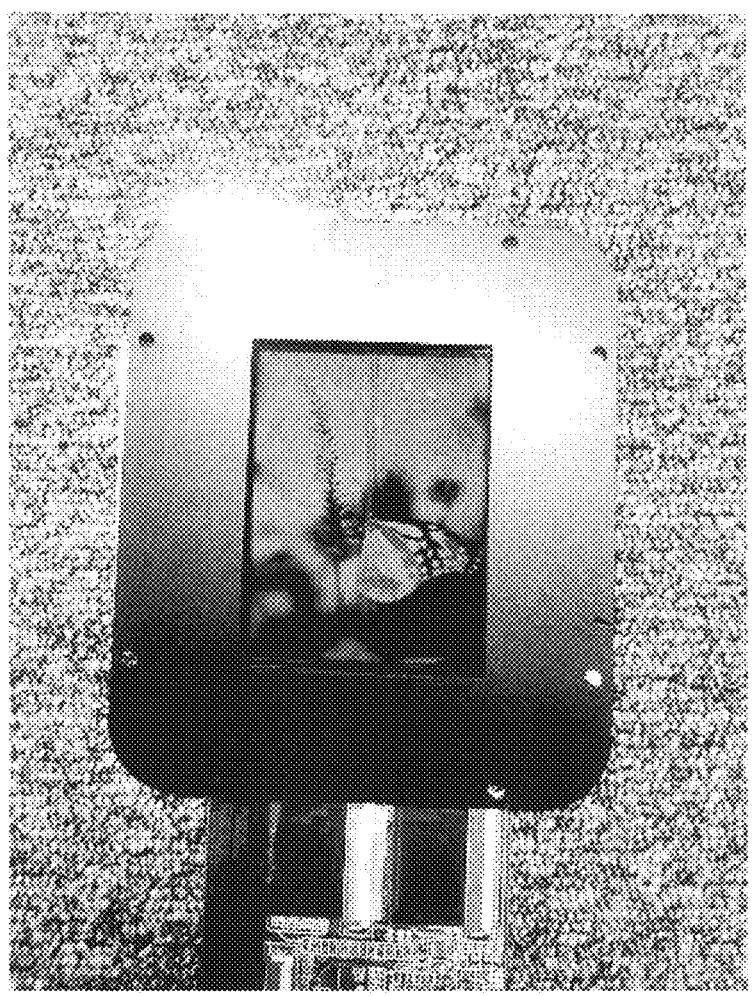
FIG. 22 is a diagram provided to illustrate the visibility state of a predetermined image in a case in which the optical-diffusion film according to Example 1 is actually applied to a reflective display device.

It was also confirmed that the visibility condition of the displayed images in an actual reflective display device illustrated in FIG. 22, and the optical-diffusion characteristics of the optical-diffusion film shown in FIGS. 20(a) to 20(g), which were measured with the specimens described above as samples using a conoscope, were correlated with each other and were not contradictory to each other.

Example 2

In Example 2, an optical-diffusion film was produced and evaluated in the same manner as in Example 1, except that when the composition for optical-diffusion film was prepared, an ultraviolet absorber represented by the above formula (10) (manufactured by BASF SA, TINUVIN 384-2) as a component (D) was further added in an amount of 0.5 parts by weight relative to 100 parts by weight of the component (B) (0.2 parts by weight relative to the total amount (100 parts by weight) of the component (A) and the component (B)). The results thus obtained are presented in FIGS. 23 to 27.

Figure 23A:
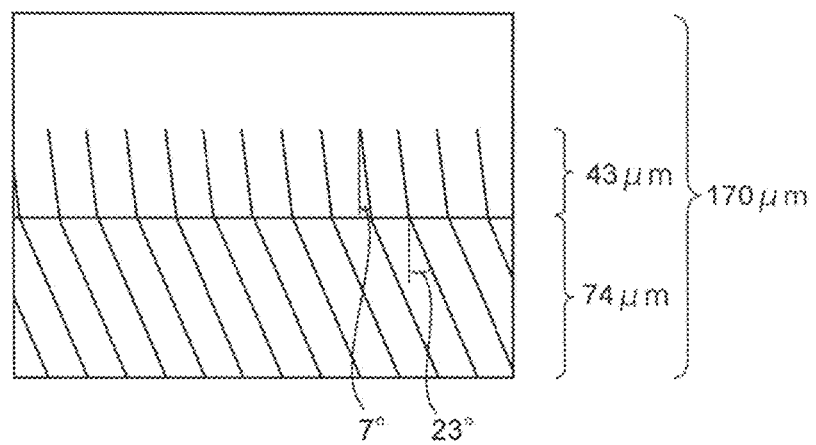
FIGS. 23(a) to 23(c) are a diagram and photographs provided to illustrate a cross-section of the optical-diffusion film according to Example 2.
Figure 23B:
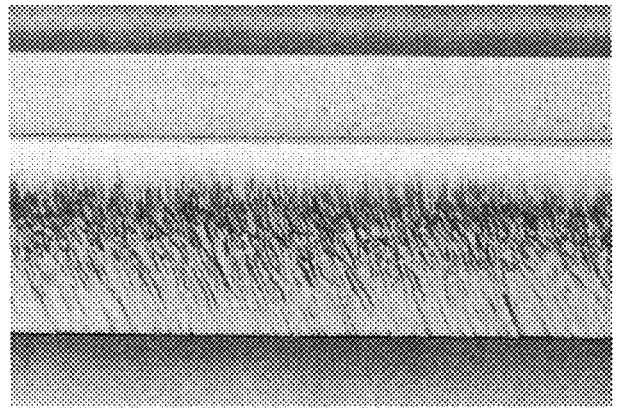

Here, FIG. 23(a) is a schematic diagram of a cross-section obtained by cutting the optical-diffusion film thus obtained, at a plane that is parallel to the travel direction of the coating layer and orthogonally intersects with the film plane, and FIG. 23(b) is a photograph of the cross-section.

Figure 23C:
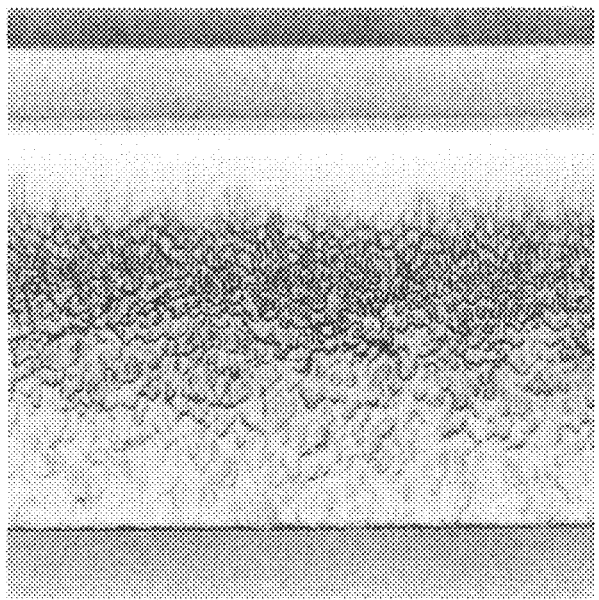

Furthermore, FIG. 23(c) is a photograph of a cross-section obtained by cutting the optical-diffusion film thus obtained, at a plane that is perpendicular to the travel direction of the coating layer and orthogonally intersects with the film plane.

Figure 24A:
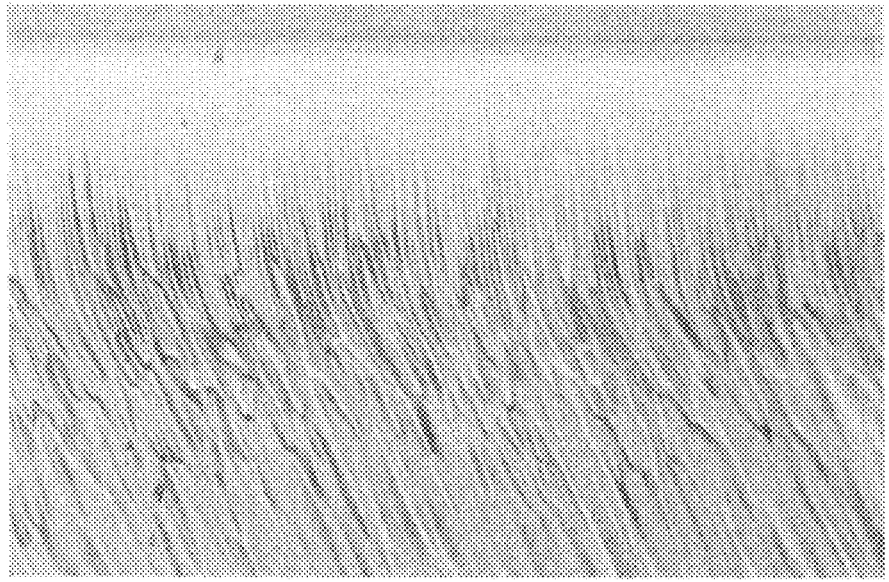
FIGS. 24(a) and 24(b) are other photographs provided to show a cross-section of the optical-diffusion film according to Example 2.
Figure 24B:
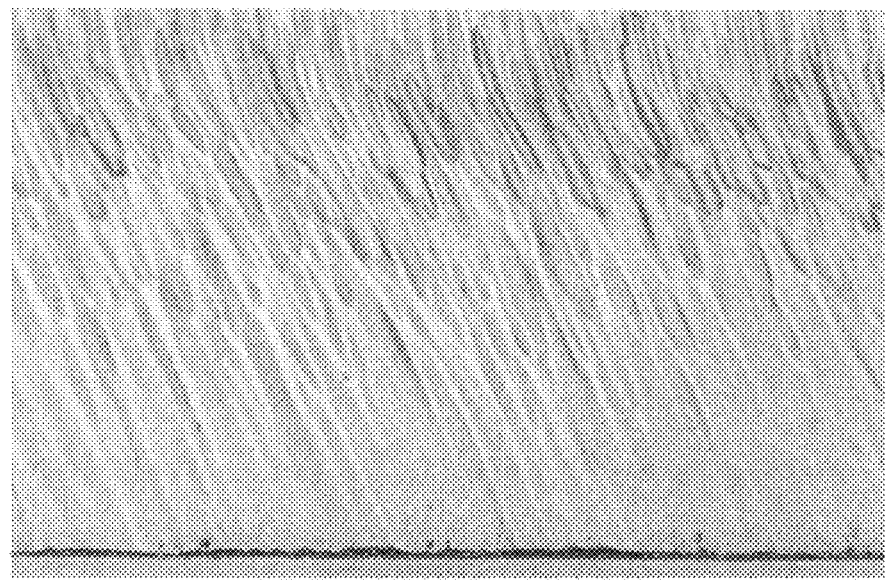

Furthermore, FIG. 24(a) is a photograph of a magnified view of the vicinity of the bent part of the pillar-shaped objects in the cross-sectional photograph of FIG. 23(b), and FIG. 24(b) is a photograph of a further magnified view of the lower portion below the bent part of the pillar-shaped objects. From FIGS. 23(b) and 23(c) and FIGS. 24(a) and 24(b), it is understood that the internal structure of the optical-diffusion film thus obtained is a columnar structure having modified pillar-shaped objects as shown in FIG. 10(a).

Figure 25:
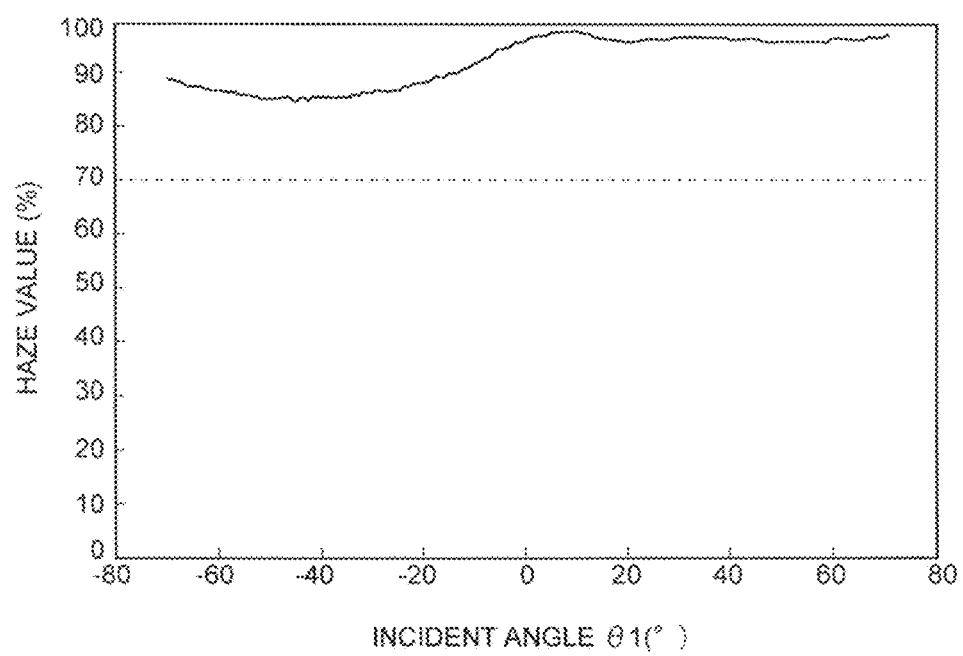
FIG. 25 is a diagram provided to show an incident angle-haze value chart for the optical-diffusion film according to Example 2.

FIG. 25 is an incident angle-haze value chart in the optical-diffusion film thus obtained.

FIGS. 26(a) to 26(g) are photographs showing the optical-diffusion condition corresponding to the case in which the optical-diffusion film thus obtained was applied to a reflective display device.

Incidentally, it was confirmed that the visibility condition of the displayed images in a reflective display device to which the optical-diffusion film thus obtained was actually applied, and the optical-diffusion characteristics of the optical-diffusion films shown in FIG. 26(a) to 26(g) were correlated with each other and were not contradictory to each other.

Figure 27:
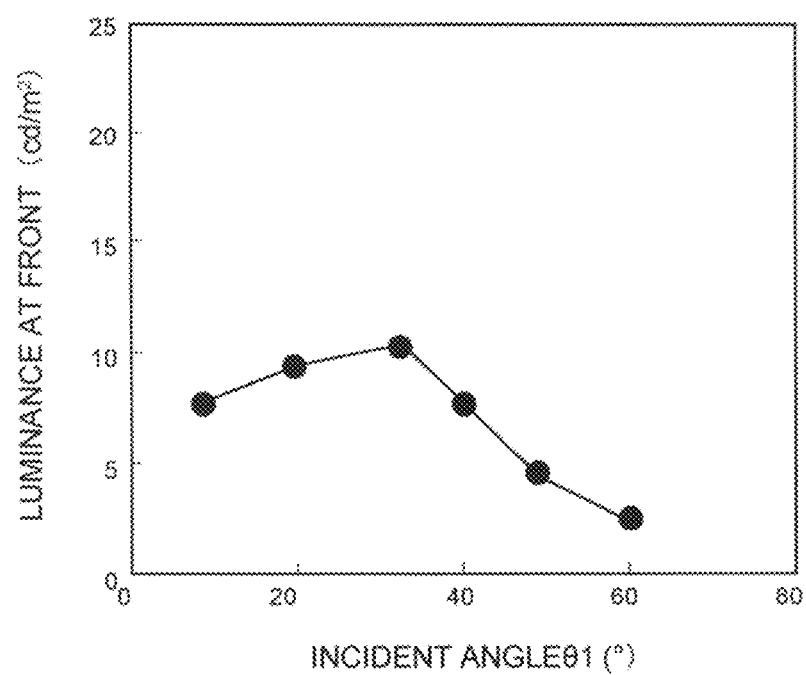
FIG. 27 is an incident angle-luminance chart provided to exhibit corresponding optical-diffusion characteristics in a case in which the optical-diffusion film according to Example 2 is applied to a reflective display device.

Furthermore, FIG. 27 is an incident angle-luminance chart showing the relationship between the incident angle θ1 and the luminance (cd/m²) at the central portion of the various concentric circles in FIGS. 26(a) to 26(g). From such FIG. 27, it is understood that incident angle of a wide range of the incident angle θ1=0° to 60° can be efficiently diffused and emitted to the film front.

Example 3

In Example 3, an optical-diffusion film was produced and evaluated in the same manner as in Example 1, except that the film thickness of the coating layer was changed to 210 µm, and at the time of active energy ray irradiation, the coating layer was irradiated with a parallel light having a parallelism of 2° or less such that the angle of irradiation (θ3 in FIG. 14) would be almost 25°, using an ultraviolet spot parallel light source (manufactured by Japan Technology System Corp.) having the central ray parallelism controlled to ±3° or less, instead of irradiating the coating layer with parallel light and then irradiating scattered light while the peeling film was laminated on the exposed surface side of the coating layer. The film thickness of the optical-diffusion film thus obtained was 210 µm. The results thus obtained are presented in FIGS. 28 to 32.

Figure 28A:
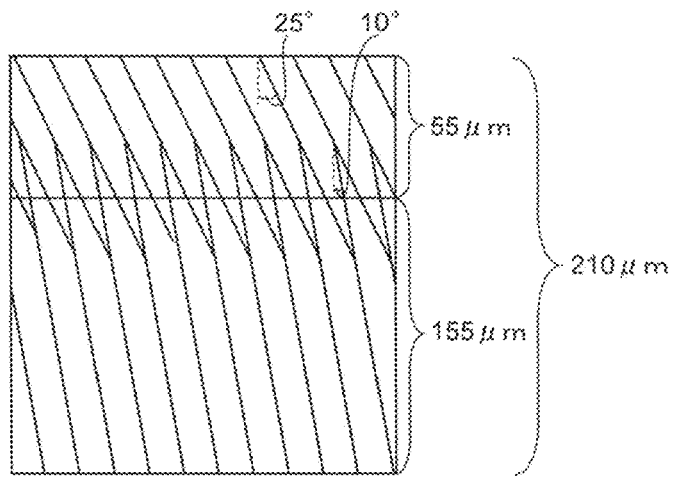
FIGS. 28(a) to 28(c) are a diagram and photographs provided to illustrate a cross-section of the optical-diffusion film according to Example 3.
Figure 28B:
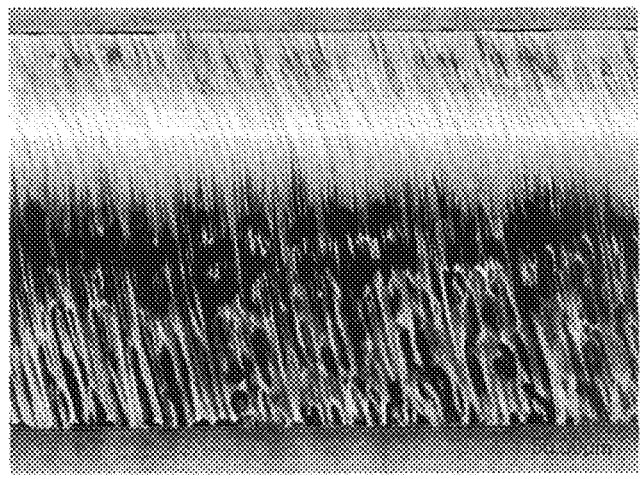

Here, FIG. 28(a) is a schematic diagram of a cross-section obtained by cutting the optical-diffusion film thus obtained, at a plane that is parallel to the travel direction of the coating layer and orthogonally intersects with the film plane, and FIG. 28(b) is a photograph of the cross-section.

Figure 28C:
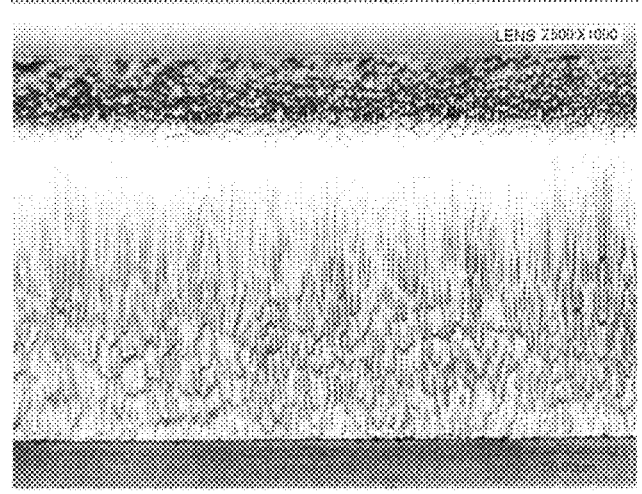

Also, FIG. 28(c) is a cross-sectional photograph of a cross-section obtained by cutting the optical-diffusion film thus obtained, at a plane that is perpendicular to the travel direction of the coating layer and orthogonally intersects with the film plane.

Figure 29A:
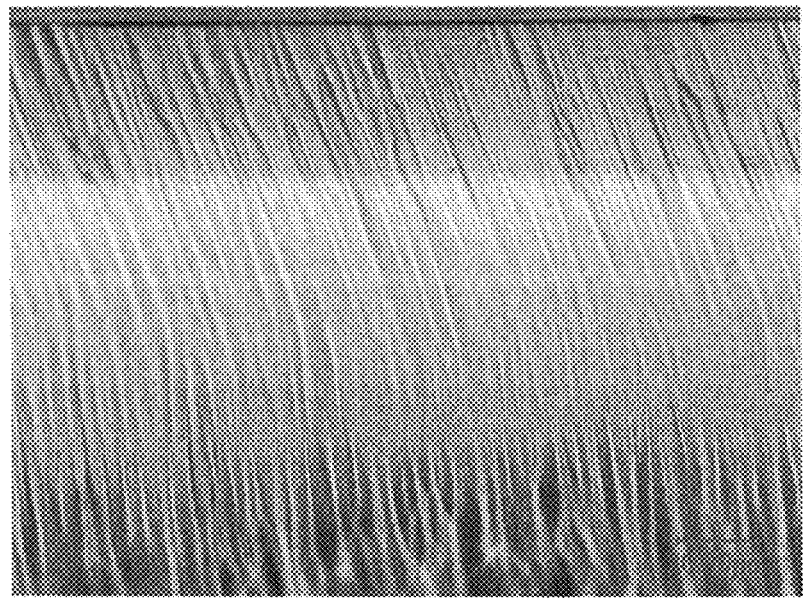
FIGS. 29(a) and 29(b) are other photographs provided to show a cross-section of the optical-diffusion film according to Example 3.
Figure 29B:
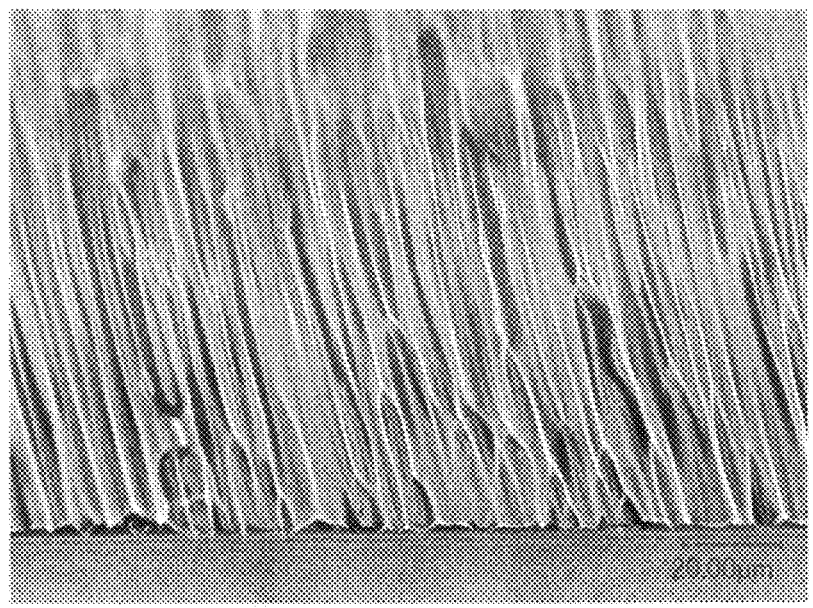

FIG. 29(a) is a photograph of a magnified view of the vicinity of the overlapping columnar structural region in which first pillar-shaped objects and second pillar-shaped objects are overlapping as shown in the cross-sectional photograph of FIG. 28(b), and FIG. 29(b) is a photograph of a further magnified view of the lower portion below the overlapping columnar structural region. From FIGS. 28(b) and 28(c) and FIGS. 29(a) and 29(b), it is understood that the internal structure in the optical-diffusion film thus obtained is a columnar structure having modified pillar-shaped objects as shown in FIG. 10(b).

Figure 30:
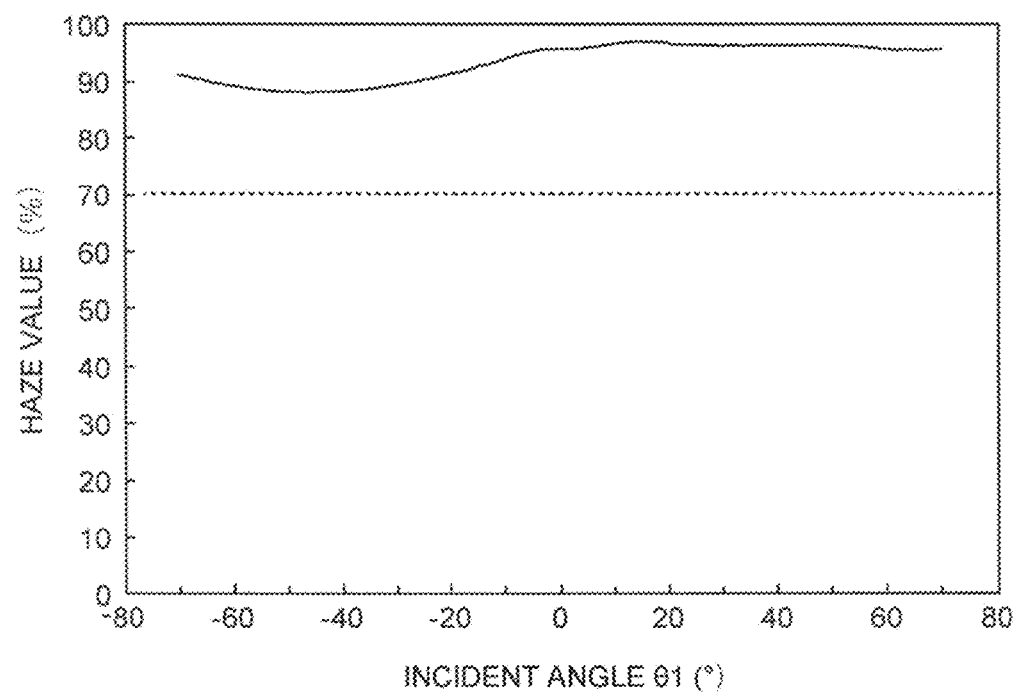
FIG. 30 is a diagram provided to show an incident angle-haze value chart for the optical-diffusion film according to Example 3.

FIG. 30 is an incident angle-haze value chart for the optical-diffusion film thus obtained.

Furthermore, FIGS. 31(a) to 31(g) are photographs showing the corresponding optical-diffusion condition in the case in which the optical-diffusion film thus obtained was applied to a reflective display device.

Incidentally, it was confirmed that the visibility condition of the displayed images in the reflective display device to which the optical-diffusion film thus obtained was actually applied, and the optical-diffusion characteristics of the optical-diffusion film shown in FIGS. 31(a) to 31(g) were correlated with each other and were not contradictory to each other.

Furthermore, FIG. 32 is an incident angle-luminance chart showing the relationship between the incident angle θ1 and the luminance (cd/m$^2$) at the central portion of the various concentric circles shown in FIGS. 31(a) to 31(g). From such FIG. 32, it is understood that incident angle of a wide range of the incident angle θ1=0° to 60° can be efficiently diffused and emitted to the film front.

Comparative Example 1

Figure 33A:
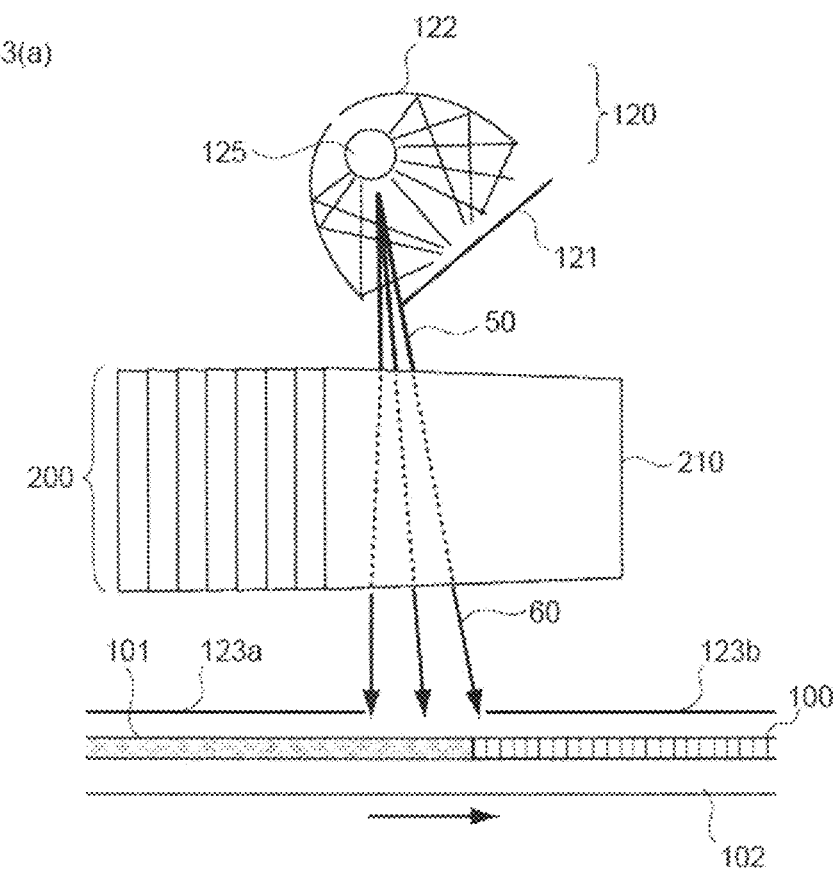
FIGS. 33(a) and 33(b) are diagrams provided to illustrate the ultraviolet irradiating apparatus and irradiated light parallelizing members used in Comparative Example 1.

In Comparative Example 1, an ultraviolet irradiating apparatus (manufactured by Eye Graphics Co., Ltd., small-sized experimental machine) in which a linear high pressure mercury lamp (diameter 25 mm, length 2.4 m, and output power 28.8 kW) shown in FIG. 33(a) was equipped with a cold mirror for light collection, was prepared instead of the ultraviolet spot parallel light source.

Figure 33B:
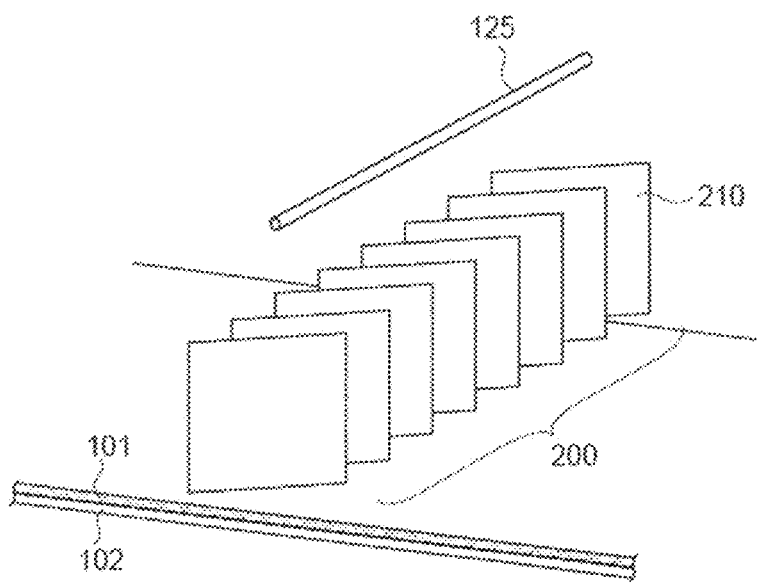

Subsequently, irradiated light parallelizing members in which plural plate-shaped members are respectively arranged to be parallel as shown in FIG. 33(b) were disposed between a linear ultraviolet lamp and the coating layer.

Figure 34A:
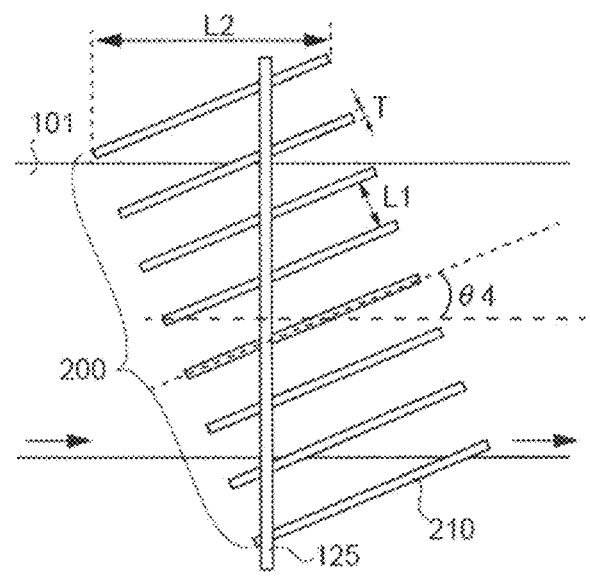
FIGS. 34(a) and 34(b) are other diagrams provided to illustrate the ultraviolet irradiating apparatus and irradiated light parallelizing members used in Comparative Example 1.

At this time, the irradiated light parallelizing members were arranged such that when viewed from the upper part of the coating layer, the travel direction of the coating layer and the direction of the plate-shaped members were extended would form an acute angle, that is, the angle θ4 in FIG. 34(a) would be 45°.

Furthermore, as illustrated in FIG. 33(a), two sheets of light blocking members were interposed between the coating layer and the irradiated light parallelizing members.

Furthermore, the interval between the plural plate-shaped members (L1 in FIG. 34(a)) in the irradiated light parallelizing members was 23 mm, the width of a plate-shaped member (L2 in FIG. 34(a)) was 510 mm, the thickness of a plate-shaped member was 1.6 mm, and the material was a heat-resistant black-painted Ulster steel sheet.

Figure 34B:
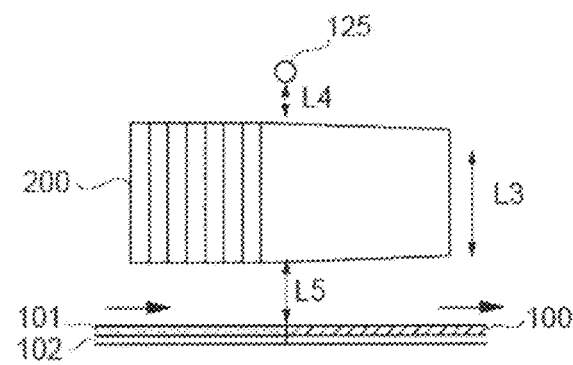

Also, the length from the upper end to the lower end of a irradiated light parallelizing member (L3 in FIG. 34(b)) was 200 mm, the distance between the upper end of the irradiated light parallelizing members and the lower end of the linear ultraviolet lamp (L4 in FIG. 34(b)) was 100 mm, and the distance between the lower end of the irradiated light parallelizing members and the surface of the coating layer (L5 in FIG. 34(c)) was 1700 mm.

The length W of the travel direction of the coating layer in the region irradiated with active energy radiation in the coating layer is the length between the two sheets of light blocking members 123a and 123b as illustrated in FIG. 33(a), and the length was 360 mm.

Furthermore, the linear ultraviolet lamp was disposed such that the travel direction of the coating layer and the longitudinal direction of the linear ultraviolet lamp orthogonally intersect with each other.

Subsequently, the coating layer was irradiated via the peeling film with a parallel light having a parallelism of −5° or less such that the angle of irradiation (θ3 in FIG. 14) would be 0°, by irradiating ultraviolet radiation emitted from a linear ultraviolet lamp through irradiated light parallelizing members, and thus an optical-diffusion film having a film thickness of 170 µm was obtained.

The peak illuminance of the peeling film surface was 1.05 mW/cm$^2$, the cumulative amount of light was 22.6 mJ/cm$^2$, and the travel speed of the coating layer was set to 1.0 m/min. The results thus obtained are presented in FIGS. 35 to 38.

Figure 35A:
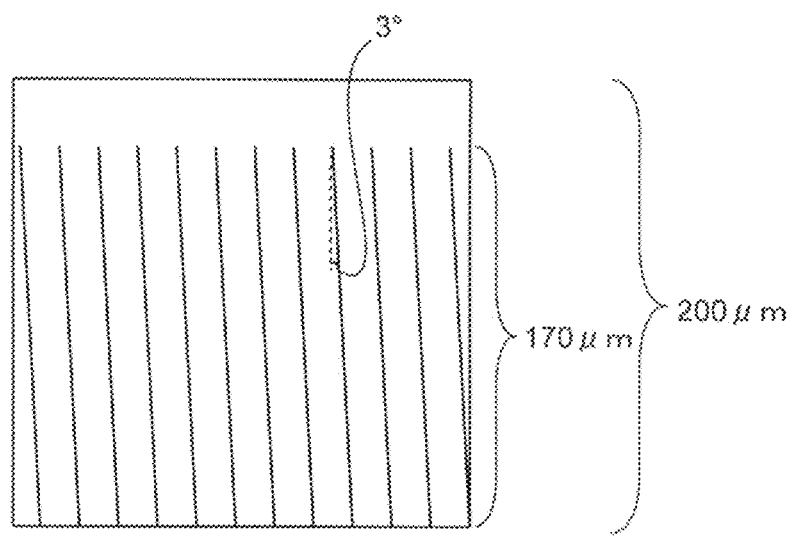
FIGS. 35(a) to 35(c) are a diagram and photographs provided to illustrate a cross-section of an optical-diffusion film according to Comparative Example 1.
Figure 35B:
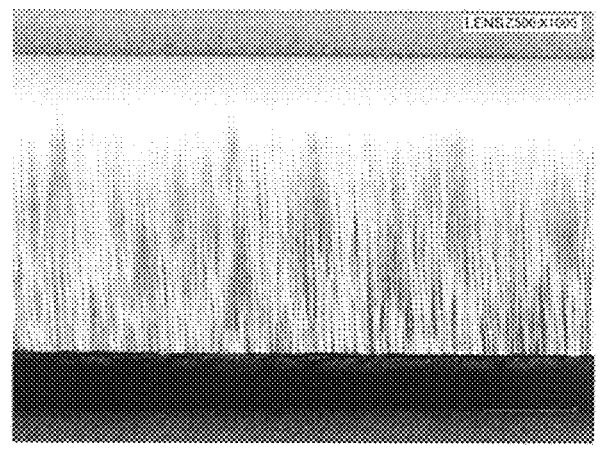

Here, FIG. 35(a) is a schematic diagram of a cross-section obtained by cutting the optical-diffusion film thus obtained, at a plane that is parallel to the travel direction of the coating layer and orthogonally intersects with the film plane, and FIG. 35(b) is a photograph of the cross-section.

Figure 35C:
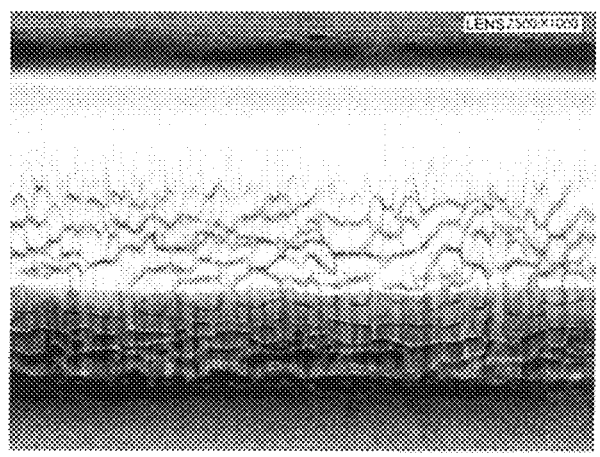

Furthermore, FIG. 35(c) is a photograph of a cross-section obtained by cutting the optical-diffusion film thus obtained, at a plane that is perpendicular to the travel direction of the coating layer and orthogonally intersects with the film plane.

Figure 36:
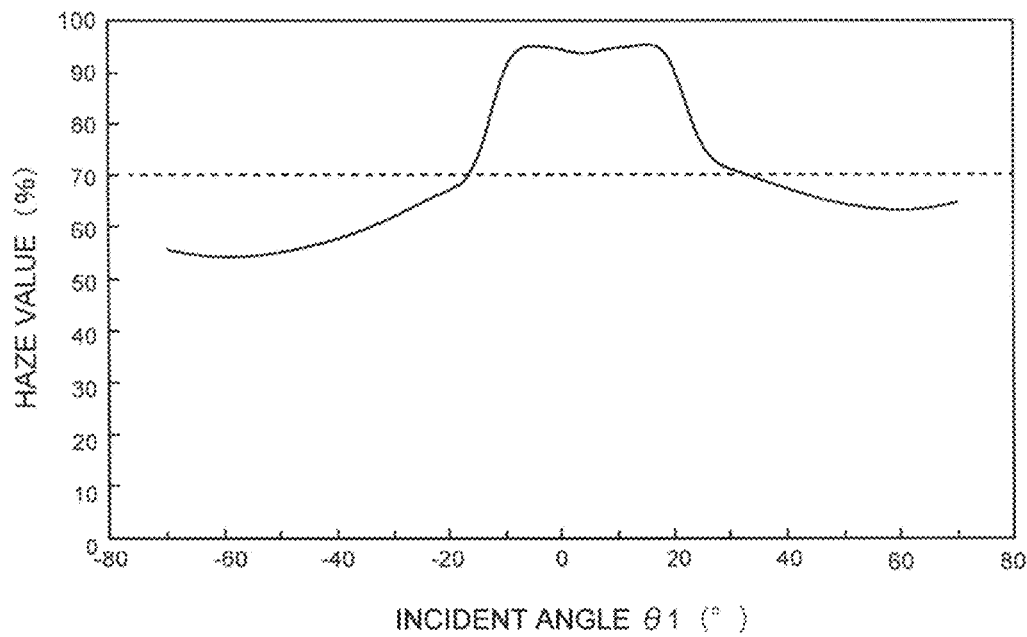
FIG. 36 is a diagram provided to show an incident angle-haze value chart for the optical-diffusion film according to Comparative Example 1.
Figure 37A:
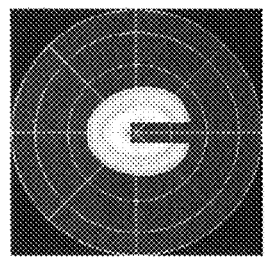
FIGS. 37(a) to 37(g) are conoscopic images provided to show corresponding optical-diffusion characteristics in a case in which the optical-diffusion film according to Comparative Example 1 is applied to a reflective display device.
Figure 37B:
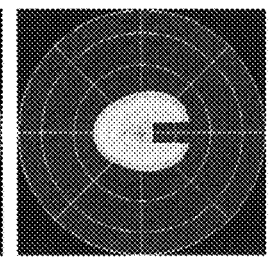
Figure 37C:
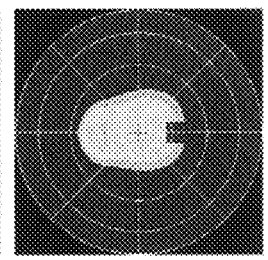
Figure 37D:
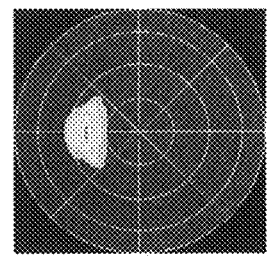
Figure 37E:
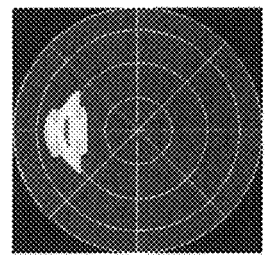
Figure 37F:
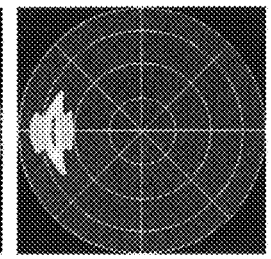
Figure 37G:
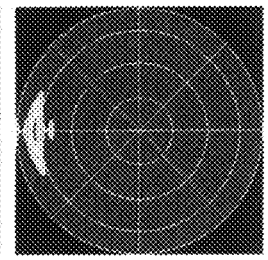

Furthermore, FIG. 36 is an incident angle-haze value chart in the optical-diffusion film thus obtained.

Furthermore, FIGS. 37(a) to 37(g) are photographs showing the optical-diffusion condition corresponding to the case in which the optical-diffusion film thus obtained was applied to a reflective display device.

Incidentally, it was confirmed that the visibility condition of the displayed images in the reflective display device to which the optical-diffusion film thus obtained was actually applied, and the optical-diffusion characteristics of the optical-diffusion film shown in FIGS. 37(a) to 37(g) were correlated with each other and were not contradictory to each other.

Figure 38:
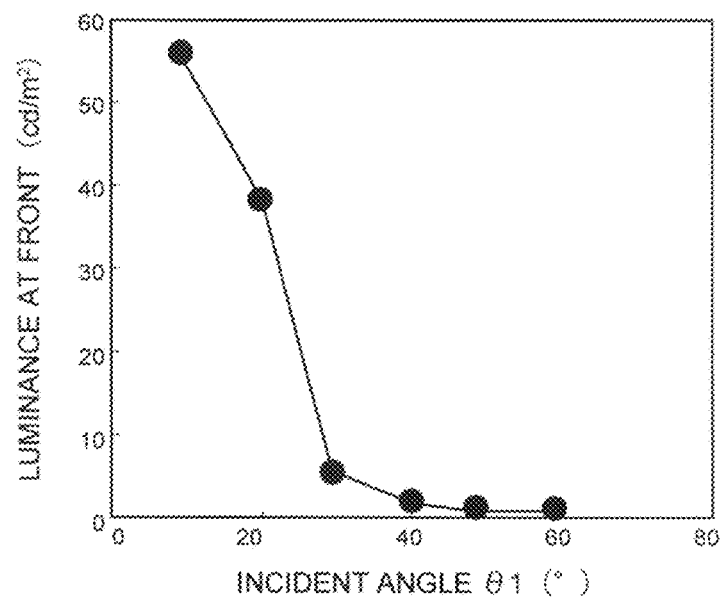
FIG. 38 is an incident angle-luminance chart provided to show corresponding optical-diffusion characteristics in a case in which the optical-diffusion film according to Comparative Example 1 is applied to a reflective display device.

Furthermore, FIG. 38 is an incident angle-luminance chart showing the relationship between the incident angle θ1 and the luminance (cd/m$^2$) at the central portion of the various concentric circles in FIGS. 37(a) to 37(g). From such FIG. 38, it is understood that only an incident light of a narrow range of the incident angle θ1=0° to 30° can be diffused and emitted to the film front.

Comparative Example 2

In Comparative Example 2, an ethyl acetate solution of a tacky adhesive material (solid content 14% by weight) was prepared by mixing 100 parts by weight of an acrylic copolymer having a weight average molecular weight of 1,800,000, obtained by polymerizing butyl acrylate and acrylic acid at a weight ratio of 95:5 according to a conventional method, with 15 parts by weight of tris(acryloxyethyl) isocyanurate (manufactured by Toagosei Co., Ltd., ARONIX M-315, molecular weight 423, trifunctional type), 1.5 parts by weight of a mixture of benzophenone and 1-hydroxycyclohexyl phenyl ketone at a weight ratio of 1:1 (manufactured by Ciba Specialty Chemicals Corp., IRGACURE 500) as a photopolymerization initiator, 0.3 parts by weight of trimethylolpropane-modified tolylene diisocyanate (manufactured by Nippon Polyurethane Industry Co., Ltd., CORONATE L) as an isocyanate-based crosslinking agent, 0.2 parts by weight of 3-glycidoxypropyltrimethoxysilane (manufactured by Shin-Etsu Chemical Co., Ltd., KBM-403) as a silane coupling agent, and 18.6 parts by weight of perfectly spherical silicone fine particles (manufactured by GE Toshiba Silicones Co., Ltd., TOSPEARL 145, average particle size 4.5 µm), further adding ethyl acetate, and mixing the mixture.

Next, the ethyl acetate solution of a tacky adhesive material thus obtained was applied on a polyethylene terephthalate film (manufactured by Toyobo Co., Ltd., COSMOSHINE A4100) having a thickness of 100 µm, using a knife type coating machine, such that the thickness after being dried would be 25 µm. Subsequently, the solution was treated by drying at 90° C. for 1 minute, and thus a tacky adhesive material layer was formed.

Subsequently, a peeling layer of a peeling film made of polyethylene terephthalate (manufactured by Lintec Corp., SP-PET3811) having a thickness of 38 µm as a peelable sheet, and the tacky adhesive material layer thus obtained were bonded, and 30 minutes after bonding, the tacky adhesive material layer was irradiated with ultraviolet radiation through the peeling film side using an electrodeless lamp (manufactured by Fusion Lamps, Ltd.) which used a H-valve, at an illuminance of 600 mW/cm$^2$ and an amount of light of 150 mJ/cm$^2$.

The tacky adhesive material layer thus obtained after ultraviolet curing was used as an optical-diffusion film of Comparative Example 2 and was evaluated in the same manner as in Example 1. The results thus obtained are presented in FIGS. 39 to 41.

Figure 39:
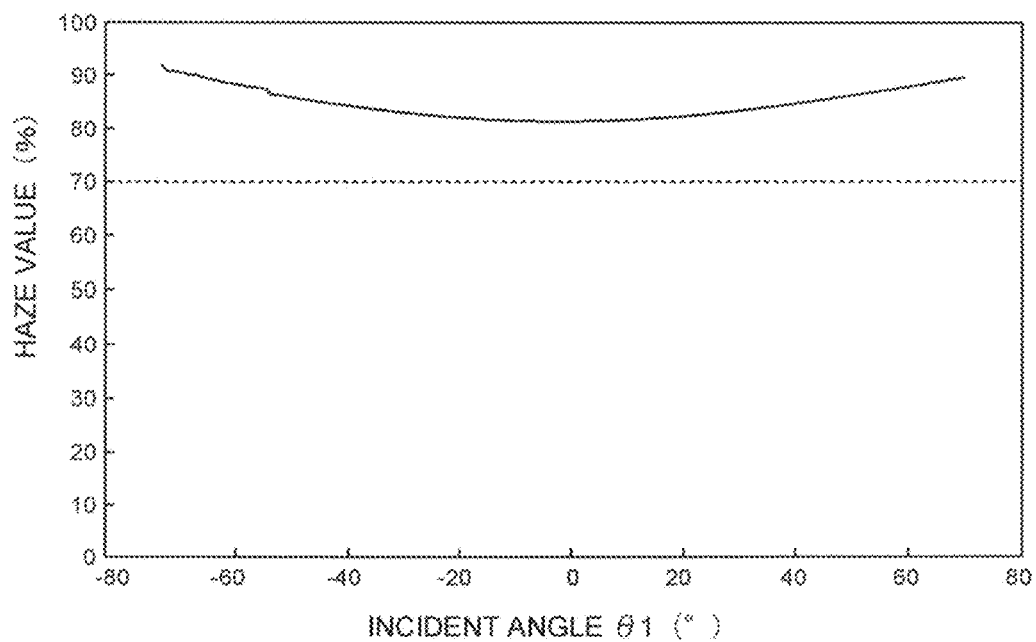
FIG. 39 is a diagram provided to show an incident angle-haze value chart for the optical-diffusion film according to Comparative Example 2.

Here, FIG. 39 is an incident angle-haze value chart for the optical-diffusion film thus obtained.

FIGS. 40(a) to 40(g) are photographs showing the optical-diffusion condition corresponding to the case to which the optical-diffusion film thus obtained was applied to a reflective display device.

Incidentally, it was confirmed that the visibility condition of the displayed images in the reflective display device to which the optical-diffusion film thus obtained was actually applied, and the optical-diffusion characteristics of the optical-diffusion film shown in FIGS. 40(a) to 40(g) were correlated with each other and were not contradictory to each other.

FIG. 41 is an incident angle-luminance chart showing the relationship between the incident angle θ1 and the luminance (cd/m$^2$) at the central portion of the various concentric circles in FIGS. 40(a) to 40(g). From such FIG. 41, it is understood that only an incident light of a narrow range of the incident angle θ1=0° to 30° can be diffused and emitted to the film front.

Example 4

In Example 4, as illustrated in FIG. 42, the optical-diffusion film obtained in Example 1 was laminated between a reflective plate and a reflective monochromatic TN liquid crystal display panel in a reflective display device having a reflective plate as a separate body on the non-display surface side of a reflective monochromatic TN liquid crystal display panel.

Subsequently, the reflective display device obtained as such was applied to a digital clock, and the display condition of time in the digital clock was checked by visual inspection.

As a result, as illustrated in FIG. 42(a), it is understood that the display area in which display light was not diffused and emitted in the reflective display device, that is, the area in which numerals were displayed had black color, while the background area in which display light was diffused and emitted in the reflective display device, that is, the area other than the area in which numerals were displayed had white color.

It is also understood that since the background area had white color, the contrast between the white color of the background area and the black color of the display area was markedly high, and the display condition of time was very easy to view compared with conventional digital clocks (Comparative Example 3 described below) shown in FIG. 42(b).

Comparative Example 3

In Comparative Example 3, a digital clock was produced in the same manner as in Example 4, except that instead of using an optical-diffusion film, not a flat mirror type reflective plate but a surface-roughened type reflective plate was used as the reflective plate, and the digital clock was evaluated. That is, in Comparative Example 3, a conventional digital clock was produced and evaluated.

As a result, as shown in FIG. 42(b), it is understood that the display area in which display light was not diffused and emitted in the reflective display device, that is, the area in which numerals were displayed had black color, while the background area in which display light was diffused and emitted in the reflective display device, that is, the area other than the area in which numerals were displayed had dark green-grey color.

It is also understood that since the background area had dark green-grey color, the contrast between the dark green-grey color of the background area and the black color of the display area was low, and the display condition of time was very poor for viewing compared to the digital clock that used the optical-diffusion film of the present invention (Example 4) shown in FIG. 42(a).

INDUSTRIAL APPLICABILITY

As discussed above, when the optical-diffusion film for display of the present invention is used, particularly when the optical-diffusion film is applied to a reflective display device, an external light incident from a wide range of angles can be efficiently diffused and emitted toward the front of the display device as image display light.

Therefore, the optical-diffusion film for display of the present invention and a reflective display device using the film can be applied to products that are used in the outdoors, such as a smart phone, an outdoor TV, and a digital signage, and it is expected that the optical-diffusion film and the display device can significantly contribute to product quality enhancement of these products.

EXPLANATIONS OF LETTERS OR NUMERALS

1: Reflective display device, 10: display panel (liquid crystal display panel), 11: TFT substrate, 12: counter substrate, 13: liquid crystal layer, 14: reflective plate, 20: optical laminate, 21: λ/4 plate, 22: λ/2 plate, 23: polarizing plate, 30: driving circuit, 50: irradiated light from a light source, 60: parallel light, 100: optical-diffusion film, 101: coating layer, 102: process sheet, 112: pillar-shaped objects having a relatively high refractive index, 113: columnar structure, 113a: boundary surface of the columnar structure, 114: region having a relatively low refractive index, 115: first surface, 116: second surface, 125: linear light source, 200: irradiated light parallelizing member, 202: point light source, 204: lens, 210: light blocking member, 210a: plate-shaped member, 210b: cylindrical member, 310: light source, 320: integrating sphere, 400: conoscope, 410: light source arm

The invention claimed is:

1. A reflective display device obtained by laminating an optical-diffusion film on a display surface side of a reflective display panel including a reflective plate,
wherein the optical-diffusion film is a single-layered optical-diffusion film comprising a photocured composition for optical-diffusion film derived from two or more kinds of polymerizable compounds, said photocured composition including regions of high and low refractive indices and where the difference between the high and low refractive indices is 0.1 or more,
the optical-diffusion film, has a columnar structure in which plural pillar-shaped objects having a relatively high refractive index that are spaced 1 to 5 μm apart in a region having a relatively low refractive index,
the optical-diffusion film has a columnar structure which incident light is diffused at the boundary surface between the region having a relatively low refractive index and the plural pillar-shaped objects having a relatively high refractive index,
where the optical-diffusion film includes a first surface and a second surface opposite the first surface, and
the diameter of the the diameter of the pillar-shaped objects increases from the first pillar-shaped objects increases from the first surface toward the second surface,
the optical-diffusion film having the columnar structure has isotropy,
the film thickness of the optical-diffusion film has a value within the range of 60 to 700 μm, and
when an incident angle of incident light with respect to the normal line of the film plane is varied in the range of −70° to 70°, a haze value at each incident angle has a value of 70% or more.

2. The reflective display device according to claim 1, wherein the wherein the pillar-shaped objects have a bent part in the middle of the pillar pillar-shaped objects have a bent part in the middle of the pillar-shaped objects.

3. The reflective display device according to claim 1, wherein the wherein the pillar-shaped objects are composed of first pillar-shaped objects pillar-shaped objects are composed of first pillar-shaped objects positioned on the first surface side, and second pillar-shaped objects positioned on the second surface side.

4. The reflective display device according to claim 1, wherein the composition for optical-diffusion film includes a (meth)acrylic acid ester containing plural aromatic rings as a component (A), a urethane (meth)acrylate as a component (B), and a photopolymerization initiator as a component (C).

5. The reflective display device according to claim 1, wherein the reflective display panel is at least one selected from the group consisting of a liquid crystal display panel, an electrophoretic system display panel, a MEMS shutter system display panel, and an electrowetting system display panel.

6. The reflective display device according to claim 1, wherein the reflective display panel is a semi-transmissive display panel.

7. The reflective display panel according to claim 1, wherein the reflective display panel is a monochromatic display panel.

8. The reflective display panel according to claim 7, wherein the reflective display panel is applied as a display device for a price tag or a timepiece.

9. A reflective display device obtained by laminating a reflective plate as a separate body on a non-display surface side of a reflective display panel, and laminating an optical-diffusion film between the reflective plate and the reflective display panel,
wherein the optical-diffusion film is a single-layered optical-diffusion film comprising a photocured composition for optical-diffusion film derived from two or more kinds of polymerizable compounds, said photocured composition including regions of high and low refractive indices and where the difference between the high and low refractive indices is 0.1,
the optical-diffusion film, which includes a film thickness, has a columnar structure in which plural pillar-shaped objects having a relatively high refractive index that are spaced 1 to 5 μm apart in a region having a relatively low refractive index,
the optical-diffusion film has a columnar structure which incident light is diffused at the boundary surface between the region having a relatively low refractive index and the plural pillar-shaped objects having a relatively high refractive index,
where the optical-diffusion film includes a first surface and a second surface opposite the first surface as a second surface, and
the diameter of the the diameter of the pillar-shaped objects increases from the first pillar-shaped objects increases from the first surface toward the second surface,
the optical-diffusion film having the columnar structure has isotropy,
the film thickness of the optical-diffusion film has a value within the range of 60 to 700 μm, and
when an incident angle of incident light with respect to the normal line of the film plane is varied in the range of −70° to 70°, a haze value at each incident angle has a value of 70% or more.

10. A method of preparing an optical-diffusion film comprising:
(a) a step of preparing a predetermined composition for optical-diffusion film derived from two or more kinds of polymerizable compounds having a difference between high and low refractive indices which is 0.1 or more;
(b) a step of applying the composition for optical-diffusion film on a process sheet, and forming a coating layer;
(c) a step of subjecting the coating layer to active energy ray irradiation, forming a single-layered optical-diffusion film while phase-separating the polymerizable compounds,
to thereby produce an optical-diffusion film that includes plural pillar-shaped objects having a relatively high refractive index spaced 1 to 5 μm apart in a region having a relatively low refractive index,
the optical-diffusion film has a columnar structure which incident light is diffused at the boundary surface between the region having a relatively low refractive index and the plural pillar-shaped objects having a relatively high refractive index,
where the optical-diffusion film includes a first surface and a second surface opposite the first surface, and
the diameter of the the diameter of the pillar-shaped objects increases from the first pillar-shaped objects increases from the first surface toward the second surface,
and where the film thickness of the optical-diffusion film is 60 to 700 μm, and when an incident angle of incident light with respect to the normal line of the film plane is varied in the range of −70° to 70°, a haze value at each incident angle has a value of 70% or more.

* * * * *